United States Patent
Lee

(10) Patent No.: US 12,127,140 B2
(45) Date of Patent: Oct. 22, 2024

(54) AUDIO DATA TRANSMISSION METHOD USING SHORT-RANGE WIRELESS COMMUNICATION IN WIRELESS COMMUNICATION SYSTEM AND APPARATUS THEREFOR

(71) Applicant: LG ELECTRONICS INC., Seoul (KR)

(72) Inventor: Hyeonjae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 352 days.

(21) Appl. No.: 17/625,644

(22) PCT Filed: Jul. 10, 2020

(86) PCT No.: PCT/KR2020/009149
§ 371 (c)(1),
(2) Date: Jan. 7, 2022

(87) PCT Pub. No.: WO2021/006710
PCT Pub. Date: Jan. 14, 2021

(65) Prior Publication Data
US 2022/0272644 A1    Aug. 25, 2022

(30) Foreign Application Priority Data
Jul. 10, 2019    (KR) .................. 10-2019-0083451

(51) Int. Cl.
*H04W 56/00*    (2009.01)
*H04J 3/06*    (2006.01)
(Continued)

(52) U.S. Cl.
CPC ......... *H04W 56/001* (2013.01); *H04J 3/0667* (2013.01); *H04J 3/067* (2013.01); *H04W 4/23* (2018.02); *H04W 4/80* (2018.02)

(58) Field of Classification Search
CPC ......... H04W 56/00; H04W 4/23; H04W 4/06; H04W 4/80; H04W 76/10; H04W 76/14;
(Continued)

(56) References Cited

U.S. PATENT DOCUMENTS 9,712,266 B2 *  7/2017  Linde ................. H04W 4/80
10,652,659 B2 *  5/2020  Bhalla ................ H04R 3/12
(Continued)

FOREIGN PATENT DOCUMENTS

KR    10-2009-0052963    5/2009
KR    10-2010-0060717    6/2010
KR    10-1633324    6/2016

OTHER PUBLICATIONS

PCT International Application No. PCT/KR2020/009149, International Search Report dated Oct. 22, 2020, 7 pages.

*Primary Examiner* — Man U Phan
(74) *Attorney, Agent, or Firm* — LEE, HONG, DEGERMAN, KANG & WAIMEY

(57) ABSTRACT

A method according to the present disclosure comprises determining a first synchronization value associated with a point in time at which reception of the audio data of each of a first device and a second device is completed; determining a second synchronization value for synchronizing points in time at which the audio data is output from the first device and the second device; determining a first synchronization reference time point based on the first synchronization value and the second synchronization value; performing a specific operation associated with transmitting the audio data; and transmitting, to each of the first device and the second device, the audio data on a specific channel associated with transmitting the audio data, wherein the audio data is transmitted based on the first synchronization reference time point and a second synchronization reference time point (Continued)

determined based on a specific time value for the specific operation.

19 Claims, 39 Drawing Sheets

(51) Int. Cl.
  *H04W 4/23* (2018.01)
  *H04W 4/80* (2018.01)
(58) Field of Classification Search
  CPC ........ H04W 76/15; H04L 29/06; H04L 29/08; H04L 65/60; H04L 67/55; H04L 76/14; H04L 43/04; H04J 3/06; G06F 3/16; H04R 3/00; H04R 3/04; H04R 3/12; H04R 1/40; H04R 29/00
  USPC ......................................................... 370/503
  See application file for complete search history.

(56) References Cited

U.S. PATENT DOCUMENTS

| | | | |
|---|---|---|---|
| 10,701,657 B2* | 6/2020 | Klotchkov | H04W 56/0065 |
| 10,721,679 B2* | 7/2020 | Jung | H04W 8/005 |
| 10,892,833 B2* | 1/2021 | Stilwell | H04W 4/80 |
| 11,606,408 B2* | 3/2023 | Aggarwal | H04L 7/0041 |
| 11,665,214 B2* | 5/2023 | Lee | H04W 56/001 |
| | | | 709/201 |
| 11,736,919 B2* | 8/2023 | Lee | H04N 21/436 |
| | | | 455/41.3 |
| 11,800,340 B2* | 10/2023 | Lee | H04W 4/80 |
| 2009/0298420 A1* | 12/2009 | Haartsen | H04J 3/0658 |
| | | | 455/3.06 |
| 2016/0044426 A1* | 2/2016 | Duchscher | H04L 1/0057 |
| | | | 381/315 |
| 2018/0098180 A1* | 4/2018 | Chang | H04L 41/00 |
| 2020/0120378 A1* | 4/2020 | Elliot | H04N 21/43637 |

* cited by examiner

[FIG. 1]
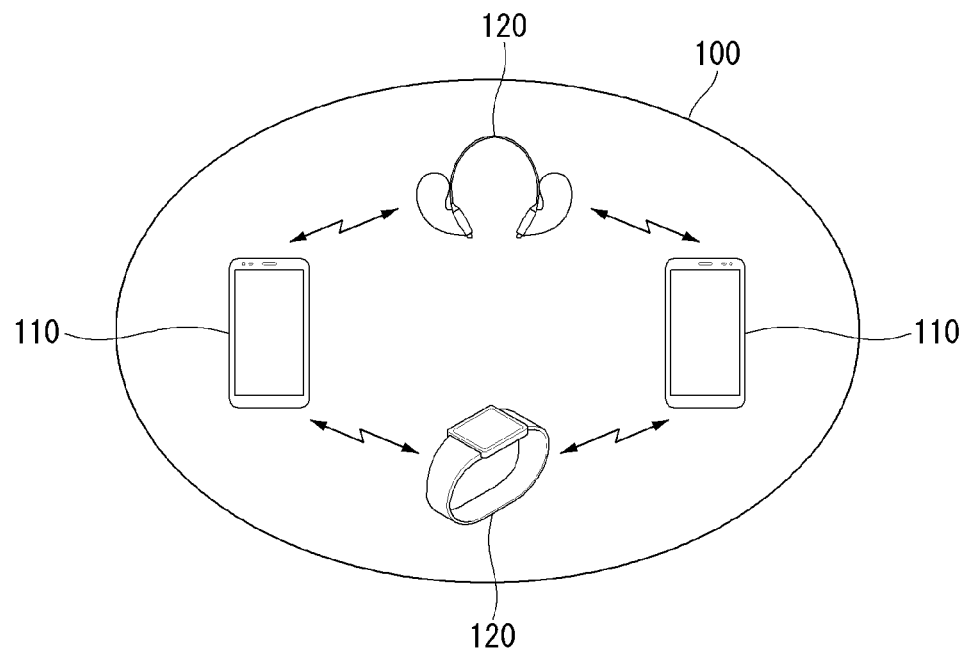

[FIG. 2]
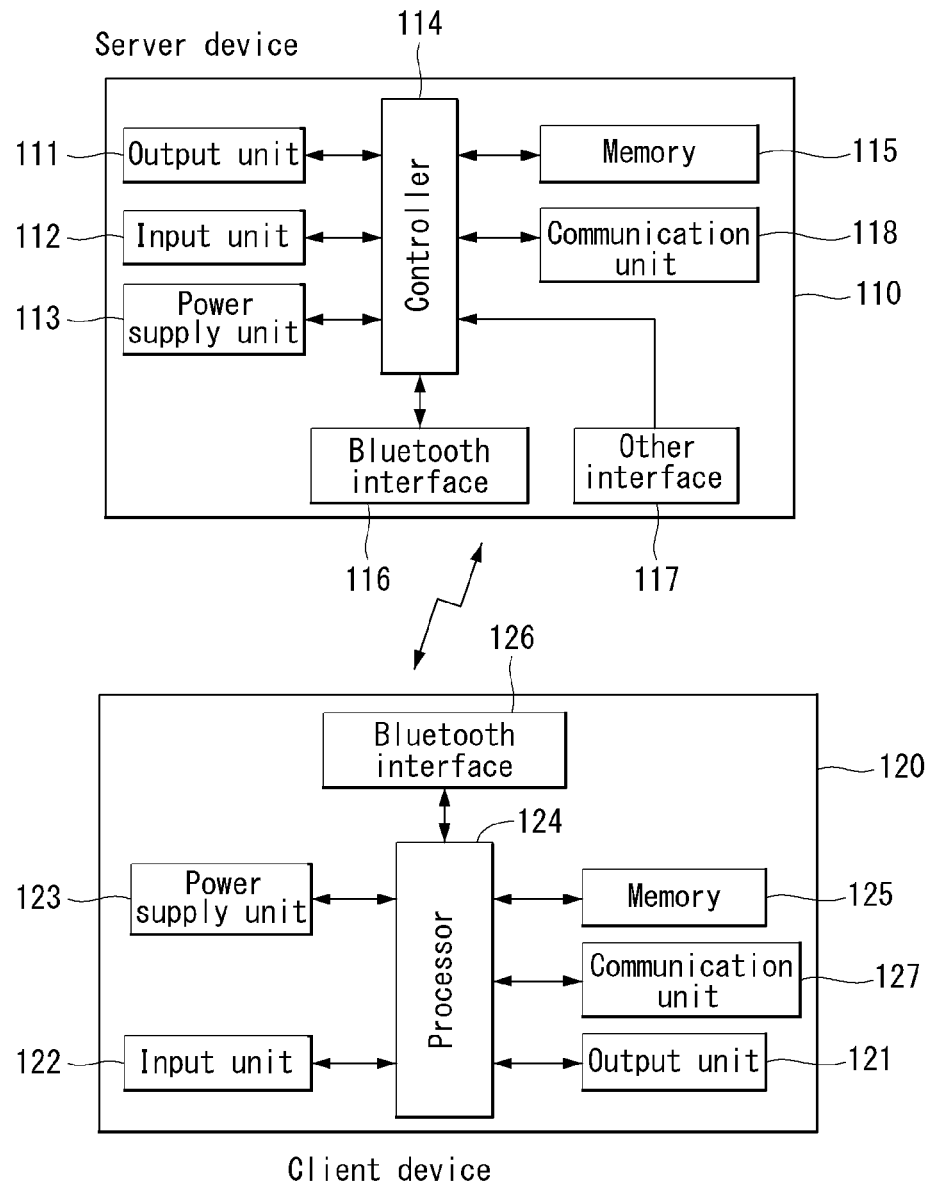

[FIG. 3]
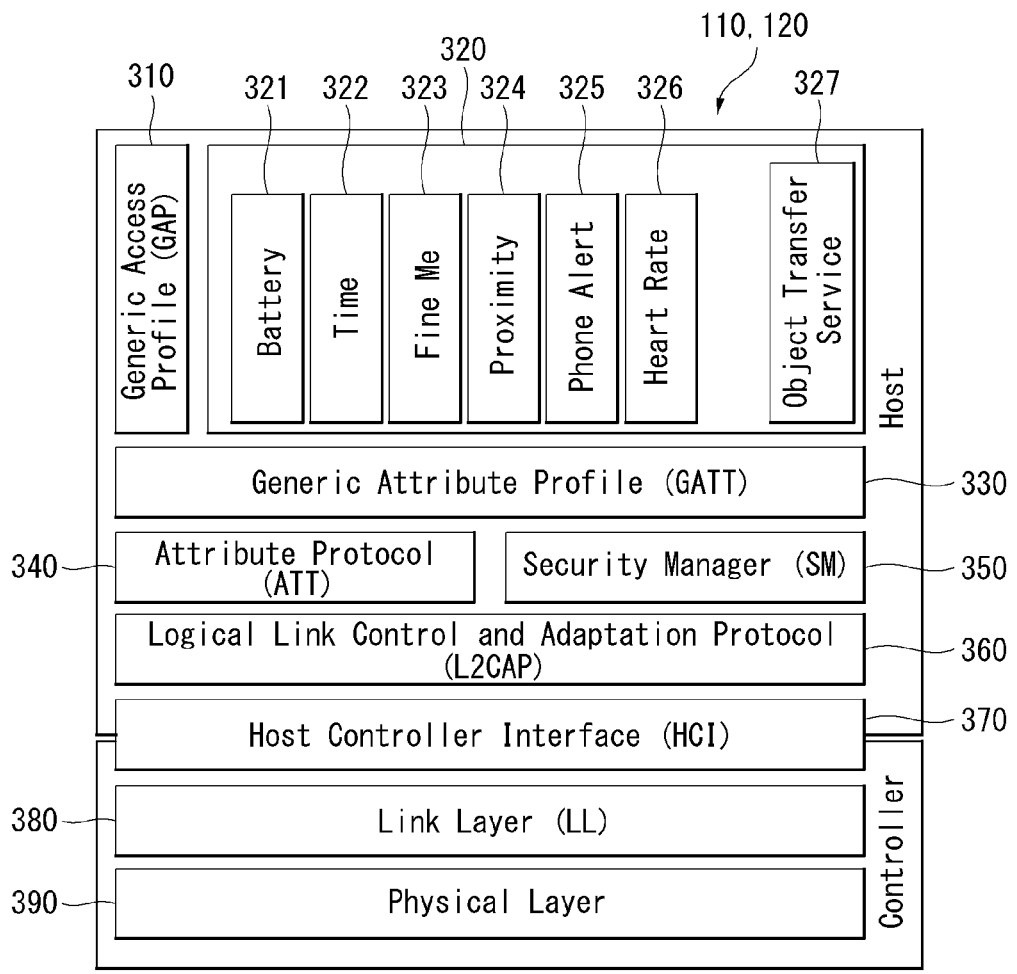

[FIG. 4]
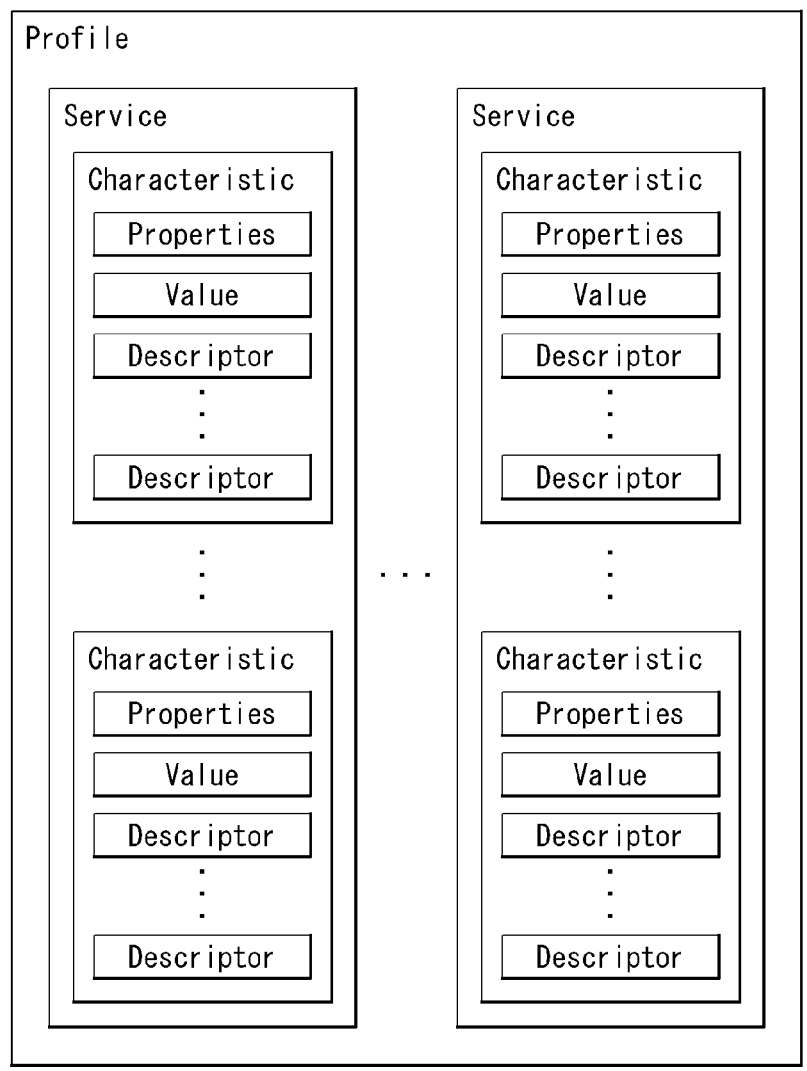

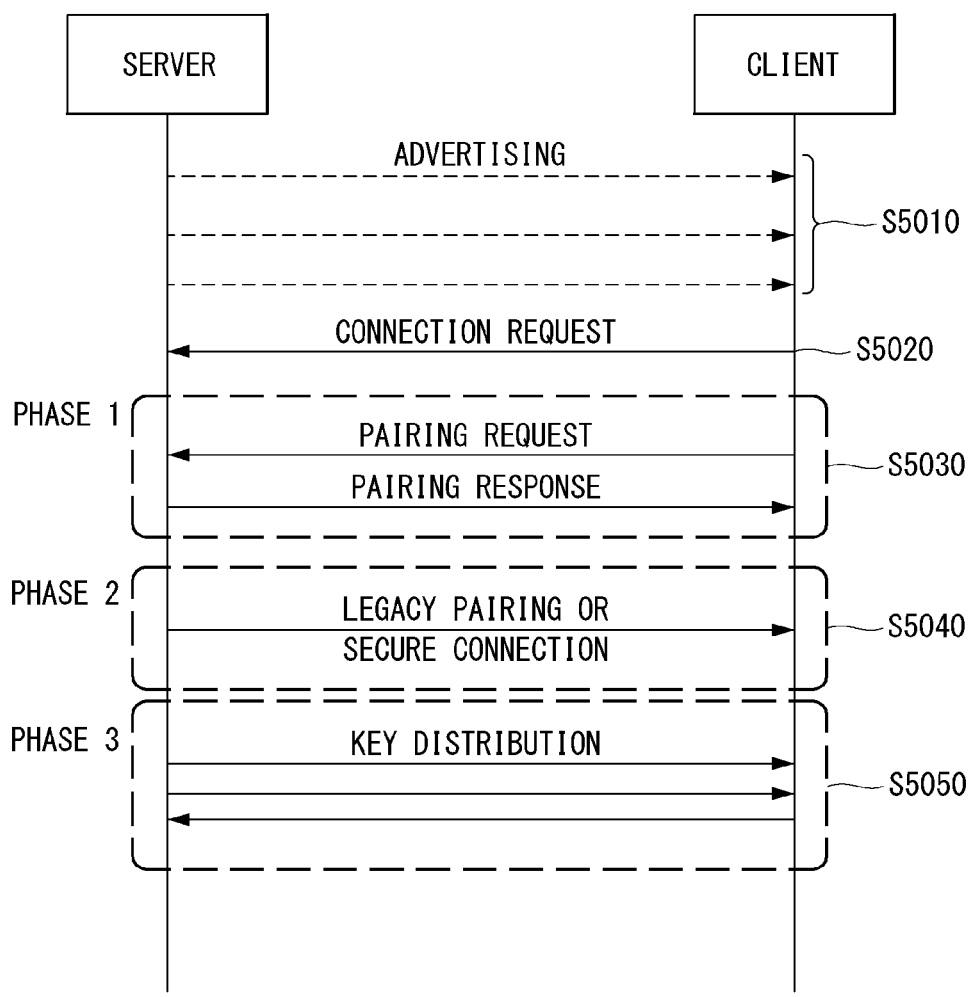

[FIG. 6]
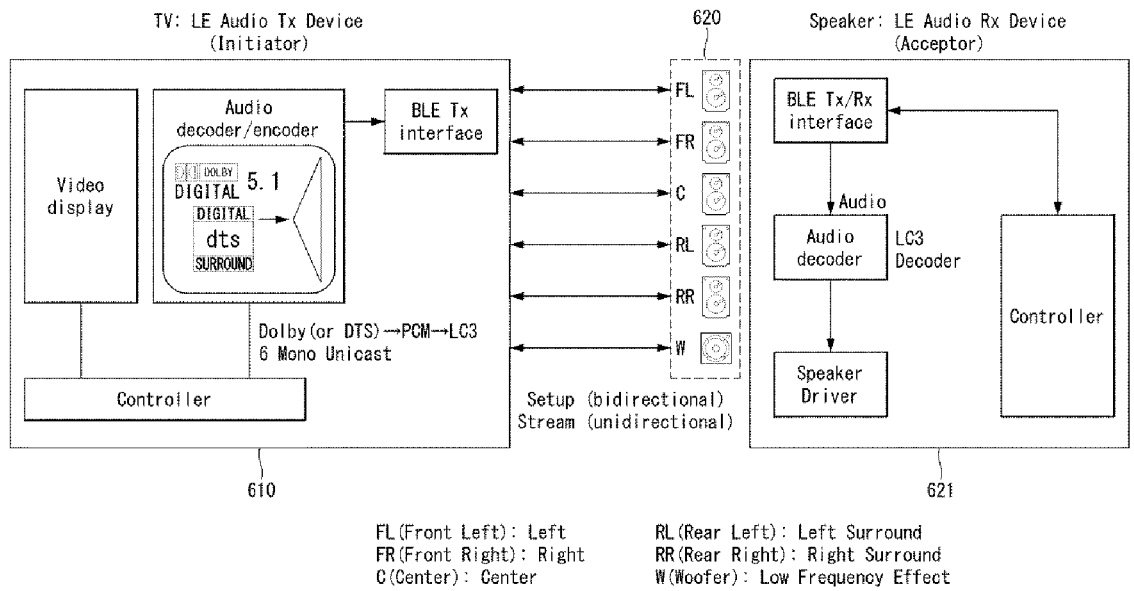
[FIG. 7]
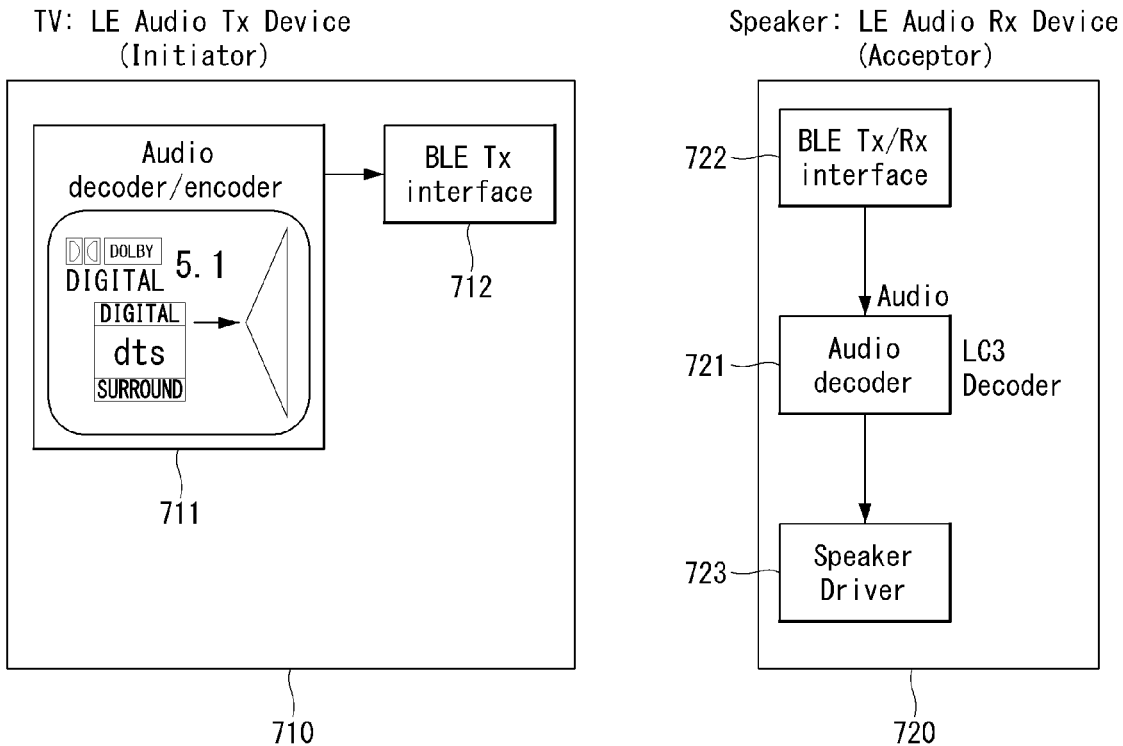

[FIG. 8]
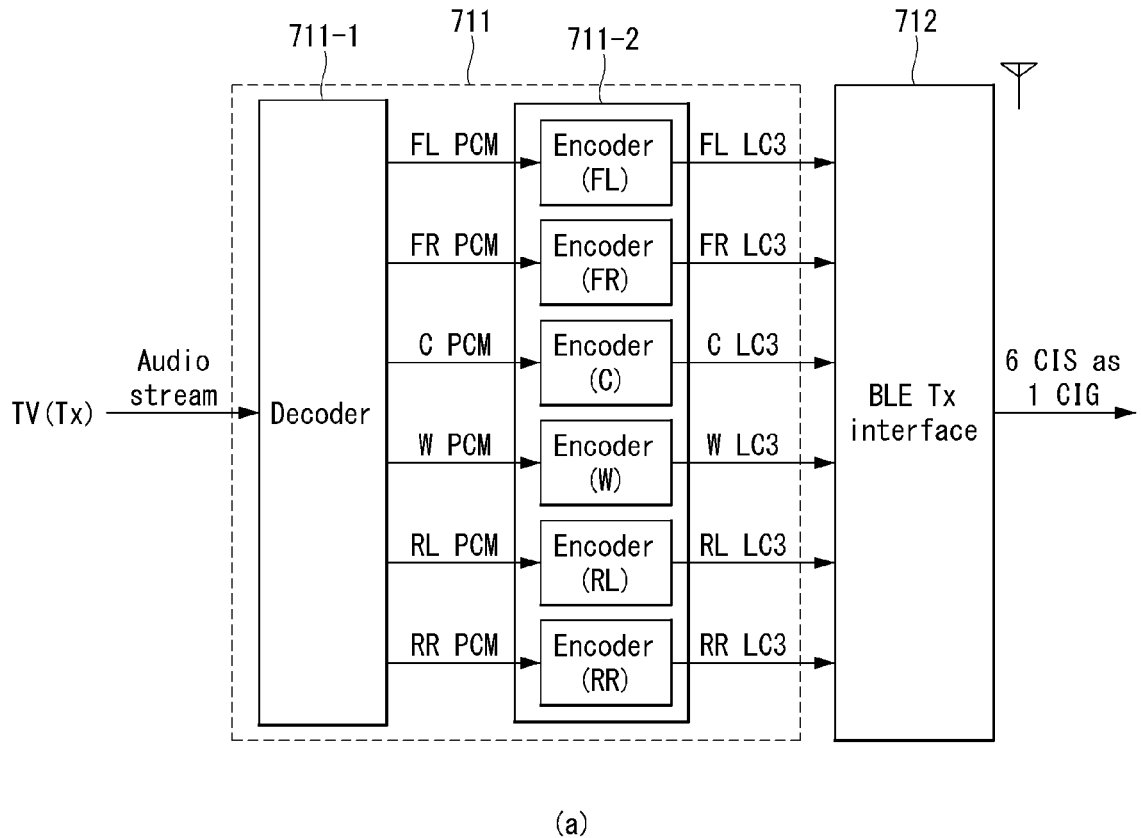
(a)
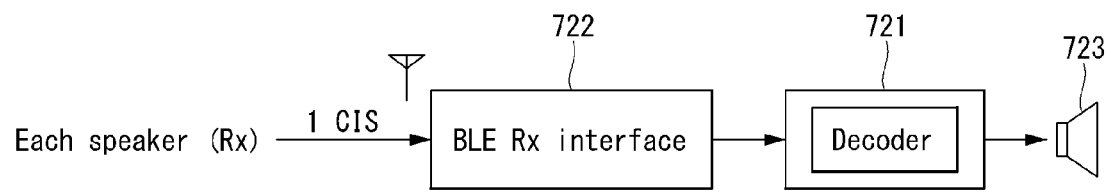
(b)

[FIG. 9]
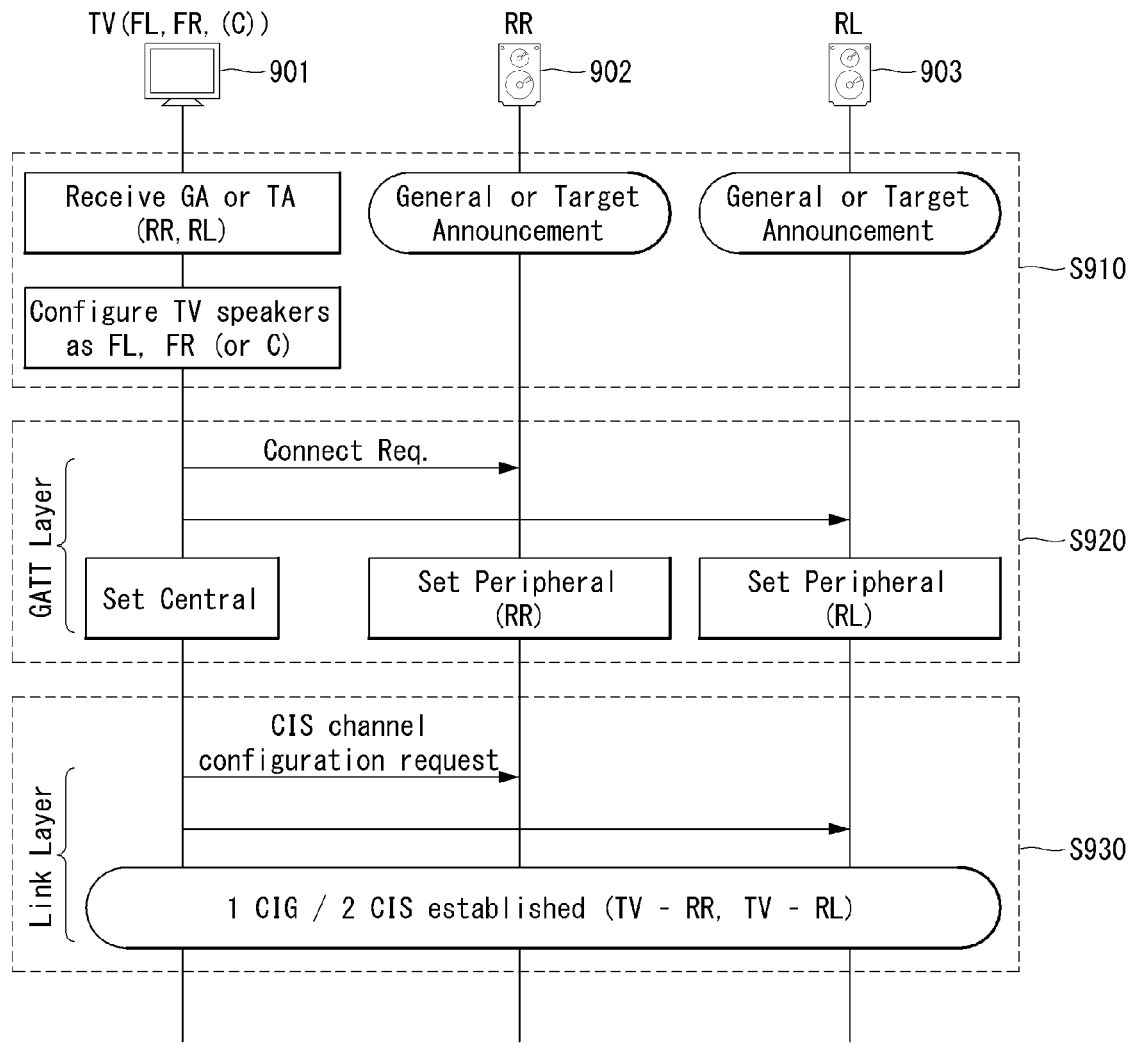

[FIG. 10]
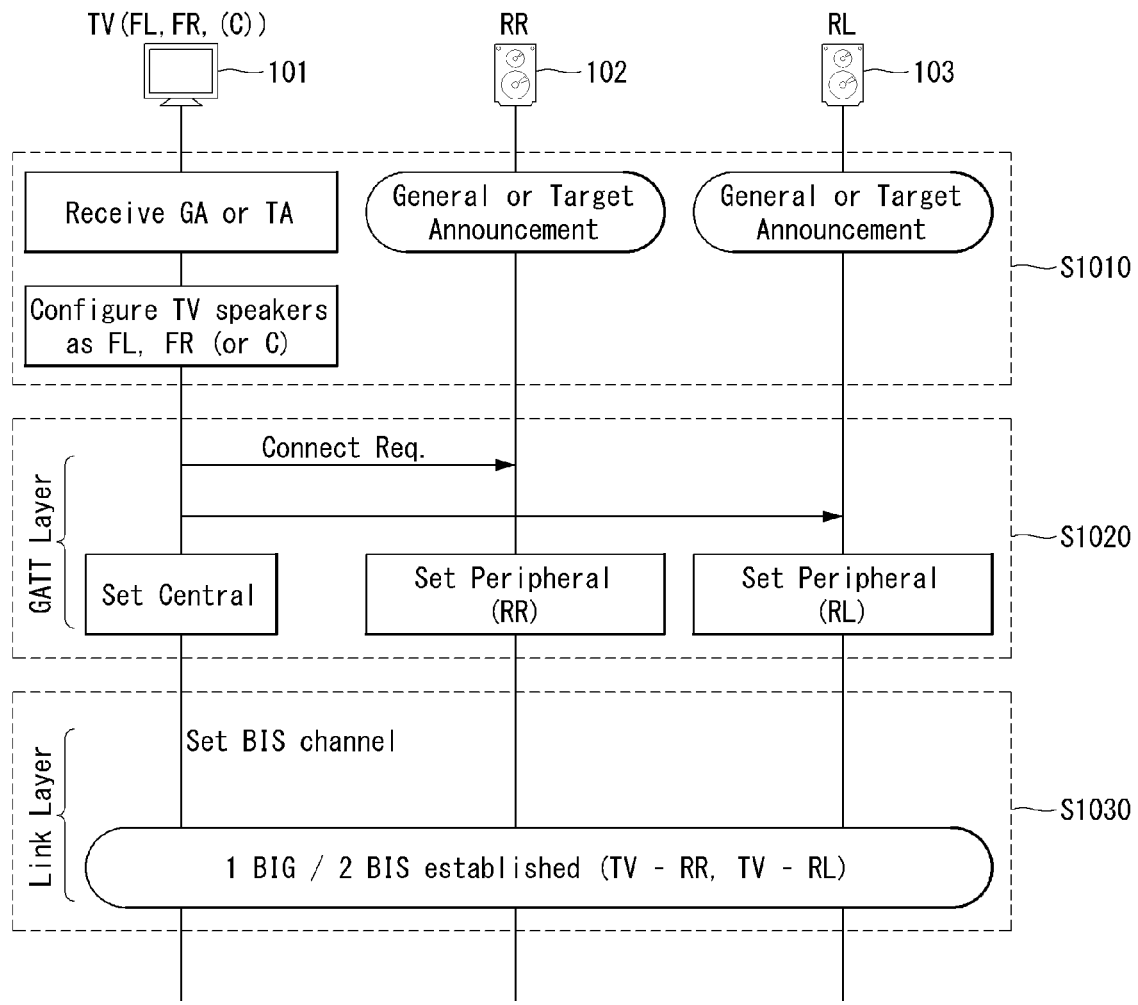

[FIG. 11]
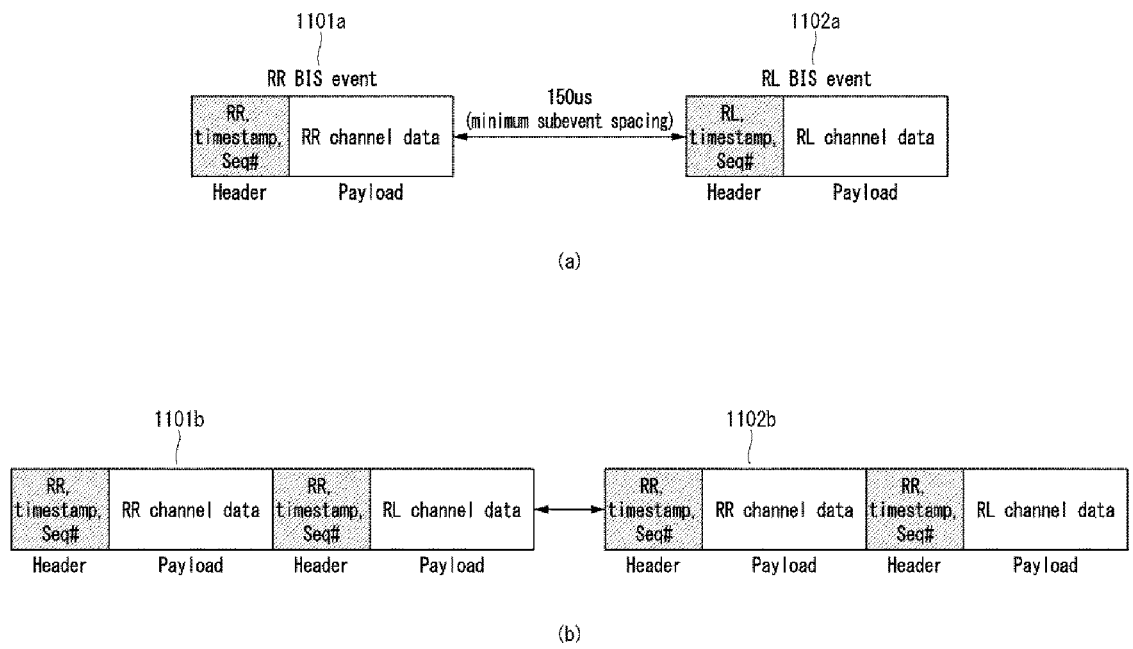

[FIG. 12]
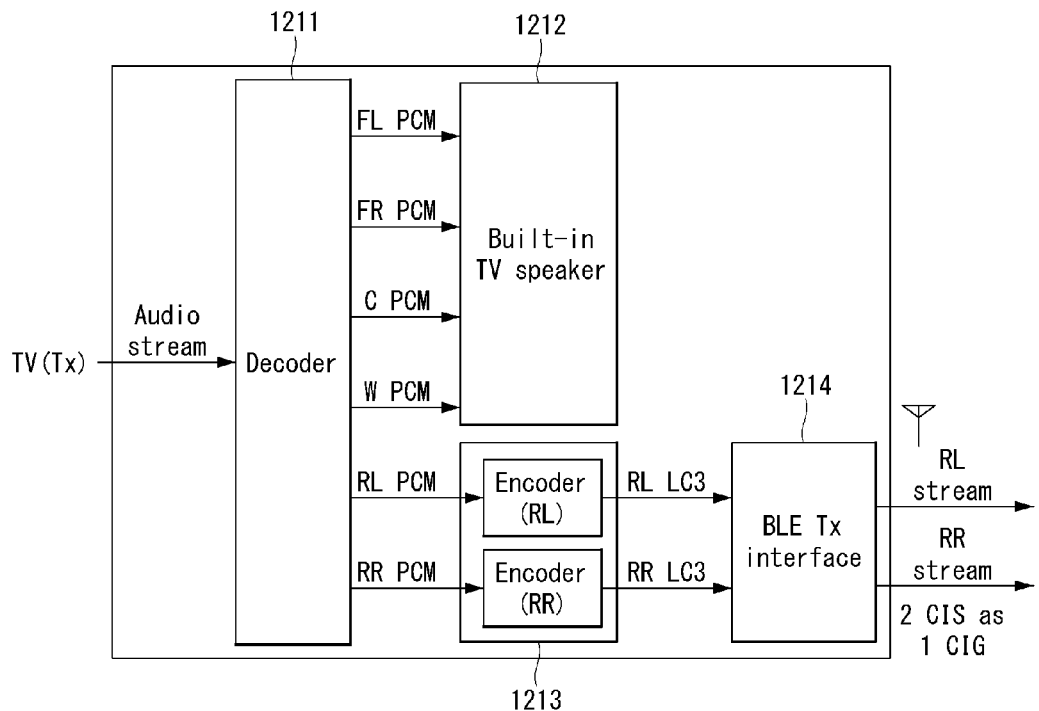
(a)
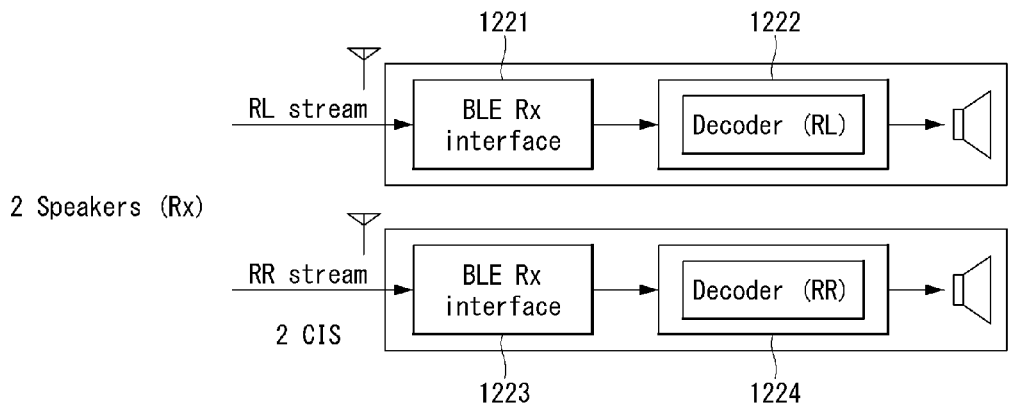
(b)

[FIG. 13]
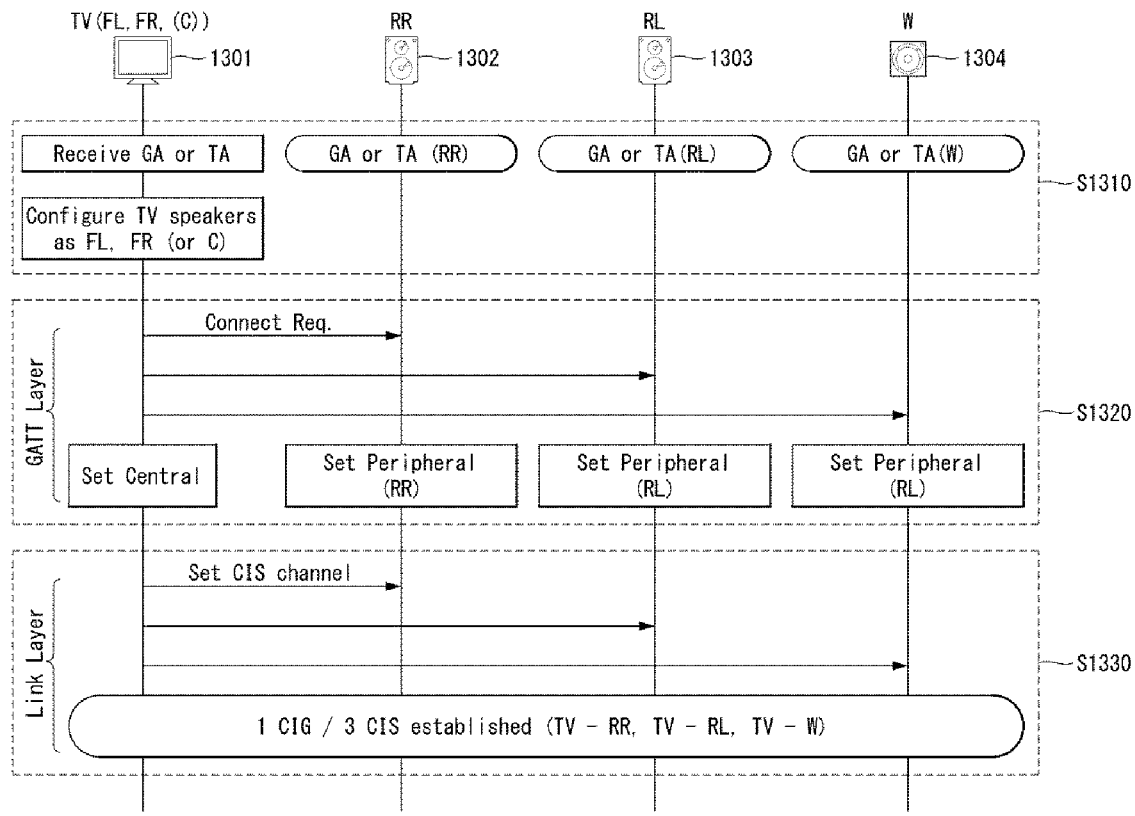

[FIG. 14]
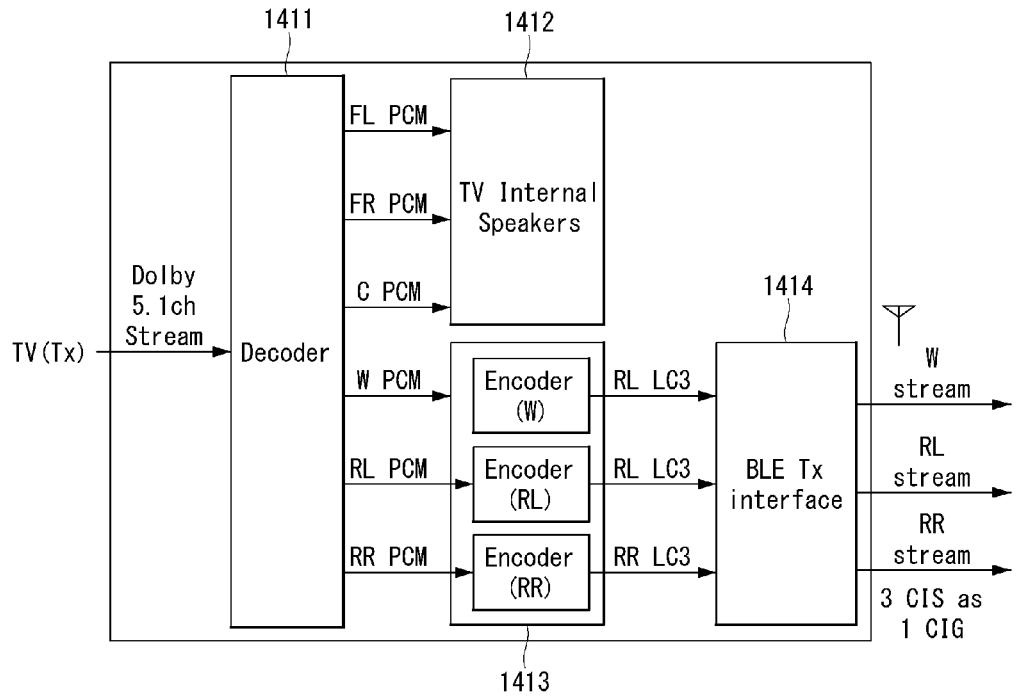
(a)
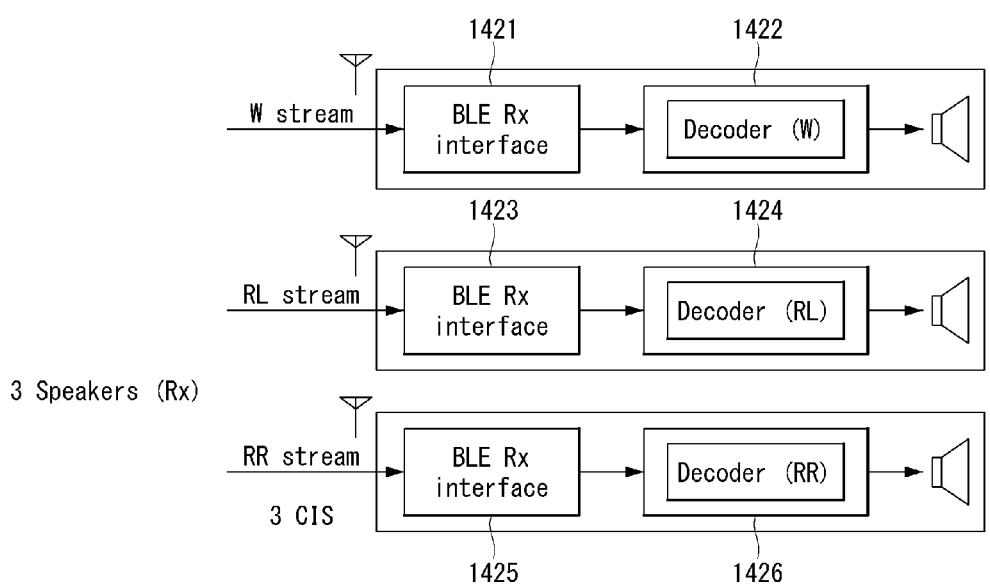
(b)

[FIG. 15]
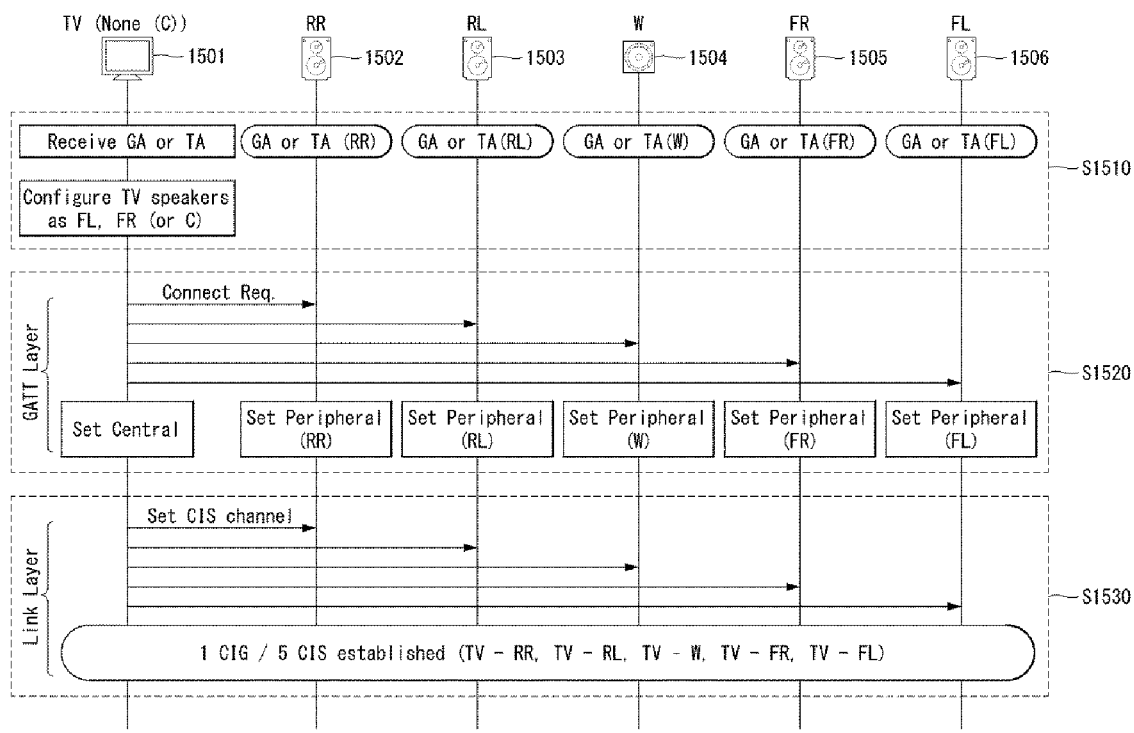

[FIG. 16]
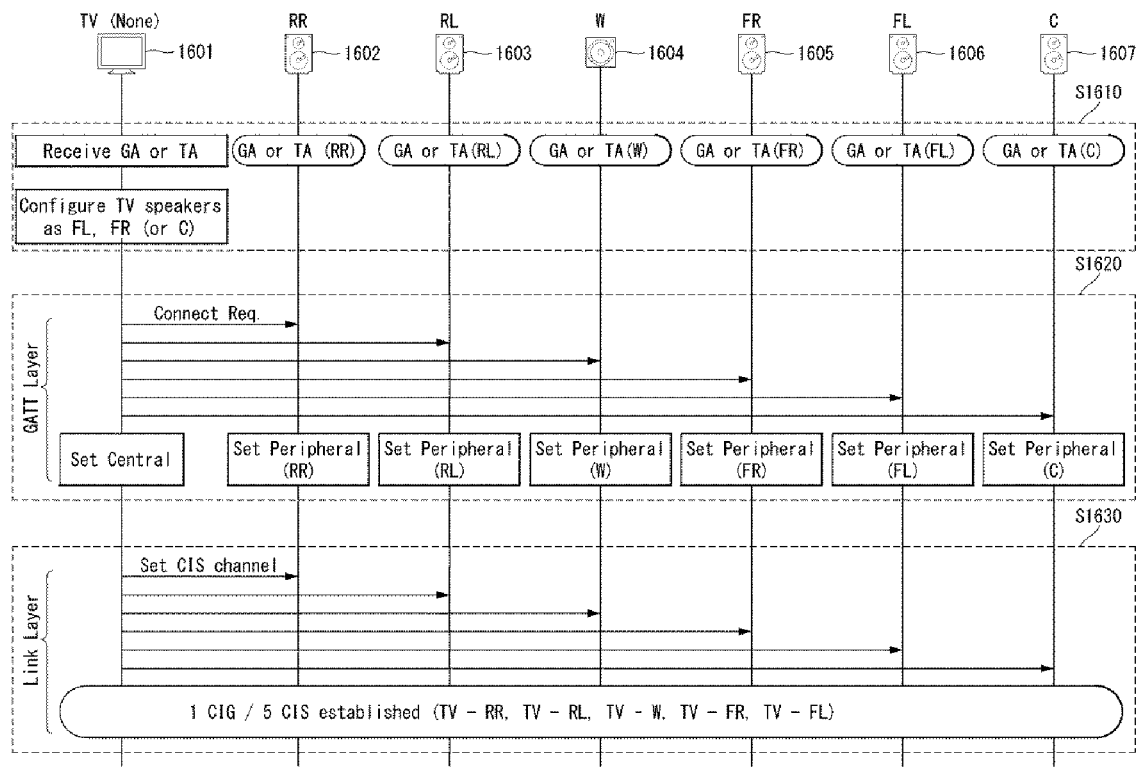

[FIG. 17]
(a)  
(b) 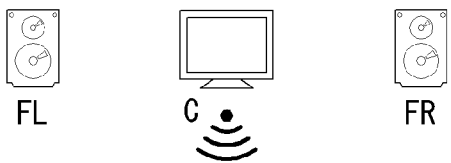 
(c) 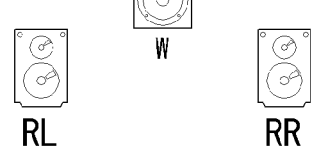

[FIG. 18]
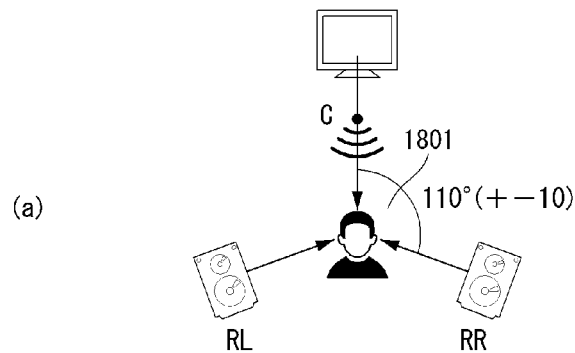
(a)
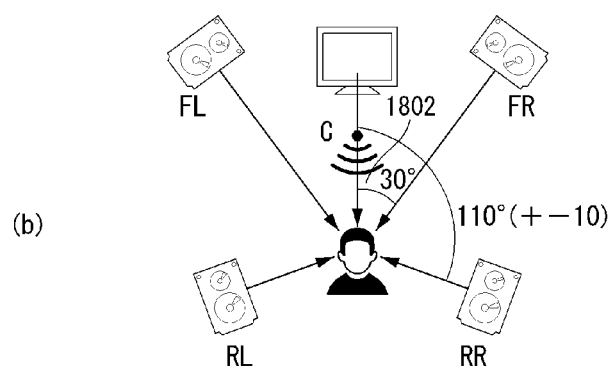
(b)
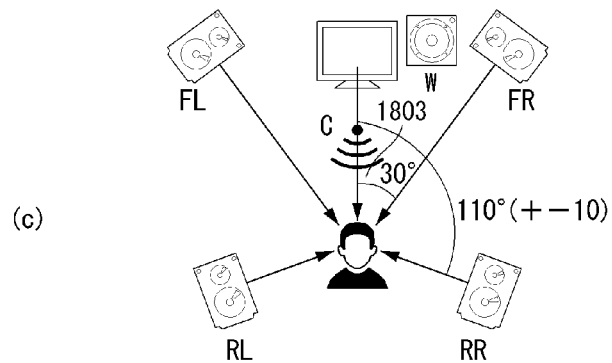
(c)

[FIG. 19]
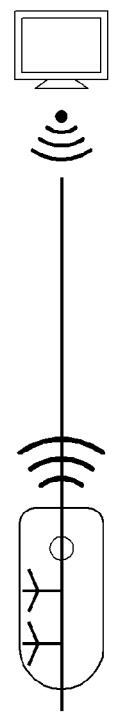
(a)
(b)

[FIG. 20]
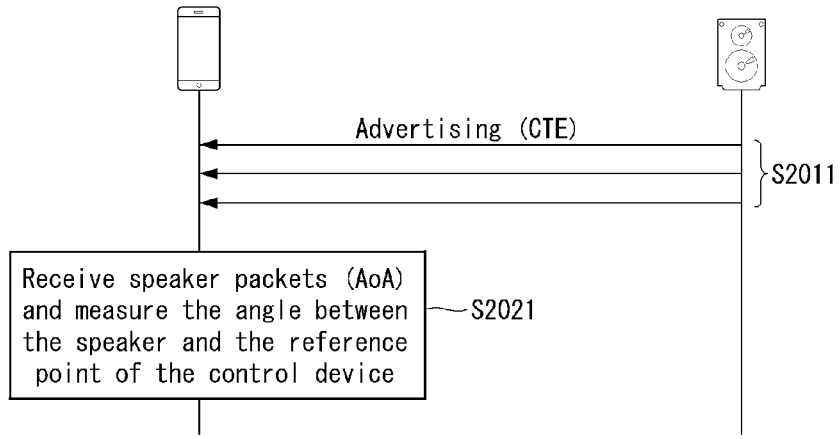
(a)
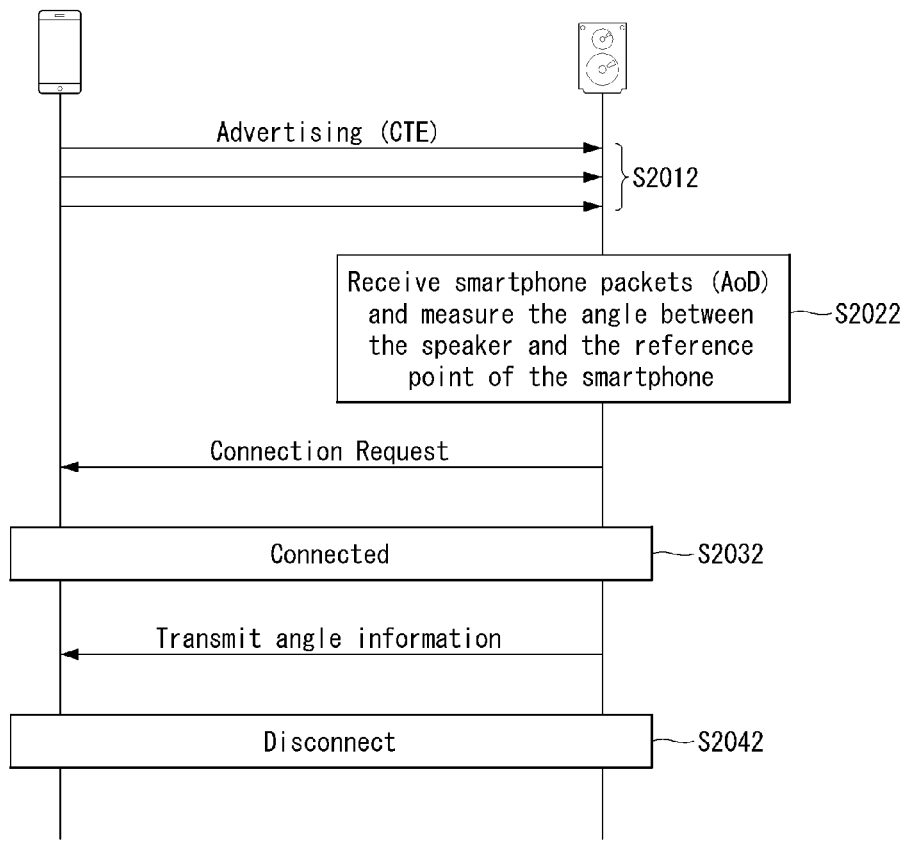
(b)

[FIG. 21]
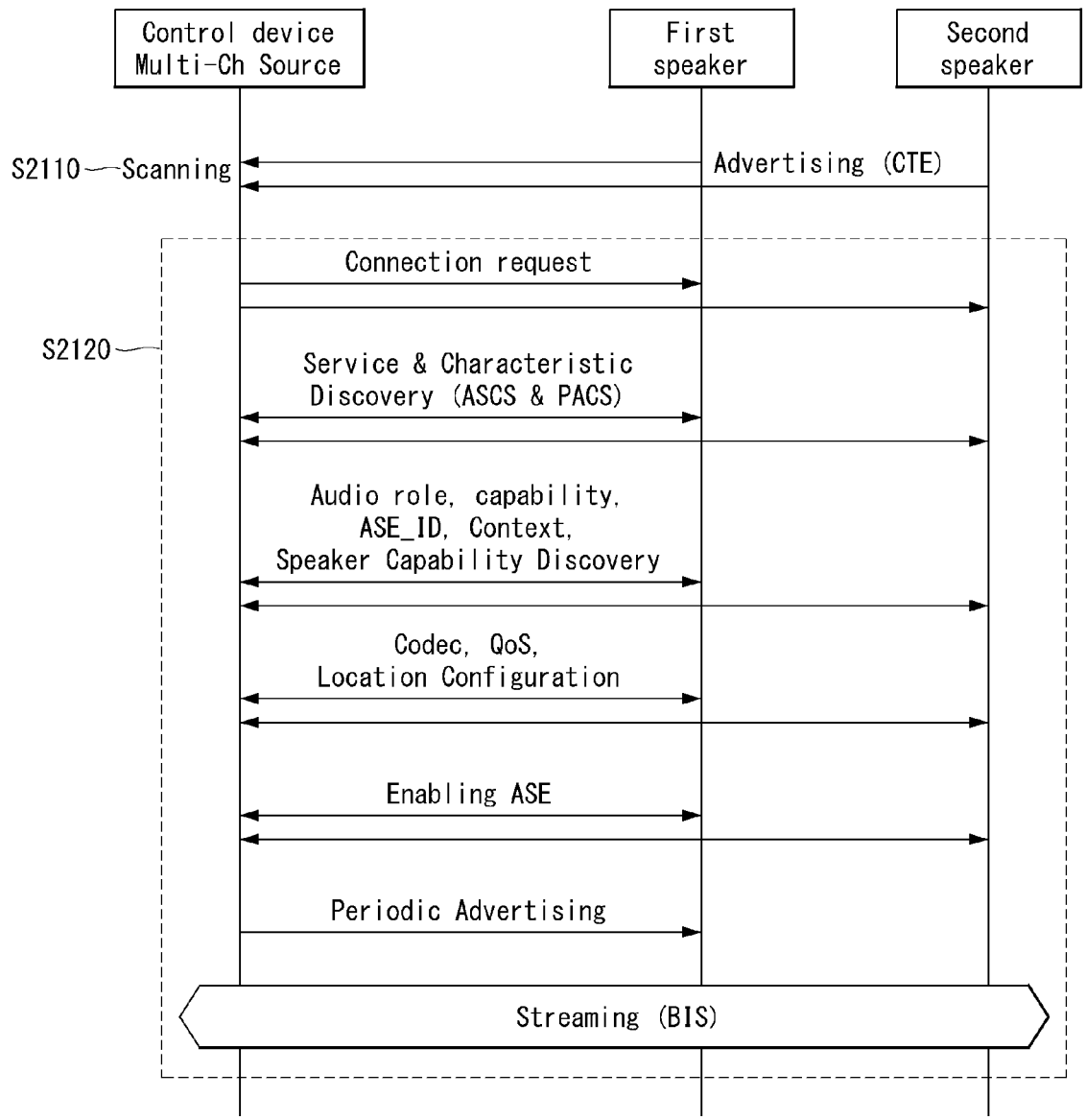

[FIG. 22]
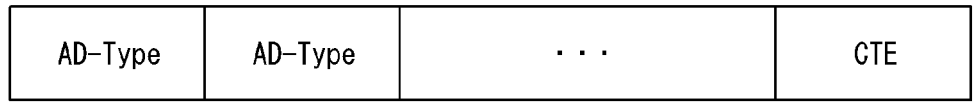
[FIG. 23]
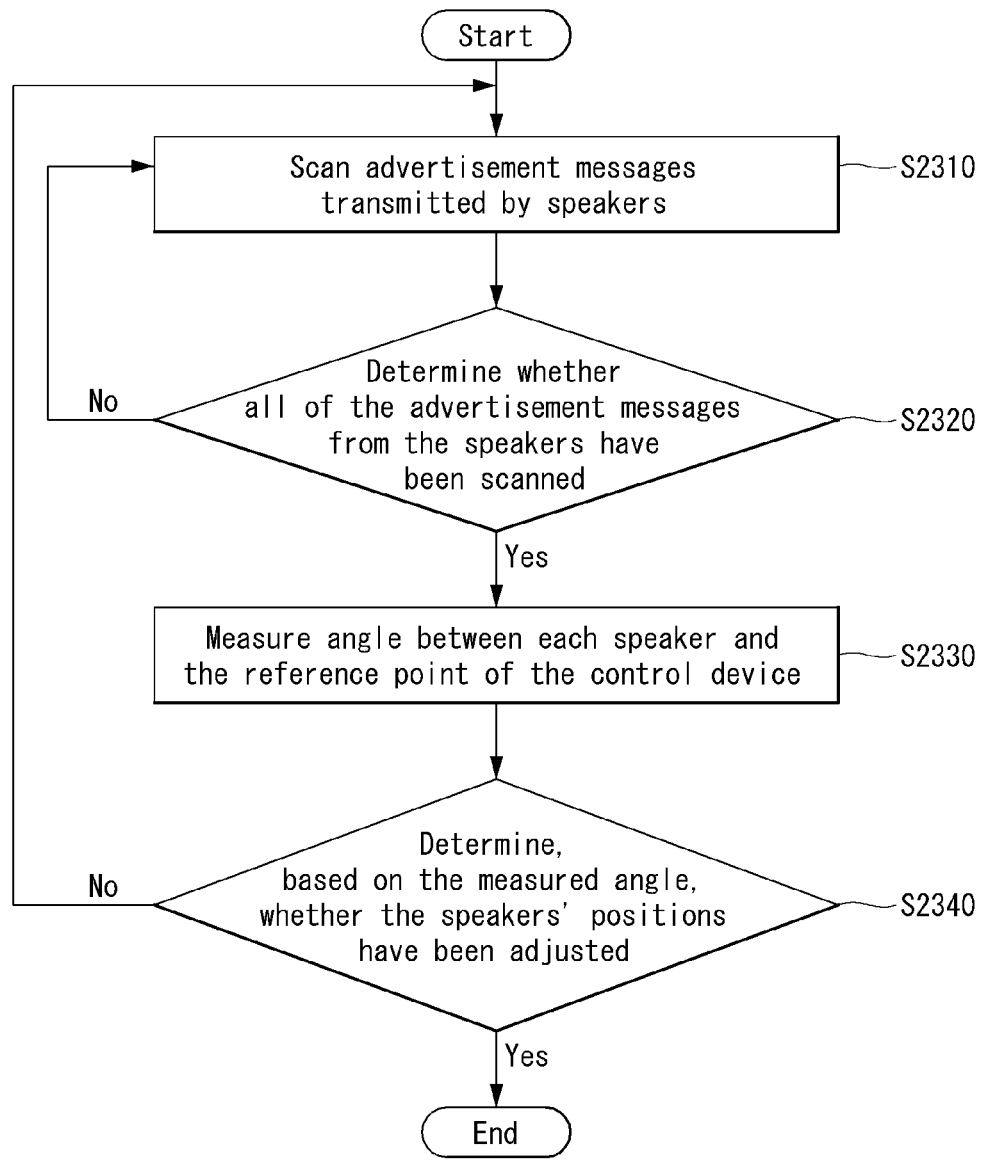

[FIG. 24]
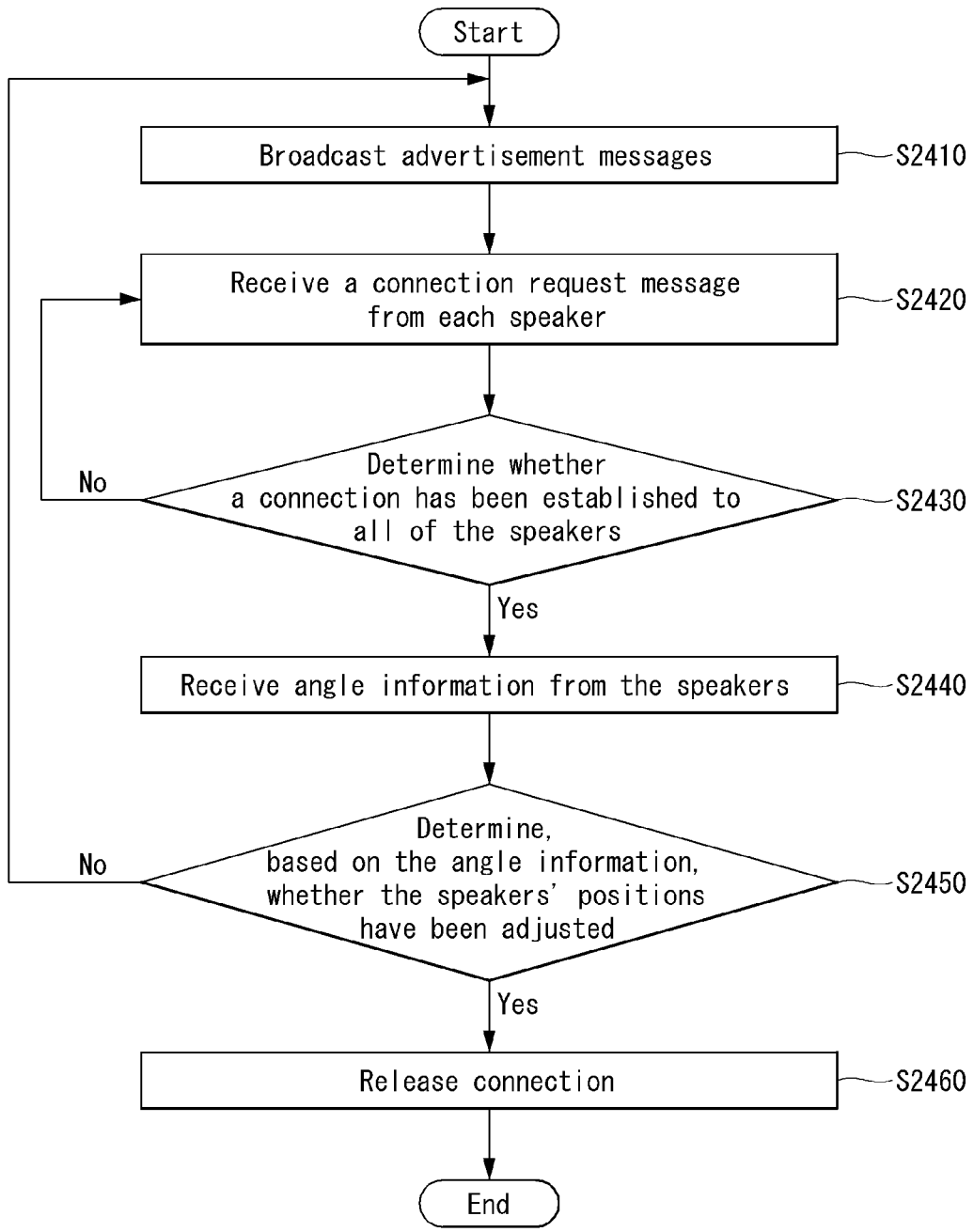

[FIG. 25]
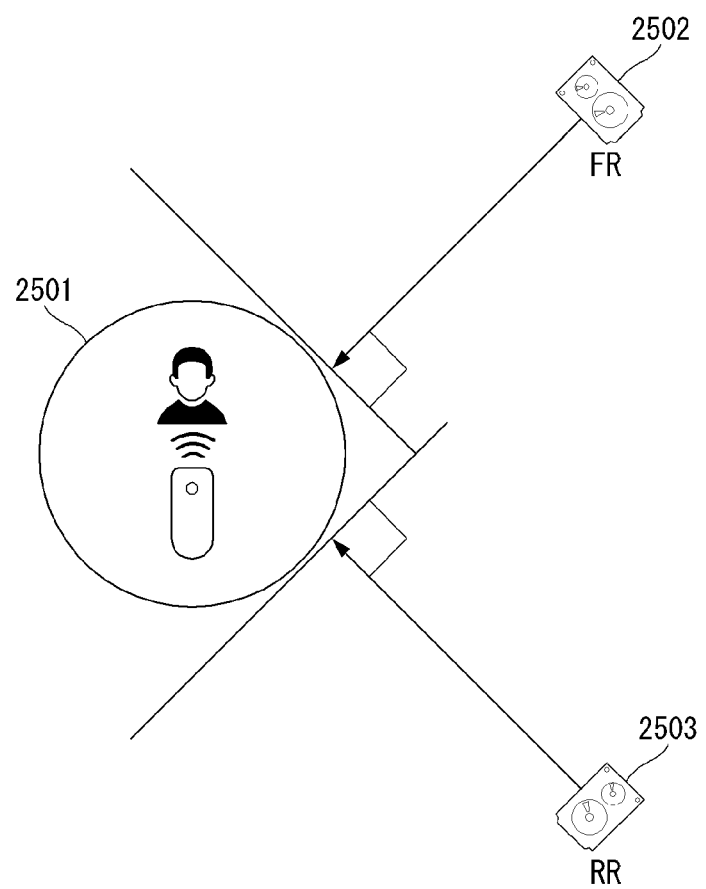

[FIG. 26]
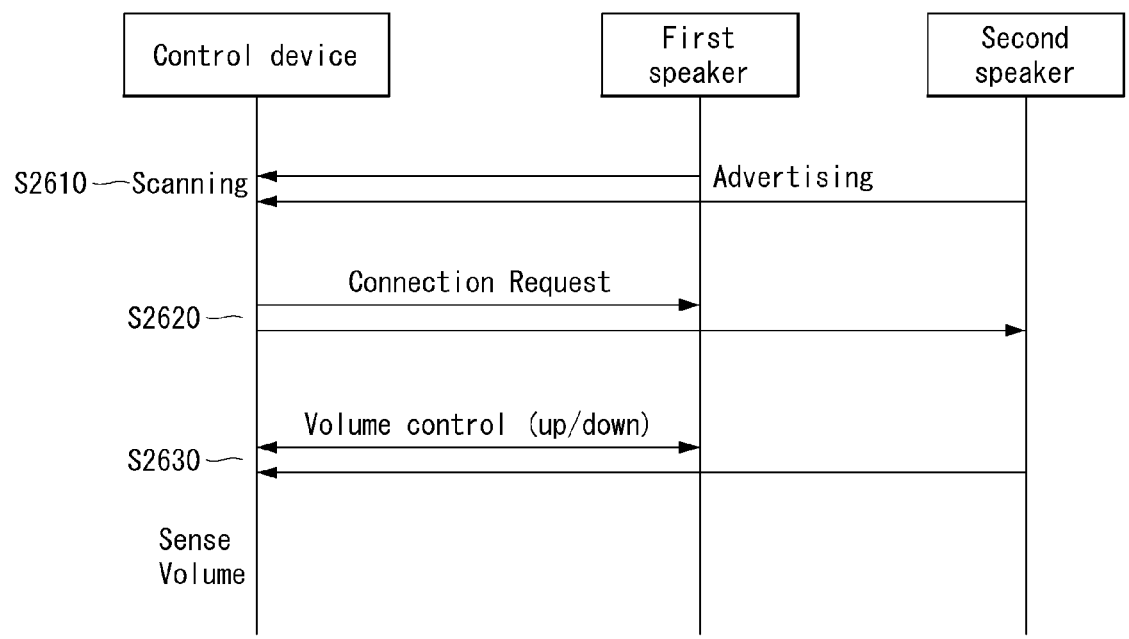

[FIG. 27]
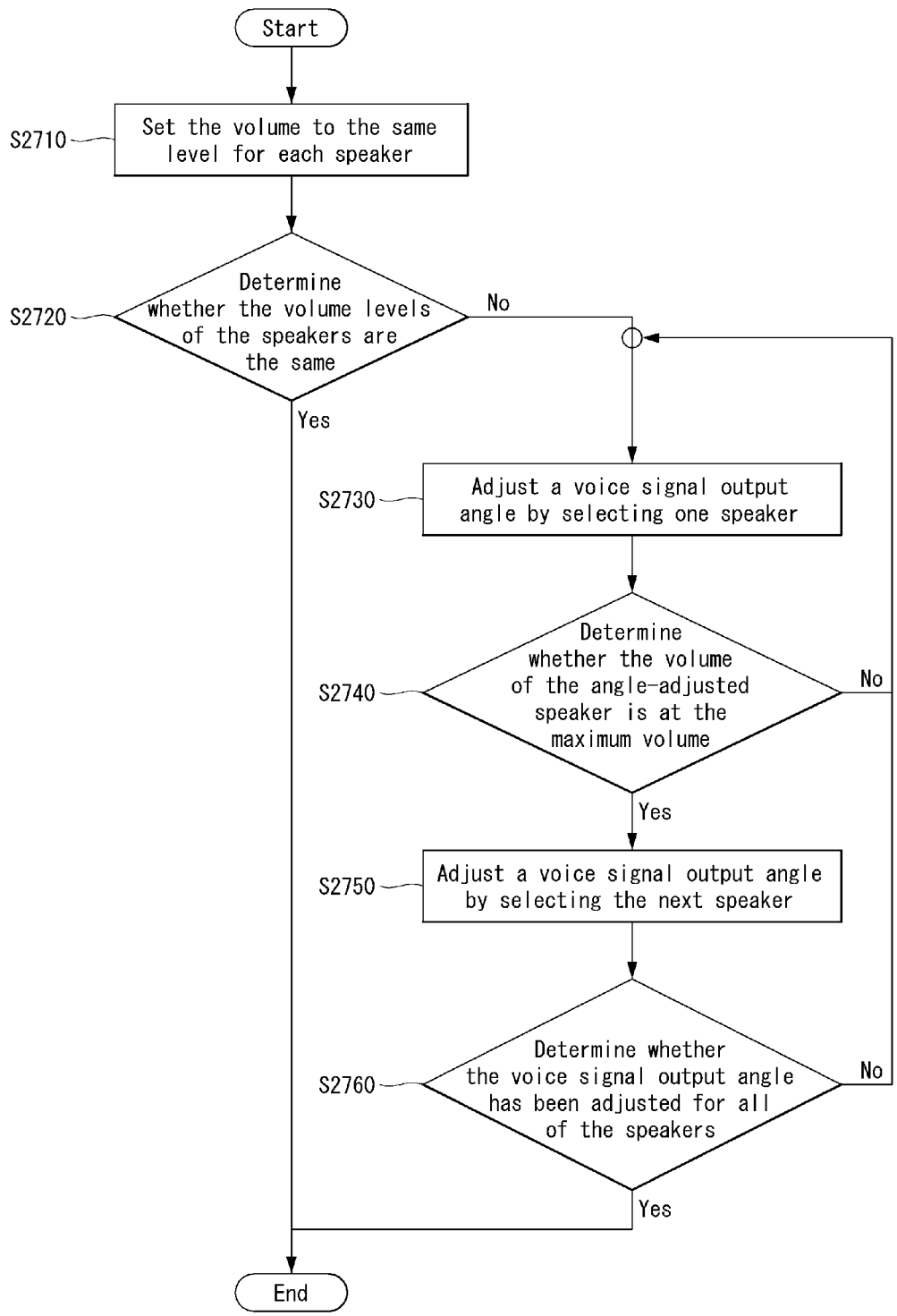

[FIG. 28]
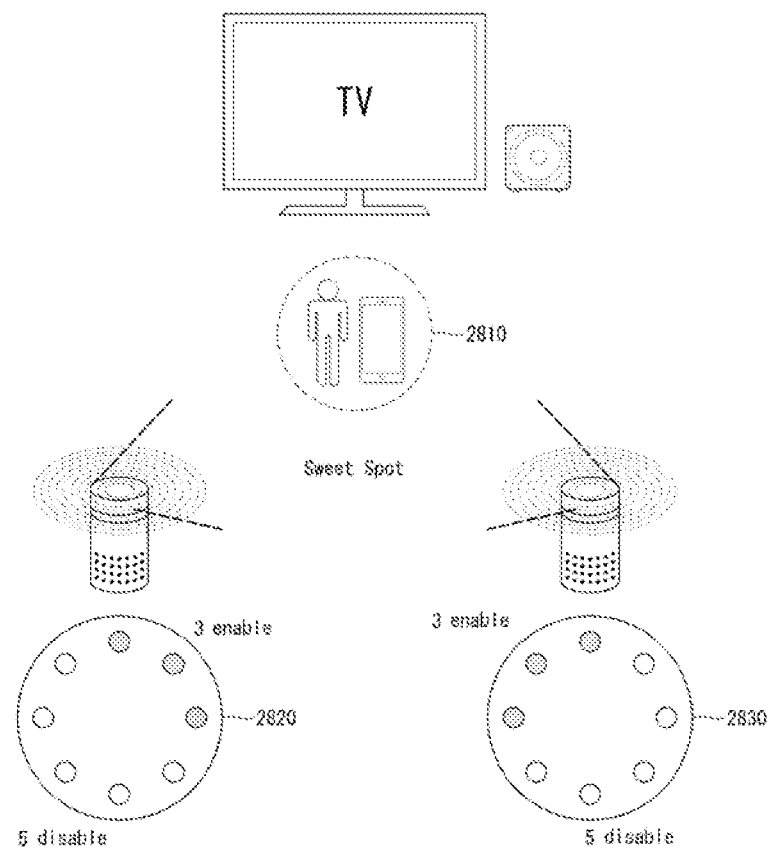

[FIG. 29]
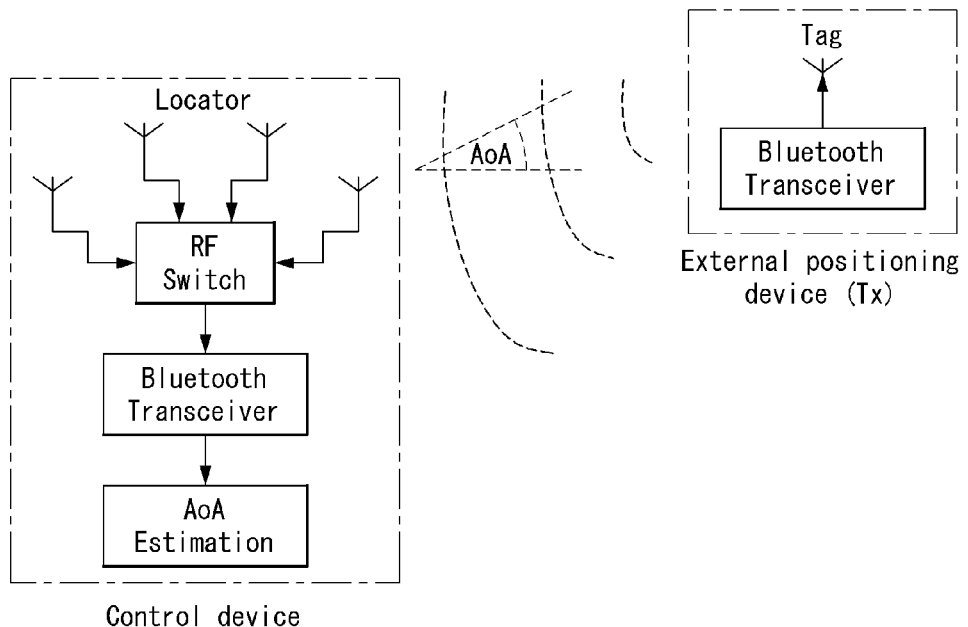
(a)
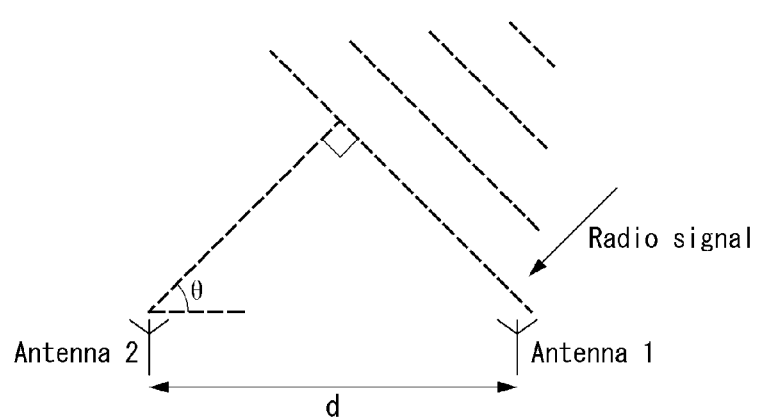
(b)

[FIG. 30]
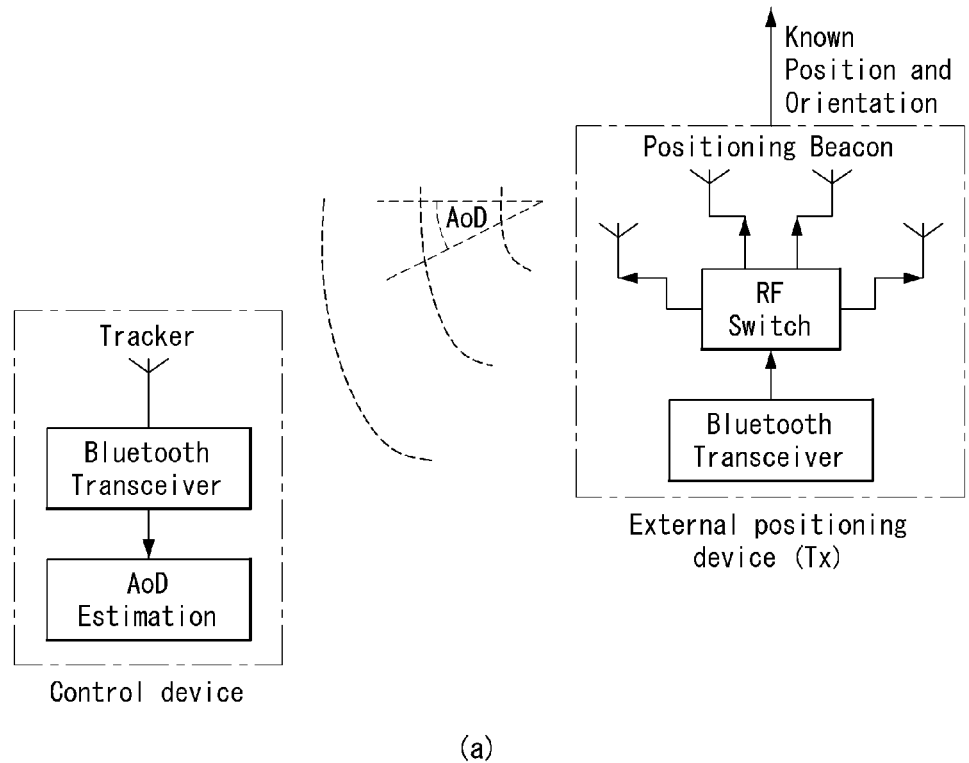
(a)
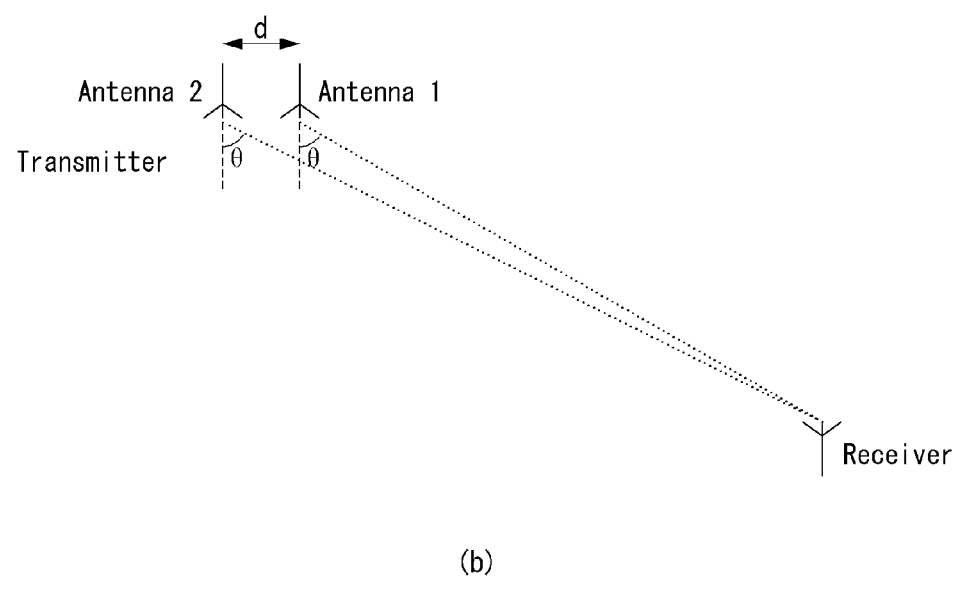
(b)

[FIG. 31]
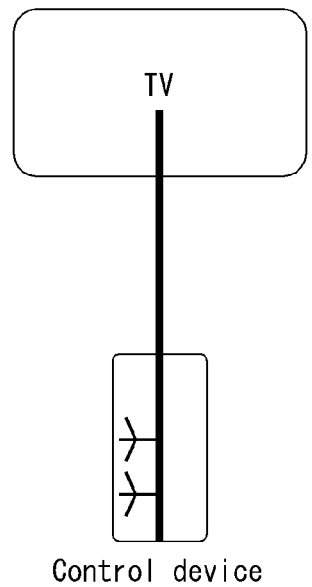
Control device
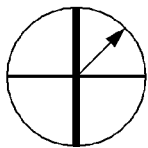
Angle between the
reference point
and the speaker
(−110 degrees)
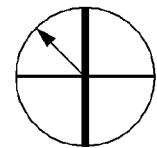
Angle between the
reference point
and the speaker
(110 degrees)

[FIG. 32]
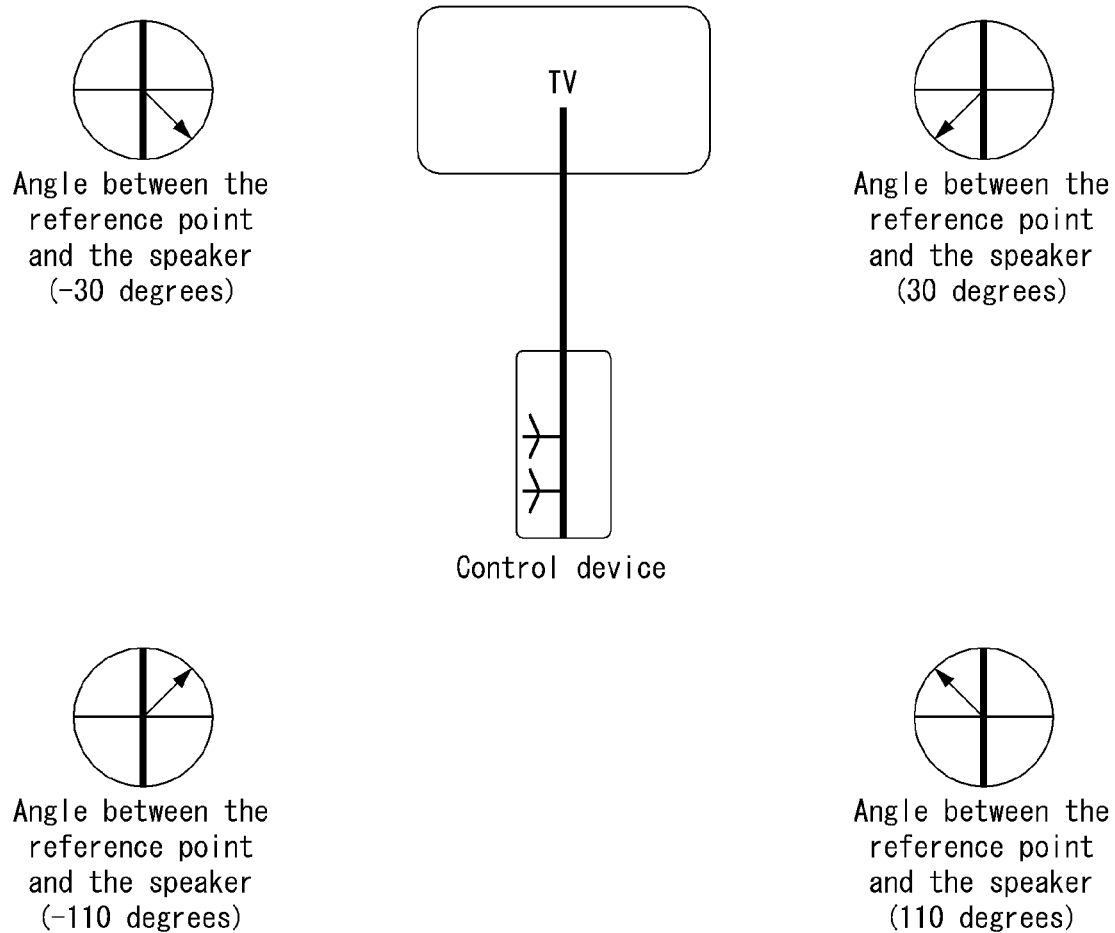

[FIG. 33]
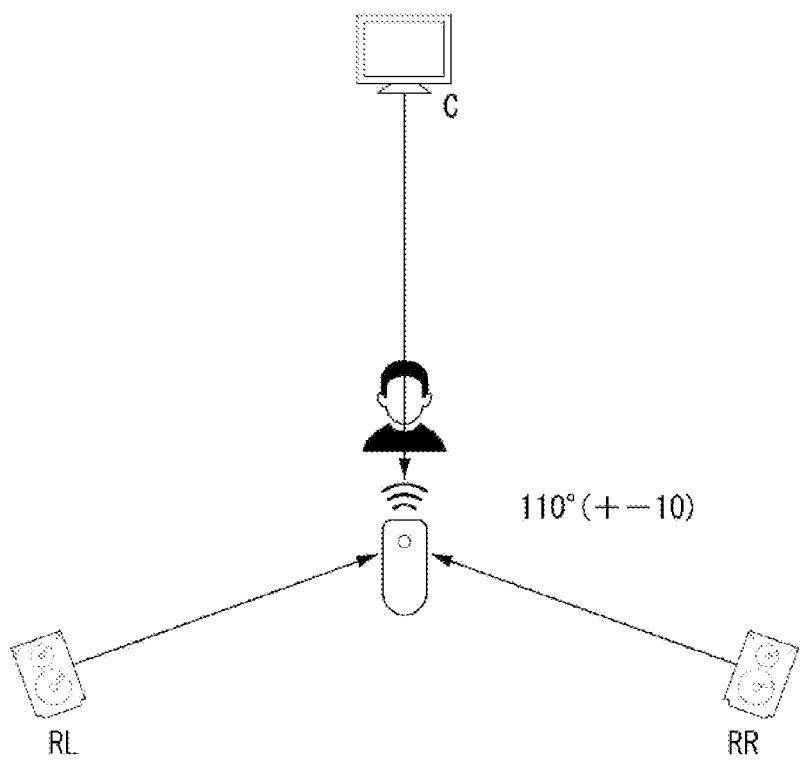

[FIG. 34]
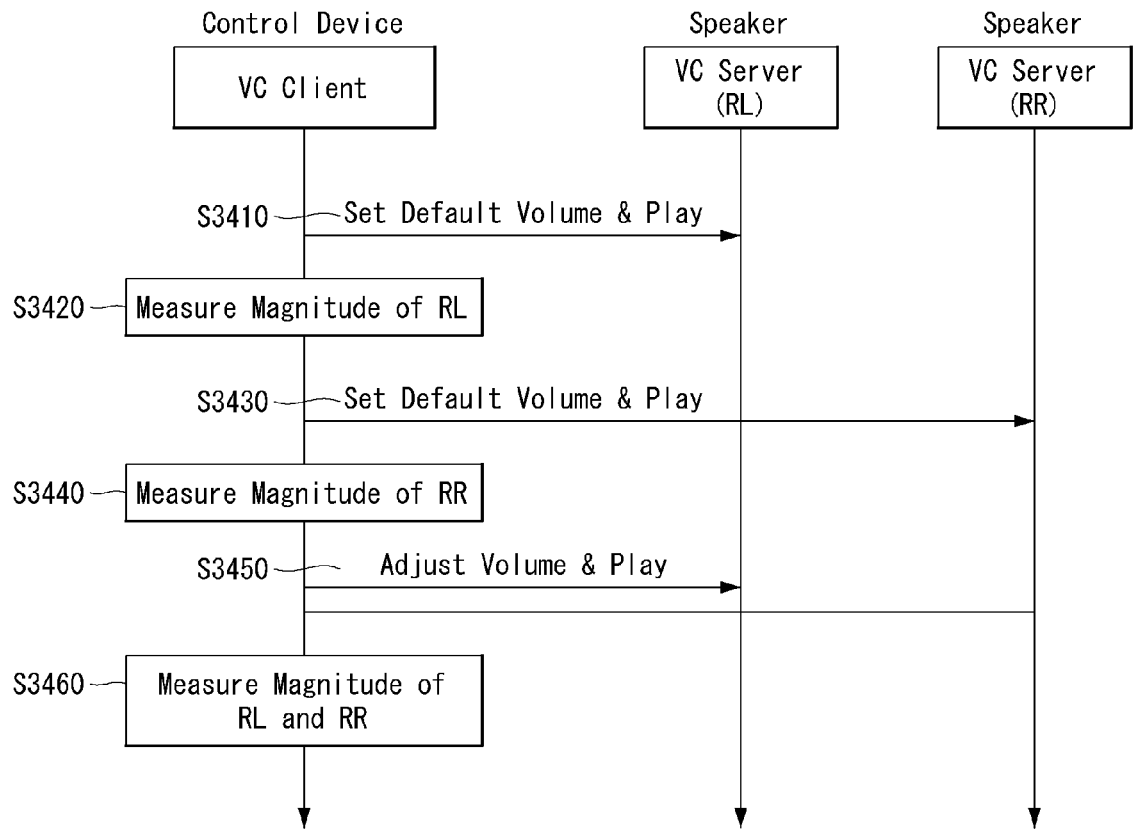
[FIG. 35]
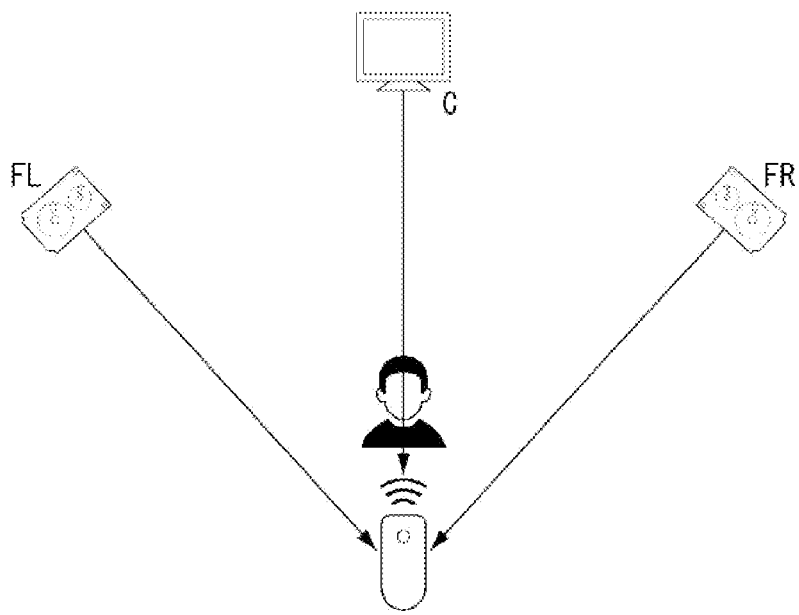

[FIG. 36]
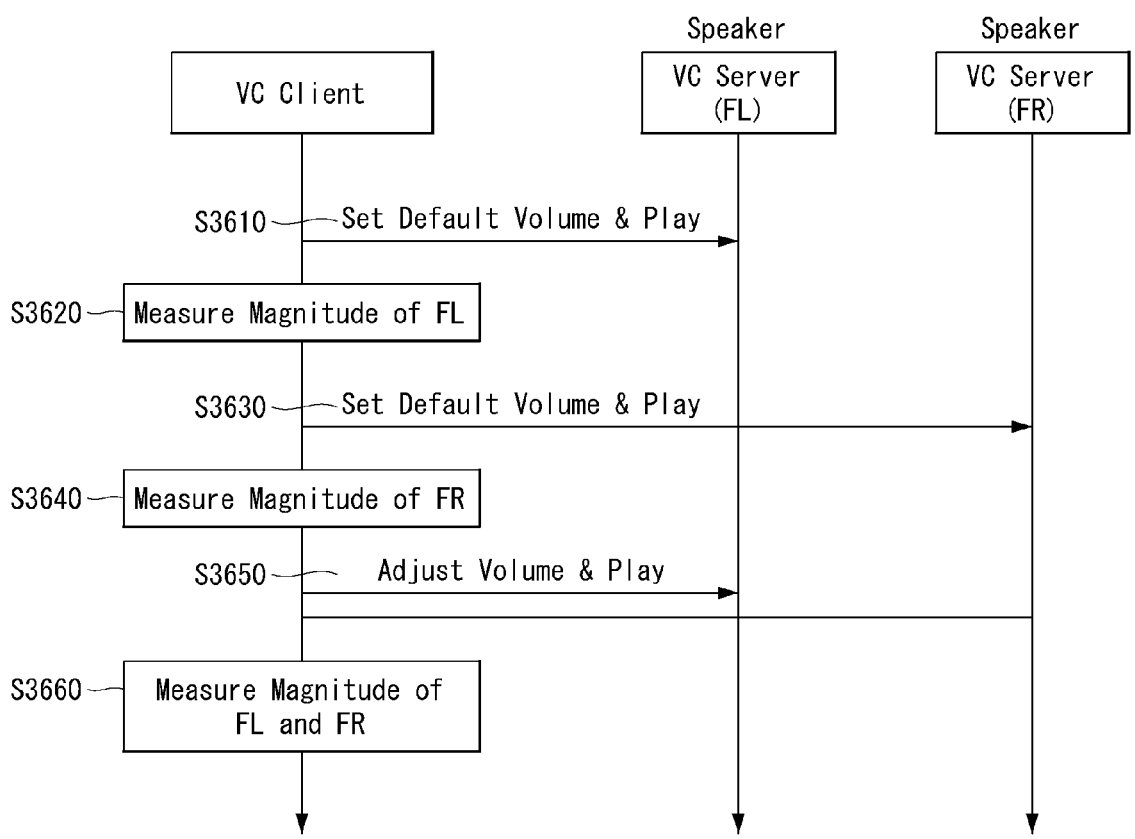

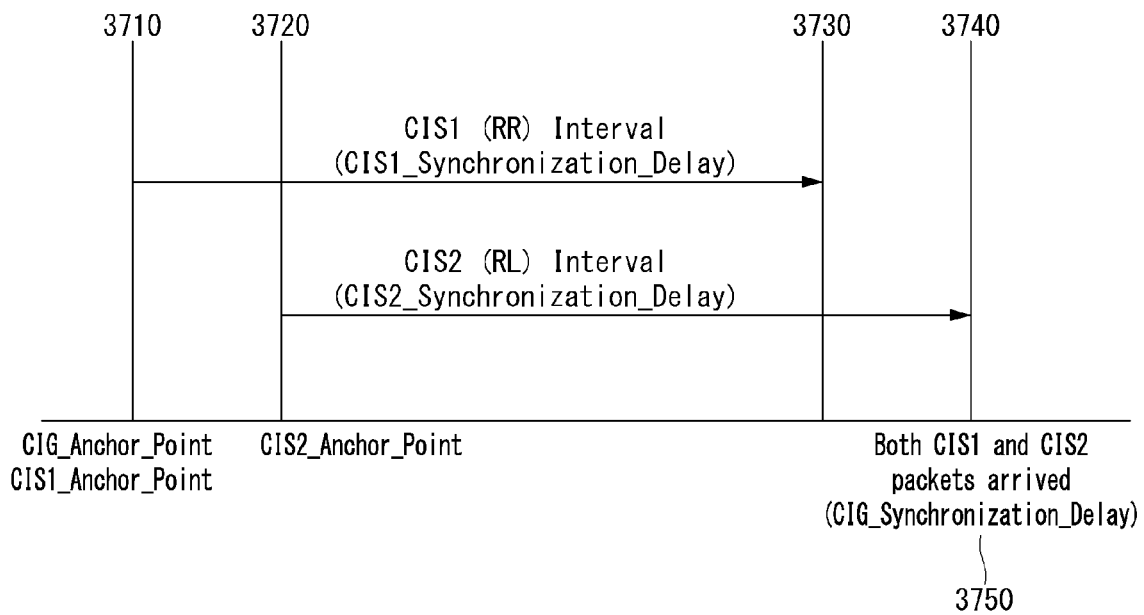
[FIG. 37]

[FIG. 38]
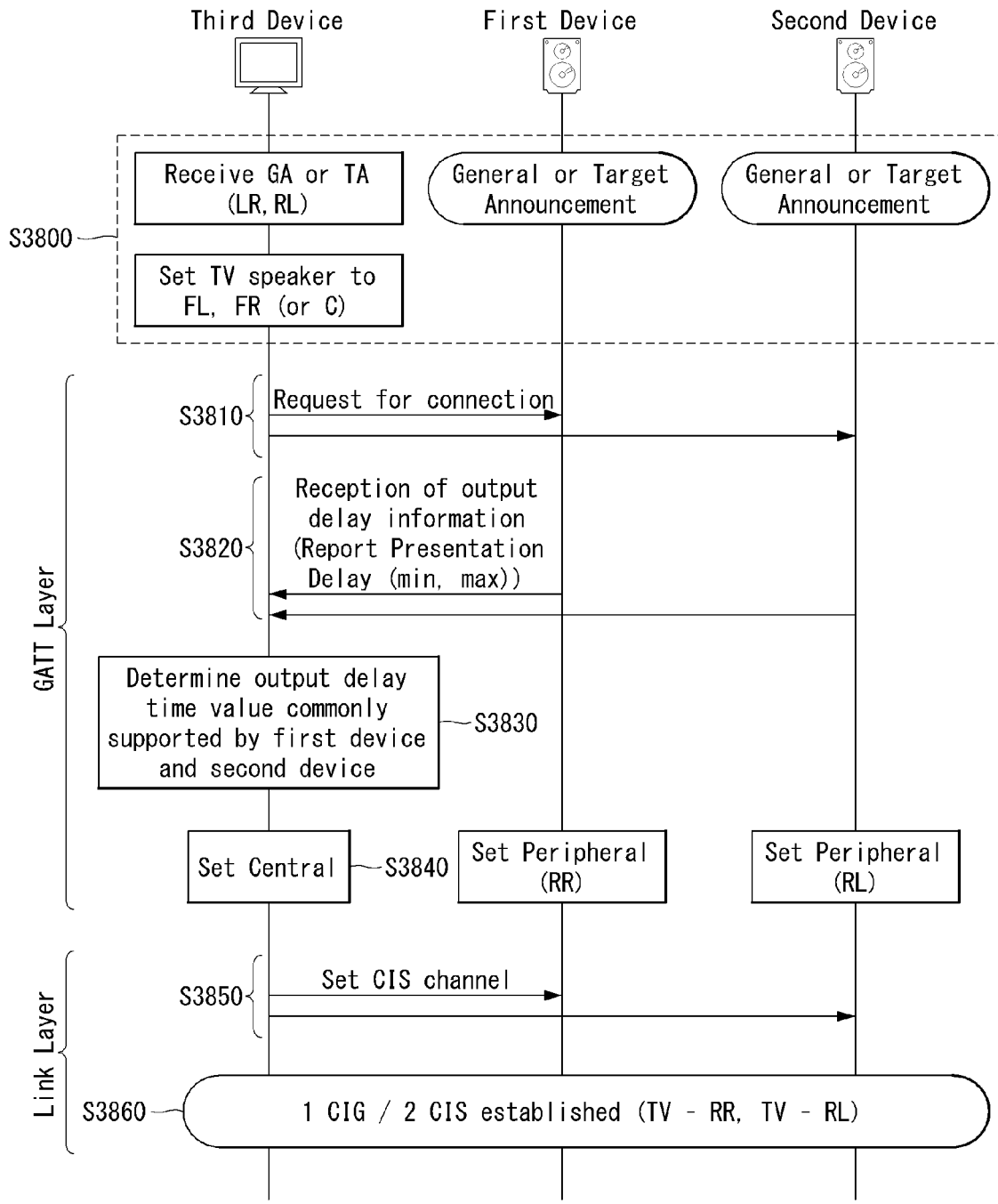

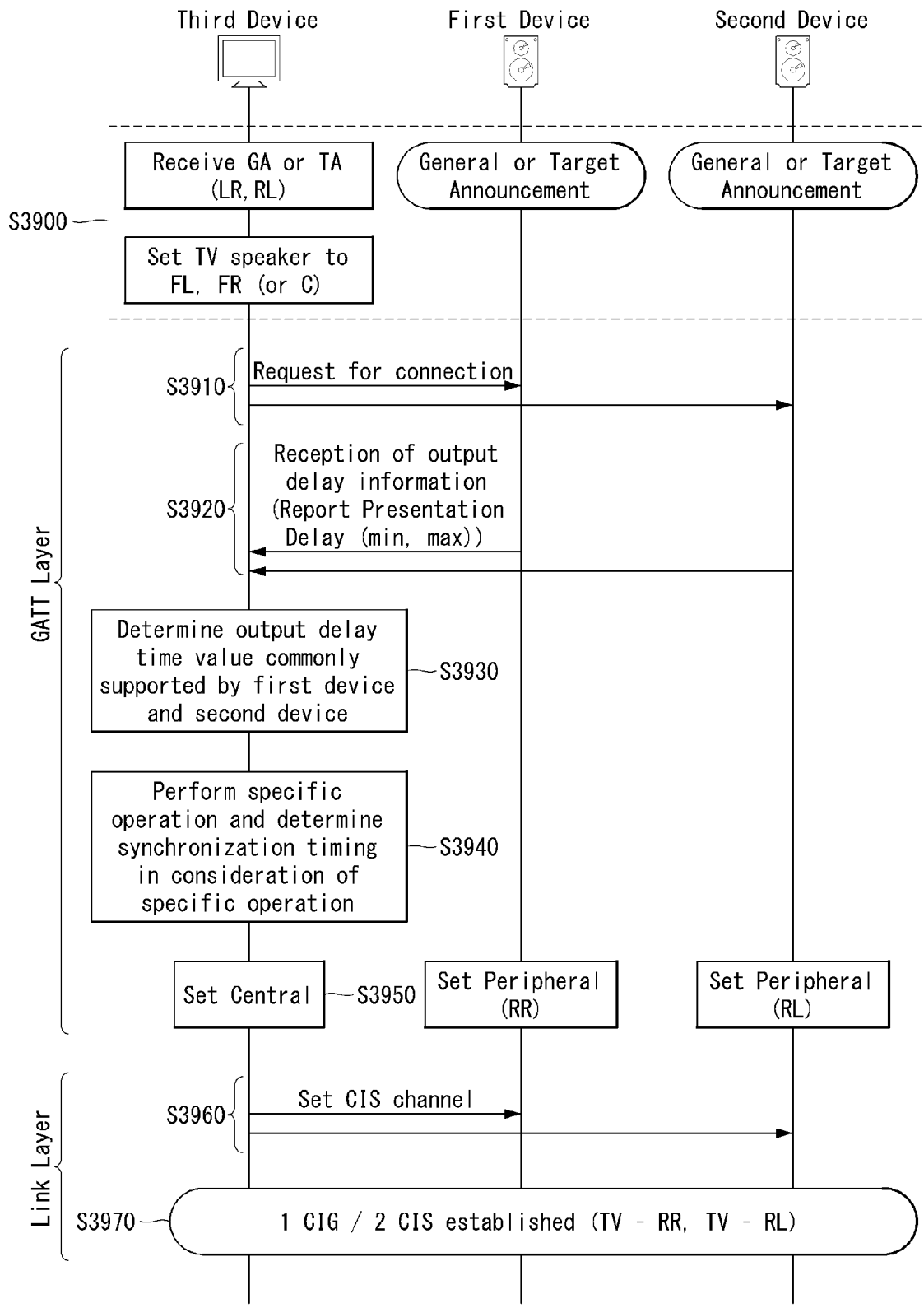
[FIG. 39]

[FIG. 40]
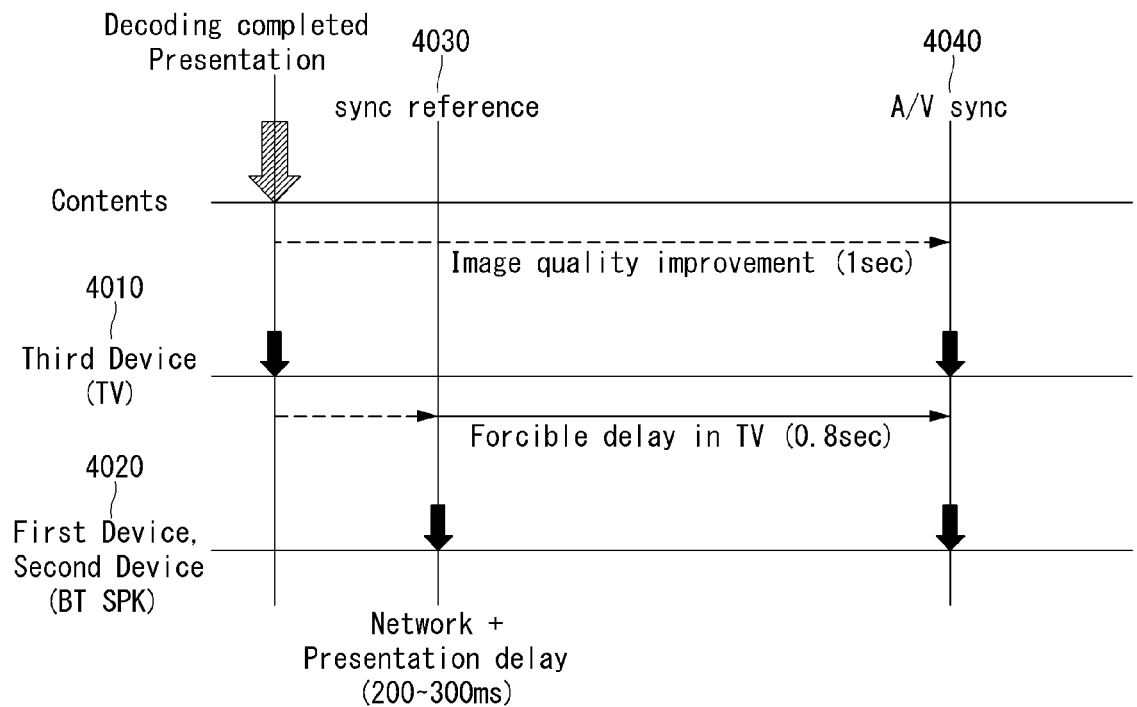
[FIG. 41]
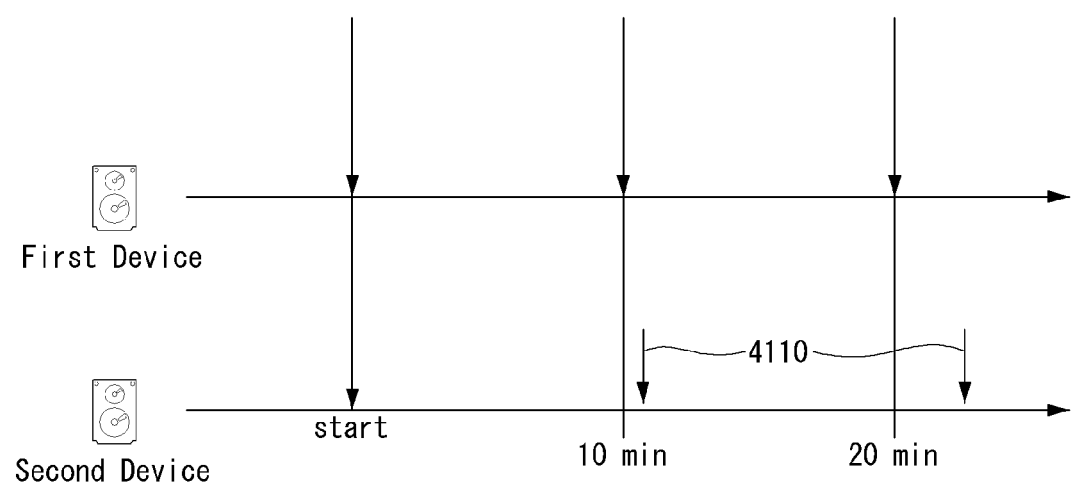

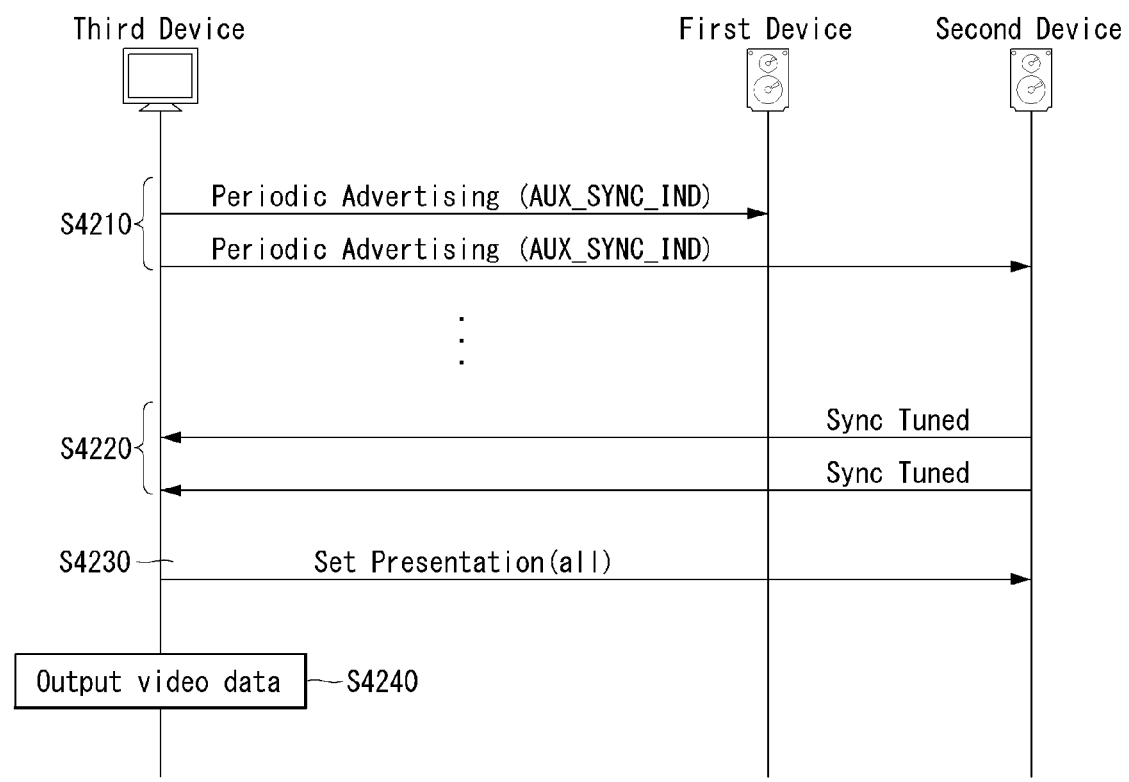
[FIG. 42]

[FIG. 43]
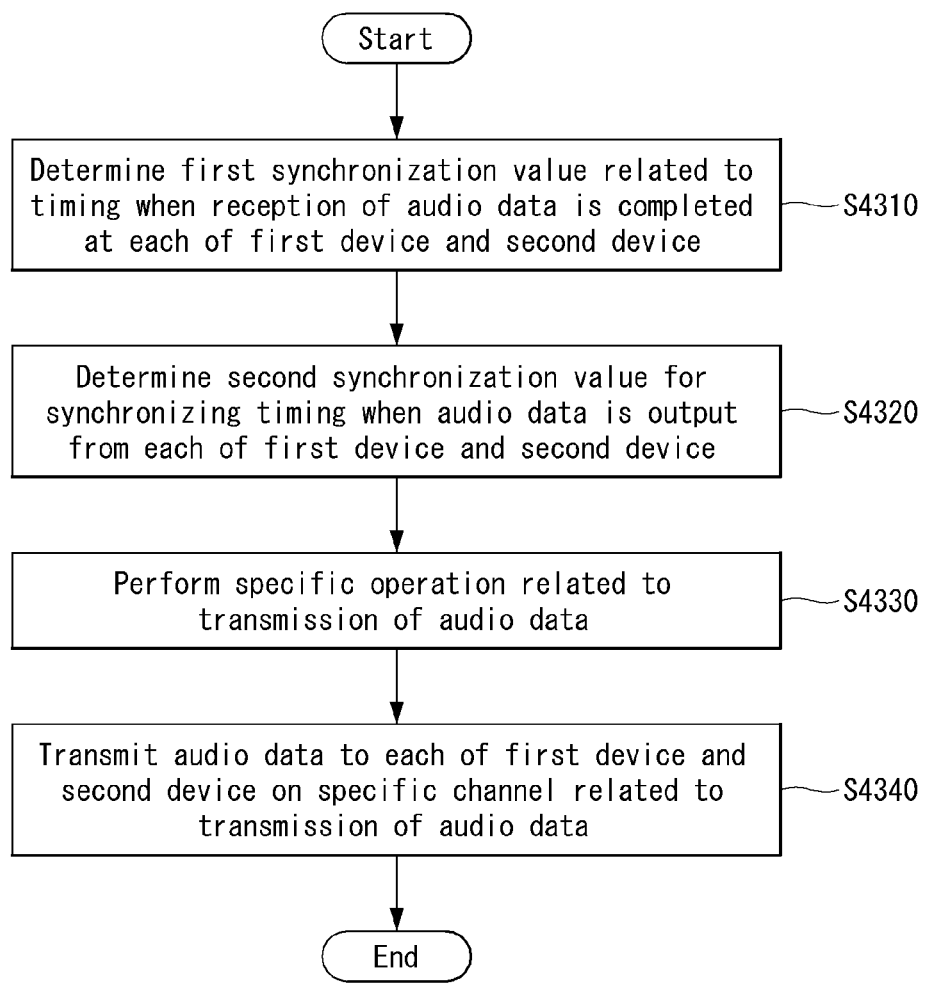

AUDIO DATA TRANSMISSION METHOD USING SHORT-RANGE WIRELESS COMMUNICATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2020/009149, filed on Jul. 10, 2020, which claims the benefit of earlier filing date and right of priority to Korean Application No. 10-2019-0083451, filed on Jul. 10, 2019, the contents of which are hereby incorporated by reference herein in their entireties.

TECHNICAL FIELD

The present disclosure relates to a wireless communication system, and more particularly, to a method and an apparatus for transmitting audio data using short-range wireless communication.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

An object of the present disclosure is to provide a method and an apparatus for receiving a voice signal using Bluetooth low energy in a wireless communication system.

Also, an object of the present disclosure is to provide a method and an apparatus for a control device to adjust the position of at least one device to receive a voice signal in a wireless communication system.

Also, an object of the present disclosure is to provide a method and an apparatus for a control device to adjust an angle between the positions of the control device and at least one device to receive a voice signal in a wireless communication system.

Also, an object of the present disclosure is to provide a method and an apparatus for a control device to adjust a voice signal output angle at which at least one device outputs a voice signal to receive the voice signal in a wireless communication system.

Also, an object of the present disclosure is to provide a method and an apparatus for a third device to transmit audio data in a wireless communication system.

Also, an object of the present disclosure is to provide a method and an apparatus for a third device to synchronize audio data output timings of devices in a wireless communication system.

Objects of the present disclosure are not limited to the above-mentioned objects. That is, other objects that are not mentioned may be obviously understood by those skilled in the art to which the present disclosure pertains from the following description.

Technical Solution

The present disclosure provides a method for a third device to transmit audio data in a short-range wireless communication system and apparatus therefor.

Specifically, in the present disclosure, A method for a third device to transmit audio data in a short-range wireless communication system, the method comprising: determining a first synchronization value related to a timing when audio data reception is completed at each of a first device and a second device; determining a second synchronization value for synchronizing a timing when the audio data is output from each of the first device and the second device, wherein a first synchronization reference timing is determined based on the first synchronization value and the second synchronization value; performing a specific operation related to transmission of the audio data; and transmitting the audio data to each of the first device and the second device on a specific channel related to the transmission of the audio data, wherein the audio data is transmitted based on (i) the first synchronization reference timing and (ii) a second synchronization reference timing determined based on a specific time value required to perform the specific operation.

Furthermore, in the present disclosure, wherein the first synchronization reference timing is a point in time later by a sum of the first synchronization value and the second synchronization value from a specific reference timing configured in the third device for determining a synchronization reference timing.

Furthermore, in the present disclosure, wherein the specific reference timing is a point in time at which decoding of video data related to the audio data is completed at the third device and preparation for outputting the video data is completed.

Furthermore, in the present disclosure, wherein based on that the sum of the first synchronization value and the second synchronization value is smaller than the specific time value required to perform the specific operation, the second synchronization reference timing is determined as a point in time later by the specific time value required to perform the specific operation from the specific reference timing.

Furthermore, in the present disclosure, wherein based on that the sum of the first synchronization value and the second synchronization value is greater than or equal to the specific time value required to perform the specific operation,
the second synchronization reference timing is determined as a point in time equal to the first synchronization reference timing.

Furthermore, in the present disclosure, wherein a transmission timing of the audio data of a case that the sum of the first synchronization value and the second synchronization value is smaller than the specific time value required to perform the specific operation is a point in time delayed as much as a difference value between (i) the specific time value required to perform the specific operation and (ii) the sum of the first synchronization value and the second synchronization value, than a transmission timing of the audio data of a case that the sum of the first synchronization value and the second synchronization value is greater than or equal to the specific time value required to perform the specific operation.

Furthermore, in the present disclosure, wherein based on that the sum of the first synchronization value and the second synchronization value is smaller than the specific time value required to perform the specific operation,
the audio data transmitted by the third device is output by each of the first device and the second device at the second synchronization reference timing, which is determined as a point in time later by the specific time value required to perform the specific operation from specific reference timing, and
wherein based on that the sum of the first synchronization value and the second synchronization value is greater than or equal to the specific time value required to perform the specific operation,
wherein the audio data transmitted by the third device is output from each of the first device and the second device at the second synchronization reference timing determined as a point in time equal to the first synchronization reference timing.

Furthermore, in the present disclosure, wherein determining the second synchronization value comprises: receiving, from the first device, first output delay time information related to a range of an output delay time required from an audio data decoding start timing of the first device to an audio data output timing; receiving, from the second device, second output delay time information related to a range of an output delay time required from an audio data decoding start timing of the second device to an audio data output timing; and determining the second synchronization value based on the first output delay time information and the second output delay time information.

Furthermore, in the present disclosure, wherein based on that the range of the output delay time of the first device and that range of the output delay time of the second device overlap by a specific range, and wherein the second synchronization value is determined based on values included in the specific range.

Furthermore, in the present disclosure, further comprising: transmitting a configuration message for configuring the second synchronization value to each of the first device and the second device, and wherein the audio data is decoded and output by each of the first device and the second device based on the second synchronization value.

Furthermore, in the present disclosure, further comprising: periodically transmitting, to the first device and the second device, a specific advertising message for synchronizing timings for the first device and the second device to receive broadcast audio data; receiving, from the first device, a first indication message indicating that a timing for the first device to receive the audio data is synchronized in response to the specific advertising message transmitted to the first device; and receiving, from the second device, a second indication message indicating that a timing for the second device to receive the audio data is synchronized in response to the specific advertising message transmitted to the second device.

Furthermore, in the present disclosure, further comprising: outputting video data related to the broadcast audio date, wherein the vide data is output after both the first indication message and the second indication message are received.

Furthermore, in the present disclosure, wherein the first indication message and the second indication message are transmitted on an advertising channel.

Furthermore, in the present disclosure, further comprising: receiving, from the first device, a first advertising message related to a connection establishment for configuring a multi-channel surround audio system; receiving, from the second device, a second advertising message related to the connection establishment for configuring the multi-channel surround audio system; and establishing a connection with each of the first device and the second device based on the first advertising message and the second first advertising message.

Furthermore, in the present disclosure, wherein the first indication message and the second indication message are received on a channel based on the connection established with each of the first device and the second device.

Furthermore, in the present disclosure, wherein the connection established with each of the first device and the second device is maintained, without being released, for transceiving the first indication message and the second indication message.

Furthermore, in the present disclosure, further comprising: receiving, from the first device, a first message including a first decoder clock reference value, wherein the first decoder clock reference value is used for the first device as a reference for calculating an output delay time required from an audio data decoding start timing to an audio data output timing of the first device; receiving, from the second device, a second message including a second decoder clock reference value, wherein the second decoder clock reference value is used for the second device as a reference for calculating an output delay time required from an audio data decoding start timing to an audio data output timing of the second device; comparing a difference value between the first decoder clock reference value included in the first message and the second decoder clock reference value included in the second message with a specific threshold value; and transmitting, to the first device and the second device, a third message for resetting each of the first decoder clock reference value and the second decoder clock reference value based on a result of the comparison.

Furthermore, in the present disclosure, wherein based on that the difference value between the first decoder clock reference value included in the first message and the second decoder clock reference value included in the second message is greater than the specific threshold value, the first decoder clock reference value and the second decoder clock reference value are reset, and wherein the first message and the second message are repeatedly transmitted at a predetermined interval on a data channel based on the connection established with each of the first device and the second device.

Furthermore, in the present disclosure, wherein the connection established with each of the first device and the second device is maintained, without being released, for transceiving the first message and the second message.

Furthermore, in the present disclosure, A third device transmitting audio date in a short-range wireless communication system, the third device comprising: a transmitter for transmitting a radio signal; a receiver for receiving the radio signal;

and a processor operatively connected to the transmitter and the receiver, wherein the processor is configured to control: to determine a first synchronization value related to a timing when audio data reception is completed at each of a first device and a second device; to determine a second synchronization value for synchronizing a timing when the audio data is output from each of the first device and the second device, and to perform a specific operation related to transmission of the audio data; and the transmitter to transmit the audio data to each of the first device and the second device on a specific channel related to the transmission of the audio data, wherein a first synchronization reference timing is determined based on the first synchronization value and the second synchronization value, and wherein the audio data is transmitted based on (i) the first synchronization reference timing and (ii) a second synchronization reference timing determined based on a specific time value required to perform the specific operation.

Advantageous Effects

The present disclosure provides an effect of receiving a voice signal using Bluetooth low power in a wireless communication system.

Also, the present disclosure provides an effect that a control device may adjust the position of at least one device to receive a voice signal in a wireless communication system.

Also, the present disclosure provides an effect that a control device may adjust the angle between the control device and at least one device to receive a voice signal in a wireless communication system.

Also, the present disclosure provides an effect that a control device may adjust a voice signal output angle at which at least one device outputs a voice signal to receive the voice signal.

Also, the present disclosure provides an effect that a third device may transmit audio data in a wireless communication system.

Also, the present disclosure provides an effect that a third device may synchronize audio data output timings of devices, which output audio data, in a wireless communication system.

The technical effects of the present disclosure are not limited to the technical effects described above, and other technical effects not mentioned herein may be understood to those skilled in the art to which the present disclosure belongs from the description below.

DESCRIPTION OF DRAWINGS

The accompanying drawings, which are included as part of the detailed description to help the understanding of the present invention, provide embodiments of the present invention, and together with the detailed description, describe the technical features of the present invention.

FIG. 1 is a schematic view illustrating an example of a wireless communication system using a Bluetooth low energy technology to which the present disclosure is applicable.

FIG. 2 illustrates an example of an internal block diagram of a device capable of implementing methods proposed by the present disclosure.

FIG. 3 illustrates an example of a Bluetooth communication architecture to which methods proposed by the present disclosure may be applied.

FIG. 4 illustrates an example of a structure of a generic attribute profile (GATT) of Bluetooth low energy.

FIG. 5 is a flowchart showing an example of a connection procedure method in Bluetooth low energy technology to which the present disclosure may be applied.

FIG. 6 illustrates an example of a 5.1 channel surround sound system comprising a TV and speakers.

FIG. 7 illustrates an example of a 5.1 channel surround sound system comprising a TV and speakers.

FIG. 8 illustrates an example of an operation performed between a TV and speakers for providing surround sounds to a user in a 5.1 channel surround sound system.

FIG. 9 is a flow diagram illustrating an example of an operation performed between two speakers and a TV with built-in speakers in a 5.1 channel surround sound system.

FIG. 10 is a flow diagram illustrating an example of an operation performed between two speakers and a TV with built-in speakers in a 5.1 channel surround sound system.

FIG. 11 illustrates examples of a data packet format transmitted through a BIS channel.

FIG. 12 shows an example of an operation performed between two speakers and a TV with built-in speakers for providing surround sounds to a user in a 5.1-channel surround sound system.

FIG. 13 is a flow diagram illustrating an example of an operation performed between three speakers and a TV with built-in speakers in a 5.1 channel surround sound system.

FIG. 14 is an example of an operation performed between three speakers and a TV with built-in speakers for providing surround sounds to a user in a 5.1 channel surround sound system.

FIG. 15 is a flow diagram illustrating an example of an operation performed between five speakers and a TV with built-in speakers in a 5.1 channel surround sound system.

FIG. 16 is a flow diagram illustrating an example of an operation performed between six speakers and a TV without a built-in speaker in a 5.1 channel surround sound system.

FIG. 17 illustrates examples of speaker arrangements in a 5.1 channel surround sound system.

FIG. 18 illustrates examples of sweet spots according to the number of speakers.

FIG. 19 illustrates examples of methods for configuring a reference point in a control device to measure speakers' positions (angles).

FIG. 20 is a flow diagram illustrating examples of operations for measuring an angle between a control device and a speaker performed by the control device to adjust the speaker's position.

FIG. 21 is a flow diagram illustrating an example in which a method for configuring 5.1 surround channels according to the present disclosure is performed.

FIG. 22 illustrates an example of a packet format of an advertisement message used for a control device to measure a speaker's position.

FIG. 23 is a flow diagram illustrating an example in which a control device performs a method for configuring speakers' positions according to the present disclosure.

FIG. 24 is a flow diagram illustrating another example in which a control device performs a method for configuring speakers' positions according to the present disclosure.

FIG. 25 illustrates an example of configuring speakers' audio sound output angles.

FIG. 26 is a flow diagram illustrating an example in which a method for adjusting speakers' audio sound output angles according to the present disclosure is performed between a control device and the speakers.

FIG. 27 is a flow diagram illustrating an example in which a control device performs a method for adjusting speakers' audio sound output angles according to the present disclosure.

FIG. 28 illustrates another example in which a method for adjusting an audio sound output angle of a speaker according to the present disclosure is performed between a control device and speakers.

FIG. 29 illustrates an example in which a control device measures AoA.

FIG. 30 illustrates an example in which a control device measures AoD.

FIG. 31 is a diagram illustrating an example in which a control device performs a method of measuring a position of a speaker and adjusting a voice signal output angle according to the present disclosure.

FIG. 32 is a diagram illustrating another example of in which a control device performs a method of measuring a position of a speaker and adjusting a voice signal output angle according to the present disclosure.

FIGS. 33 and 34 are diagrams illustrating an example in which a control device performs a method for volume balancing between speakers.

FIGS. 35 and 36 are diagrams illustrating another example in which the control device performs a method for volume balancing between speakers.

FIG. 37 shows an example in which a method for synchronization on the network layer is performed.

FIG. 38 shows an example in which a method for synchronization on the application layer is performed.

FIG. 39 is a diagram illustrating another example in which a method for synchronizing audio data output timings of speakers is performed.

FIG. 40 is a diagram illustrating an example of performing a method for synchronization in consideration of a time required for a third device to perform a specific operation.

FIG. 41 is a diagram illustrating an example in which a method for setting a reference timing for calculating an output delay time is performed.

FIG. 42 is a diagram illustrating an example in which a method for determining an output timing of video data related to broadcast audio data is performed.

FIG. 43 is a flowchart illustrating an example of an operation by a third device to perform an audio data transmitting method according to the present disclosure.

MODE FOR DISCLOSURE

In order to help understanding of the present disclosure, the accompanying drawings which are included as a part of the Detailed Description provide embodiments of the present disclosure and describe the technical features of the present disclosure together with the Detailed Description. Like reference numerals principally designate like elements throughout the specification. Further, in describing the present disclosure, a detailed explanation of known related technologies may be omitted to avoid unnecessarily obscuring the subject matter of the present disclosure. Further, it is noted that the accompanying drawings are only for easily understanding the spirit of the present disclosure and it should not be interpreted that the spirit of the present disclosure is limited by the accompanying drawings.

Hereinafter, a method and an apparatus related with the present disclosure will be described in more detail with reference to drawings. In addition, a general term used in the present disclosure should be interpreted as defined in a dictionary or contextually, and should not be interpreted as an excessively reduced meaning. Further, a singular form used in the present disclosure may include a plural form if there is no clearly opposite meaning in the context. In the present application, a term such as "comprising" or "including" should not be interpreted as necessarily including all various components or various steps disclosed in the specification, and it should be interpreted that some component or some steps among them may not be included or additional components or steps may be further included. Suffixes "unit", "module", and "section" for components used in the following description are given or mixed in consideration of easy preparation of the specification only and do not have their own distinguished meanings or roles. The terms "first", "second", and the like are used to differentiate a certain component from other components, but the scope of should not be construed to be limited by the terms.

FIG. 1 is a schematic view illustrating an example of a wireless communication system using a Bluetooth low energy technology to which the present disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

FIG. 2 illustrates an example of an internal block diagram of a device capable of implementing methods proposed by the present disclosure.

As shown in FIG. 2, the server device 110 includes a display unit 111, a user input interface 112, a power supply unit 113, a processor (or controller) 114, a memory unit 115, a Bluetooth interface 116, another interface 117, and a communication unit (or transmission/reception unit) 118.

The display unit 111, user input interface 112, power supply unit 113, processor 114, memory unit 115, Bluetooth interface 116, another interface 117, and communication unit 118 are functionally interconnected so as to perform a method according to an embodiment of the present disclosure.

Furthermore, the client device 120 includes a display unit 121, a user input interface 122, a power supply unit 123, a processor 124, a memory unit 125, a Bluetooth interface 126, and a communication unit (or transmission/reception unit) 127.

The display unit 121, user input interface 122, power supply unit 123, processor 124, memory unit 125, Bluetooth interface 126, and communication unit 127 are functionally interconnected so as to perform a method according to an embodiment of the present disclosure.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored.

The processor 114, 124 refers to a module for controlling an overall operation of the server device 110 or the client device 120, and controls the server device or the client device in order in order to request the transmission of a message through the Bluetooth interface or other interface and to process a received message.

The processors 114 and 124 may be represented by a control section, a control unit, a controller, and the like.

The processors 114 and 124 may include an application-specific integrated circuit (ASIC), another chipset, a logic circuit, and/or a data processing device.

The processors 114 and 124 control the communication unit to receive an Advertisement message from the server device 110, transmit a Scan Request message to the server device 110, control the communication unit to receive a Scan Response message from the server device 110 in response to the scan request, and control the communication unit to transmit a Connect Request message to the server device 110 in order to establish a Bluetooth connection with the server device 110.

In addition, after a Bluetooth LE connection is established through the connection procedure, the processors 114 and 124 control the communication unit so as to read or write data from or in the server device 110 using an attribute protocol.

The memory units 115 and 125 may include a read-only memory (ROM), a random access memory (RAM), a flash memory, a memory card, a storage medium, and/or other storage devices.

The communication units 118 and 127 may include a baseband circuit for processing a radio signal. When the embodiment is implemented by software, the aforementioned technique may be implemented by a module (a process, a function, and the like) that performs the aforementioned function. The module may be stored in the memory unit and executed by the processor.

The memory units 115 and 125 may be positioned inside or outside the processors 114 and 124 and connected with the processors 114 and 124 by various well-known means.

The display units 111 and 121 refer to modules for providing state information of the device and message exchange information to the user through a screen.

The power supply units 113 and 123 refer to modules that receive external power and internal power under the control of the control unit and supply power required for operating each of the components.

As described above, the BLE technology may have a small duty cycle and significantly reduce power consumption through low data rate.

FIG. 3 illustrates an example of a Bluetooth communication architecture to which methods proposed by the present disclosure may be applied.

Specifically, FIG. 3 illustrates an example of an architecture of Bluetooth low energy (LE).

As shown in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth specification using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: A method for providing an alarm service according to the distance.

Proximity: A method for exchanging battery information.

Time: A method for exchanging time information

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption may be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE specification, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices may scan the discoverable device through an advertising (or broadcast) physical channel.

Both of the discovering device and the discoverable device may already have been connected to other Bluetooth devices in a piconet Connecting Procedure A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters a connection state when the device performing the connection request, i.e., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type field of an advertising channel included in the header supports PDU types defined in Table 1 below.

TABLE 1

| PDU Type | PDU Name | Channel | Permitted PHYs | | |
|---|---|---|---|---|---|
| | | | LE 1M | LE 2M | LE Coded |
| 0000b | ADV_IND | Primary Advertising | • | | |
| 0001b | ADV_DIRECT_IND | Primary Advertising | • | | |
| 0010b | ADV_NONCONN_IND | Primary Advertising | • | | |
| 0011b | SCAN_REQ | Primary Advertising | • | | |
| | AUX_SCAN_REQ | Secondary Advertising | • | • | • |
| 0100b | SCAN_RSP | Primary Advertising | • | | |
| 0101b | CONNECT_IND | Primary Advertising | • | | |
| | AUX_CONNECT_REQ | Secondary Advertising | • | • | • |
| 0110b | ADV_SCAN_IND | Primary Advertising | • | | |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by the present disclosure.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.
- handle: Address of attribute
- Type: Type of attribute
- Value: Value of attribute
- Permission: Access authority to attribute FIG. 5 is a flowchart showing an example of a connection procedure method in Bluetooth low power energy technology to which the present disclosure may be applied.

A server transmits to a client an advertisement message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smartphone, etc.

As described above, in Bluetooth, communication is performed over a total of 40 channels through the 2.4 GHz band. Three channels among 40 channels as the advertising channels are used for exchanging sent and received for establishing the connection, which include various advertising packets.

The remaining 37 channels are used for data exchange after connection to the data channel.

The client may receive the advertisement message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.
- Temporary Key: Key made for creating the STK
- Short Term Key (LTK): Key value used for making encrypted connection between devices When the secure connection is performed in Phase 2, a 128-bit long term key (LTK) is generated.
- Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

A 5.1-channel surround sound system refers to a six-channel surround sound audio system using six speakers. The 5.1-channel surround sound system uses five full-band channels and one low-frequency effect channel.

Recently, contents supported through a 5.1-channel surround sound system (for example, Bluray discs or streaming contents such as Netflix) are increasing. However, to use the 5.1-channel surround sound system, a user has to install six speakers directly, making it difficult to utilize the 5.1-channel surround sound system actively.

More specifically, a user does not always have to configure the 5.1-channel surround sound system but only needs to configure the 5.1-channel surround sound system when watching contents. Therefore, when a user, who has not configured the 5.1-channel surround sound system, attempts to configure the 5.1-channel surround sound system to use the 5.1-channel surround sound system, the user has to arrange six speakers to specific positions for normal operation of the 5.1 channel surround sound system. In other words, among the six 5.1-channel surround speakers, guidelines for specific positions of the speakers on the user's left and right sides are as follows.
- Front left (FL) speaker: The angle between a TV, a listener, and the speaker should satisfy 30 degrees.
- Front right (FR) speaker: The angle between the TV, the listener, and the speaker should satisfy 30 degrees.
- Rear left (RL) speaker: The angle between the TV, the listener, and the speaker should satisfy 110 degrees.
- Rear right (RR) speaker: The angle between the TV, the listener, and the speaker should satisfy 110 degrees.

Also, besides the condition that the TV, the listener's position, and the speakers should satisfy specific angles, the incidence angle at which the speakers' sounds reach the user should be perpendicular to the user.

Due to the problem above, the user often uses a soundbar or only two speakers instead of configuring the 5.1-channel surround sound system. Accordingly, the user has inevitably to listen to the contents at a lower sound quality than when watching the contents through the 5.1-channel surround sound system.

To solve the problem above, the present disclosure provides a method for configuring a 5.1 channel surround sound system through a portable Bluetooth speaker that a user may conveniently use. In other words, the user may configure the 5.1 channel surround sound system by adjusting the positions of speakers constituting the 5.1-channel surround sound system through a control device.

More specifically, the present disclosure provides a method (method 1) for installing a speaker at a correct position (angle) using the Bluetooth Direction Finding technology.

Also, the present disclosure uses Bluetooth Low Energy Audio Volume control and Mic Sensing techniques to provide a method (method 2) for adjusting the output angle of sounds from a speaker to make the sounds incident at a right angle to the user. The audio sound may be a sound that a user may audibly perceive.

In addition, through the above (Method 1) to (Method 2), even if the positions of the speakers and the angle of incidence of the voice signals output from the speakers to the control device are adjusted, the volume (magnitude) of each voice signal received from the control device may vary. In particular, due to the difference in performance between the speakers, the volume of a voice signal received from the control device may vary even if the speakers are set to have the same volume. That is, when the volume for the speakers can be set in a range of 0 to 100, the volume for all the speakers is adjusted to 50, but the magnitude of a voice signal received from the control device may vary due to the difference in performance between the speakers. In this case, the performance of the 5.1-channel surround audio system to be experienced by a user may be deteriorated.

In order to solve the above problem, the present disclosure proposes a method (Method 3) for volume balancing between speakers in consideration of performance of the speakers, so that voice signals received at the control device can have the same magnitude.

In addition, when the speakers included the 5.1-channel surround sound system are not synchronized, output timings of voice data output from the respective speakers do not coincide with each other. As described above, the discrepancy between the voice data output timings of the speakers is a factor that affects a user's satisfaction with content viewing.

Therefore, in order to solve the above problem, the present disclosure provides a method (method 4) for synchronizing audio data output timings of speakers to match the audio data output timings of the speakers.

Lastly, even in a case where synchronization of the audio data output timings of the speakers is completed in the speakers, timings for the speakers to receive the audio data may not be synchronized. More specifically, a video data outputting device, which outputs video data, may transmit audio data related to the video data to the speakers. In this case, when the timings for the speakers to receive the audio data are not synchronized, the audio data may not be output from the speakers even though the video data is being output from the video data outputting device. That is, at a point in time when the video data outputting device starts to outputting video data, only the video data may be output but audio data related to the video data may not be output.

Therefore, in order to solve the above problems, the present specification provides a method for determining an output timing of video data related to audio data in order to match audio data output timings of speakers with an output timing of video data related to the audio data (Method 5) is provided.

Through the method provided in the present disclosure, a user obtains an advantageous effect that the user may correctly install speakers at the specific positions for driving a 5.1 channel surround sound system compared to the case where the user manually installs the speakers.

In addition, through the method provided in the present disclosure, there is an effect that a user's satisfaction with content viewing increases.

In what follows, for the convenience of description, the positions of speakers for properly driving a 5.1-channel surround sound system may be referred to as "sweet spots." Also, a device used by a user to adjust the positions of the speakers constituting the 5.1-channel surround sound system may be referred to as a "control device," and the (portable) speakers constituting the 5.1-channel surround sound system may be referred to as "peripheral devices" or "devices."

Also, a device that performs an operation for synchronization with speakers for synchronization between the respective speakers may be referred to as a "third device" or the like.

Also, in what follows, for the convenience of description, the audio sound output from a speaker may be referred to as a "voice signal."

In addition to the expression defined above, the terms defined for the description may be expressed in various other ways without departing from the scope of the terms being interpreted in the same context.

Before setting out to explain the methods(method 1 to method 5) of the present disclosure, the 5.1 channel surround sound system will be described first.

FIG. 6 illustrates an example of a 5.1 channel surround sound system comprising a TV and speakers.

Referring to FIG. 6, a block diagram of a TV 610 and speakers 620 and a block diagram 621 of the speakers are shown.

First, the TV 610 includes a video display, an audio decoder and encoder, a controller, and a BLE transmission (Tx) interface. The video display and the audio decoder and encoder are functionally connected to the controller. The audio decoder of the TV 610 receives an audio stream and performs pulse-code modulation (PCM) data decoding for each of the six channels. The audio stream may be a Dolby 5.1 channel stream or a DTS 5.1 channel stream.

PCM streams decoded through PCM data decoding are encoded through LC3, the Bluetooth LE audio codec. The six encoded streams are transmitted to the BLE transmission interface of the TV 610, and the BLE transmission interface may transmit the received six streams to the BLE reception (Rx) interface of the speaker 620.

Next, the six speakers 620 of FIG. 6 constitute a 5.1-channel surround sound system, and the six speakers 620 may include FL, FR, C, RL, RR, and W speakers. The meanings of the abbreviations such as FL and FR are given below.

FL (Front Left): Left
FR (Front Right): Right
C (Center): Center

RL (Rear Left): Left Surround

RR (Rear Right): Right Surround

W (Woofer): Low Frequency Effect

The block diagram 621 of the speaker may be commonly applied to all of the six speakers. The block diagram 621 of the speaker may include a BLE transmission/reception (Tx/Rx) interface, an audio decoder, a speaker driver, and a controller. The BLE transmission/reception interface may be functionally connected to the controller.

FIG. 6 illustrates a case using six speakers. However, if the TV has built-in speakers, the 5.1-channel surround sound system may comprise fewer speakers.

For example, when there are two speakers, depending on the user's selection, the two speakers may be used as a rear left and rear right speakers, and the speakers embedded in the TV may be used as front left and front right speakers.

As another example, when there are three speakers, depending on the user's selection, the three speakers may be used as a rear left, rear right, and woofer speakers, and the speaker embedded in the TV may be used as a front left and front right speakers.

As yet another example, if there are five speakers, depending on the user's selection, the five speakers may be used as a rear left, rear right, woofer, front left, and front right speakers, and the speaker embedded in the TV may not be used or used as a center speaker.

As shown in FIG. 6, when there are six speakers, depending on the user's selection, the six speakers are used as a rear left, rear right, woofer, front left, front right, and center speakers, and the speaker embedded in the TV is may not be used.

Also, external speakers may still be used as a left, right, and woofer speakers for the case of a 2 or 2.1 channel sound system rather than the surround sound system.

FIG. 7 illustrates an example of a 5.1 channel surround sound system comprising a TV and speakers, and FIG. 8 illustrates an example of an operation performed between a TV and speakers for providing surround sounds to a user in a 5.1 channel surround sound system.

Referring to FIG. 7, a block diagram 710 of a TV and a block diagram 720 of a speaker are shown.

First, the block diagram 710 of the TV may include an audio decoder and encoder 711 and a BLE transmission (TX) interface 712.

The block diagram of the speaker may include a BLE transmission/reception (Tx/Rx) interface 722, an audio decoder 721, and a speaker driver 723.

Referring to FIG. 8(*a*), the audio decoder 711-1 of the TV receives an audio stream and performs pulse-code modulation (PCM) data decoding for each of the six channels. The audio stream may be a Dolby 5.1 channel stream or a DTS 5.1 channel stream. The audio decoder 711-1 may be a Dolby 5.1 channel decoder.

PCM streams decoded through PCM data decoding are encoded through the encoder 711-2 of the TV. The encoder 711-2 of the TV may be an LC3 encoder. The encoded six streams are delivered to the BLE transmission interface 712 of the TV. The BLE transmission interface 712 may group the received six streams (Connected Isochronous Stream (CIS)) into one stream group (Connected Isochronous Group (CIG)) and transmit the grouped six streams to the BLE reception (Rx) interface 722 of each of the six speakers.

Here, the CIS corresponds to a BLE audio channel between the TV (initiator) and the speaker (acceptor). The CIG corresponds to an audio stream group that groups CISs with the same timing reference.

Referring to FIG. 8(*b*), the BLE Rx interface 722 of each speaker receives one CIS. Next, the BLE Rx interface 722 transmits the received CIS to the decoder 721 of the speaker, and the decoder 721 decodes the CIS and delivers the decoded CIS to the speaker driver 723 of the speaker. The decoder 721 may be an LC3 decoder. The speaker driver 723 outputs the transmitted audio sound of the decoded CIS.

FIG. 9 is a flow diagram illustrating an example of an operation performed between two speakers and a TV with built-in speakers in a 5.1 channel surround sound system.

In FIG. 9, the TV 901 has a built-in FL and FR speakers, and a C speaker may be optionally installed therein. The TV 901 may operate as an initiator, and the speakers may operate as acceptors.

S910: The first speaker 902 and the second speaker 903 transmit advertisement messages using a general announcement (GA) method or a target announcement (TA) method. Here, the GA may refer to an operation method for broadcasting an advertisement message including simple information indicating that a device is ready to receive or provide a specific service. Also, the TA may refer to an operation method for transmitting an advertisement message including information on the role (RR or RL) of a device and decoder performance by setting an address for a specific central device to receive the advertisement message. The TV 901 receives the advertisement message transmitted to the GA or TA from the first speaker 902 and the second speaker 903. Afterward, the TV 901 may set the TV's built-in speakers as the FL, FR, or C speaker in the 5.1-channel surround sound system. The TV 901 may determine the positions of the first speaker 902 and the second speaker 903 based on the advertisement message transmitted through the TA method.

S920: The TV 901 transmits a connection request message to the first speaker 902 and the second speaker 903. After that, the TV 901 may set its role to operate as a central device. When receiving an advertisement message through the TA method in the S910 step, the TV 901 may set the first speaker 902 as a peripheral (RR) based on the advertisement message. Likewise, the TV 901 may set the second speaker 903 as a peripheral (RL) based on the advertisement message. Alternatively, the TV 901 may determine the positions of the first speaker 902 and the second speaker 903 through a published audio capability (PAC) discovery procedure in the connection step with the first speaker 902 and the second speaker 903. The TV 901 may set the role of the first speaker 902 as the peripheral (RR) and the second speaker 903 as the peripheral (RL) based on the determined positions. The S920 step may be performed in the GATT layer.

S930: The TV 901 transmits a message requesting to form a CIS channel to the first speaker 902 and the second speaker 903 respectively to form a CIS channel between the first speaker 902 and the second speaker 903. The CIS channel may be a unicast channel. Here, the TV 901 may correspond to a master device, and the first speaker 902 and the second speaker 903 may correspond to a slave device. Afterward, a first CIS channel may be formed between the TV 902 and the first speaker 902, and a second CIS channel may be formed between the TV 902 and the second speaker 903. And the first CIS channel and the second CIS channel may be grouped into one CIG. The TV 901 may transmit the audio stream of the contents being watched by the user to each of the first speaker 902 and the second speaker 903 through the formed first and second CIS channels using the unicast scheme. The S930 step may be performed in the link layer.

FIG. 10 is a flow diagram illustrating an example of an operation performed between two speakers and a TV with built-in speakers in a 5.1 channel surround sound system.

In FIG. 10, the TV 1001 has a built-in FL and FR speakers, and a C speaker may be optionally installed therein. The TV 1001 may operate as an initiator, and the speakers may operate as acceptors.

S1010: The first speaker 1002 and the second speaker 1003 transmit advertisement messages using a general announcement (GA) method or a target announcement (TA) method. Here, the GA may refer to an operation method for broadcasting an advertisement message including simple information indicating that a device is ready to receive or provide a specific service. Also, the TA may refer to an operation method for transmitting an advertisement message including information on the role (RR or RL) of a device and decoder performance by setting an address for a specific central device to receive the advertisement message. The TV 1001 receives the advertisement message transmitted to the GA or TA from the first speaker 1002 and the second speaker 1003. Afterward, the TV 1001 may set the TV's built-in speakers as the FL, FR, or C speaker in the 5.1-channel surround sound system. The TV 1001 may determine the positions of the first speaker 1002 and the second speaker 1003 based on the advertisement message transmitted through the TA method.

S1020: The TV 1001 transmits a connection request message to the first speaker 1002 and the second speaker 1003. After that, the TV 1001 may set its role to operate as a central device. When receiving an advertisement message through the TA method in the S1010 step, the TV 1001 may set the first speaker 1002 as a peripheral (RR) based on the advertisement message. Likewise, the TV 1001 may set the second speaker 1003 as a peripheral (RL) based on the advertisement message. Alternatively, the TV 1001 may determine the positions of the first speaker 1002 and the second speaker 1003 through a published audio capability (PAC) discovery procedure in the connection step with the first speaker 1002 and the second speaker 1003. The TV 1001 may set the role of the first speaker 1002 as the peripheral (RR) and the second speaker 1003 as the peripheral (RL) based on the determined position. The S1020 step may be performed in the GATT layer.

S1030: The TV 1001 forms a BIS channel between the first speaker 1002 and the second speaker 1003. The CIS channel may be a broadcast channel. Here, the TV 1001 may correspond to a master device, and the first speaker 1002 and the second speaker 1003 may correspond to a slave device. The TV 901 may broadcast the audio stream of the contents being watched by the user to the first speaker 1002 and the second speaker 1003 through the formed BIS channel. The S1030 step may be performed in the link layer.

FIG. 11 illustrates examples of a data packet format transmitted through a BIS channel.

FIG. 11(a) illustrates an example in which a data packet is configured to include two BIS streams in one BIG.

In FIG. 11 (a), when an RR BIS event occurs, a BIS stream is transmitted, which includes an indicator (RR) indicating that the BIS stream is a data packet for the RR speaker, a time stamp, and a sequence number (seq #) in the header and includes an RR channel audio data packet in the payload. When an RL BIS event occurs after some time has passed, a BIS stream is transmitted, which includes an indicator (RL) indicating that the BIS stream is a data packet for the RL speaker, a time stamp, and a sequence number (seq #) in the header and includes an RR channel audio data packet in the payload.

FIG. 11(b) illustrates an example in which a data packet is configured to include one BIS stream in one BIG.

In FIG. 11(b), one BIS includes a header and an audio data packet for each of the RR and RL speakers. Here, each header may include an indicator (RR/RL) indicating that the BIS stream is a data packet for the RR/RL speaker, a time stamp, and a sequence number (seq #).

Table 2 below describes the fields included in the data packet of the PAC format described with reference to FIGS. 9 and 10 and the descriptions of the respective fields.

TABLE 2

| Field | Description |
| --- | --- |
| Direction | This field takes a single value, either Sink or Source. |
| Codec ID | This field takes a single value, which is the codec identifier defined in the Bluetooth Assigned Numbers. |
| Audio Location | List of Audio Locations. This list has a minimum of one entry. Each entry may be a combination of Audio Locations. |
| Channel Mode | List of Channel Modes. This list has a minimum of one entry. |
| Sampling Frequency | List of Sampling Frequencies. This list has a minimum of one entry. |
| Codec-specific parameters | Variable-size codec-specific parameters defined by a profile. May be empty. |
| Content protection type | This field takes a single value, which is the content protection type defined in Bluetooth Assigned Numbers. |
| Content protection type specific value | Variable-size content protection type specific value defined by a profile. May be empty. |

FIG. 12 shows an example of an operation performed between two speakers and a TV with built-in speakers for providing surround sounds to a user in a 5.1-channel surround sound system.

Referring to FIG. 12(a), the audio decoder 1211 of the TV receives an audio stream and performs pulse-code modulation (PCM) data decoding for each of the six channels. The audio stream may be a Dolby 5.1 channel stream or a DTS 5.1 channel stream. The audio decoder 1211 may be a Dolby 5.1 channel decoder.

Among the PCM streams decoded through PCM data decoding, PCM streams FL, FR, C, and W for built-in speakers of the TV may be output through the built-in TV speakers. At this time, PCM streams corresponding to C and W may be downmixed and sent to FL and FR or may be omitted.

Also, the PCM streams for the RL and RR speakers among the PCM streams decoded through PCM data decoding are encoded through the encoder 1213 of the TV. The encoder 1213 of the TV may be an LC3 encoder.

The two encoded streams for the RL and RR speakers are delivered to the BLE Tx interface 1214 of the TV. The BLE Tx interface 1214 groups the received two streams (Connected Isochronous Stream (CIS)) into one stream group (Connected Isochronous Group (CIG)) and transmits the grouped stream to the BLE Rx interface 1221, 1223 of each of the two speakers.

Referring to FIG. 12 (b), the BLE Rx interface 1221, 1223 of each speaker receives the CIS. Next, the BLE Rx interface 1221 of the RL speaker may transmit the received CIS to the decoder 1222 of the RL speaker. The decoder 1222 may decode the CIS and deliver the decoded CIS to the speaker driver of the RL speaker, and the speaker driver may output the CIS. Also, the BLE Rx interface 1223 of the RR speaker may transmit the received CIS to the decoder 1224 of the RR speaker. The decoder 1224 may decode the CIS and deliver the decoded CIS to the speaker driver of the RR speaker, and the speaker driver may output the CIS.

FIG. 13 is a flow diagram illustrating an example of an operation performed between three speakers and a TV with built-in speakers in a 5.1 channel surround sound system.

In FIG. 13, the TV 1301 has a built-in FL and FR speakers, and a C speaker may be optionally installed therein. The TV 1301 may operate as an initiator, and the speakers may operate as acceptors.

S1310: The first speaker 1302, the second speaker 1303, and the third speaker 1304 transmit advertisement messages using a general announcement (GA) method or a target announcement (TA) method. Here, the GA may refer to an operation method for broadcasting an advertisement message including simple information indicating that a device is ready to receive or provide a specific service. Also, the TA may refer to an operation method for transmitting an advertisement message including information on the role (RR, RL, or W) of a device and decoder performance by setting an address for a specific central device to receive the advertisement message. The TV 1301 receives the advertisement message transmitted to the GA or TA respectively from the first speaker 1302, the second speaker 1303, and the third speaker 1304. Afterward, the TV 1301 may set the TV's built-in speakers as the FL, FR, or C speaker in the 5.1-channel surround sound system. The TV 1301 may determine the positions of the first speaker 1302, the second speaker 1303, and the third speaker 1304 based on the advertisement message transmitted through the TA method.

S1320: The TV 1301 transmits a connection request message to the first speaker 1302, the second speaker 1303, and the third speaker 1304. After that, the TV 1301 may set its role to operate as a central device. When receiving an advertisement message through the TA method in the S1310 step, the TV 1301 may set the first speaker 1302 as a peripheral (RR) based on the advertisement message, set the second speaker 1303 as a peripheral (RL), and set the third speaker 1304 as a peripheral (W) based on the advertisement message. Alternatively, the TV 1301 may determine the positions of the first speaker 1302, the second speaker 1303, and the third speaker 1304 through a published audio capability (PAC) discovery procedure in the connection step with the first speaker 1302, the second speaker 1303, and the third speaker 1304. The TV 1301 may set the role of the first speaker 1302 as the peripheral (RR), set the second speaker 1303 as the peripheral (RL), and set the third speaker 1304 as the peripheral (W) based on the determined positions. The S1320 step may be performed in the GATT layer.

S1330: The TV 1301 transmits a message requesting to form a CIS channel to the first speaker 1302, the second speaker 1303, and the third speaker 1304 respectively to form a CIS channel between the first speaker 1302, the second speaker 1303, and the third speaker 1304. The CIS channel may be a unicast channel. Here, the TV 1301 may correspond to a master device, and the first speaker 1302, the second speaker 1303, and the third speaker 1304 may correspond to a slave device. Afterward, a first CIS channel may be formed between the TV 1301 and the first speaker 1302, a second CIS channel may be formed between the TV 1301 and the second speaker 1303, and a third CIS channel may be formed between the TV 1301 and the third speaker 1304. And the first CIS channel, the second CIS channel, and the third CIS channel may be grouped into one CIG. The TV 1301 may transmit the audio stream of the contents being watched by the user to each of the first speaker 1302, the second speaker 1303, and the third speaker 1304 through the formed first, second, and third CIS channels using the unicast scheme. The S1330 step may be performed in the link layer.

FIG. 14 is an example of an operation performed between three speakers and a TV with built-in speakers for providing surround sounds to a user in a 5.1 channel surround sound system.

Referring to FIG. 14(*a*), the audio decoder 1411 of the TV receives an audio stream and performs pulse-code modulation (PCM) data decoding for each of the six channels. The audio stream may be a Dolby 5.1 channel stream or a DTS 5.1 channel stream. The audio decoder 1211 may be a Dolby 5.1 channel decoder.

Among the PCM streams decoded through PCM data decoding, PCM streams FL, FR, and C for built-in speakers of the TV may be output through the built-in TV speakers. At this time, PCM streams corresponding to C may be downmixed and sent to FL and FR or may be omitted.

Also, the PCM streams for the RL, RR, and W speakers among the PCM streams decoded through PCM data decoding are encoded through the encoder 1413 of the TV. The encoder 1413 of the TV may be an LC3 encoder.

The three encoded streams for the RL, RR, and W speakers are delivered to the BLE Tx interface 1414 of the TV. The BLE Tx interface 1414 groups the received three streams (Connected Isochronous Stream (CIS)) into one stream group (Connected Isochronous Group (CIG)) and transmits the grouped stream to the BLE Rx interface 1421, 1423, 1425 of each of the three speakers.

Referring to FIG. 14 (*b*), the BLE Rx interface 1421, 1423, 1425 of each speaker receives the CIS. Next, the BLE Rx interface 1421 of the W speaker may transmit the received CIS to the decoder 1422 of the W speaker. The decoder 1422 may decode the CIS and deliver the decoded CIS to the speaker driver of the RL speaker, and the speaker driver may output the CIS. Also, the BLE Rx interface 1423 of the RL speaker may transmit the received CIS to the decoder 1424 of the RL speaker. The decoder 1424 may decode the CIS and deliver the decoded CIS to the speaker driver of the RL speaker, and the speaker driver may output the CIS. Also, the BLE Rx interface 1425 of the RR speaker may transmit the received CIS to the decoder 1426 of the RR speaker. The decoder 1426 may decode the CIS and deliver the decoded CIS to the speaker driver of the RR speaker, and the speaker driver may output the CIS.

FIG. 15 is a flow diagram illustrating an example of an operation performed between five speakers and a TV with built-in speakers in a 5.1 channel surround sound system.

In FIG. 15, a C speaker may be optionally installed in the TV 1501. The TV 1501 may operate as an initiator, and the speakers may operate as acceptors.

S1510: The first to fifth speakers 1502 to 1506 transmit advertisement messages using a general announcement (GA) method or a target announcement (TA) method. Here, the GA may refer to an operation method for broadcasting an advertisement message including simple information indicating that a device is ready to receive or provide a specific service. Also, the TA may refer to an operation method for transmitting an advertisement message including information on the role (RR, RL, W, FR, or FL) of a device and decoder performance by setting an address for a specific central device to receive the advertisement message. The TV 1501 receives the advertisement message transmitted to the GA or TA respectively from the first to fifth speakers 1502 to 1506. Afterward, the TV 1501 may set the TV's built-in speaker as the C speaker in the 5.1-channel surround sound system. On the other hand, when the TV has no built-in speaker, the TV may not perform the role of a speaker. The TV 1501 may determine the positions of the first to fifth speakers 1502 to 1506 based on the advertisement message transmitted through the TA method.

S1520: The TV 1501 transmits a connection request message to the first to fifth speakers 1502 to 1506. After that, the TV 1501 may set its role to operate as a central device. When receiving an advertisement message through the TA method in the S1510 step, the TV 1501 may set the first to fifth speakers 1502 to 1506 as a peripheral (RR), peripheral (RL), peripheral (W), peripheral (FR), and peripheral (FL) based on the advertisement message. Alternatively, the TV 1501 may determine the positions of the first to fifth speakers 1502 to 1506 through a published audio capability (PAC) discovery procedure in the connection step with the first to fifth speakers 1502 to 1506. The TV 1501 may set the roles of the first to fifth speakers 1502 to 1506 as the peripheral (RR), peripheral (RL), peripheral (W), peripheral (FR), and peripheral (FL) based on the determined positions. The S1520 step may be performed in the GATT layer.

S1530: The TV 1501 transmits a message requesting to form a CIS channel to the first to fifth speakers 1502 to 1506 respectively to form a CIS channel between the first to fifth speakers 1502 to 1506. The CIS channel may be a unicast channel. Here, the TV 1501 may correspond to a master device, and the first to fifth speakers 1502 to 1506 may correspond to a slave device. Afterward, a first CIS channel may be formed between the TV 1501 and the first speaker 1502, a second CIS channel may be formed between the TV 1501 and the second speaker 1503, a third CIS channel may be formed between the TV 1501 and the third speaker 1504, a fourth CIS channel may be formed between the TV 1501 and the fourth speaker 1505, and a fifth CIS channel may be formed between the TV 1501 and the fifth speaker 1506. And the first to fifth CIS channels may be grouped into one CIG. The TV 1501 may transmit the audio stream of the contents being watched by the user to each of the first to fifth speakers 1502 to 1506 through the formed first to fifth CIS channels using the unicast scheme. The S1530 step may be performed in the link layer.

FIG. 16 is a flow diagram illustrating an example of an operation performed between six speakers and a TV without a built-in speaker in a 5.1 channel surround sound system.

In FIG. 16, the TV 1601 may operate as an initiator, and the speakers may operate as acceptors.

S1610: The first to sixth speakers 1602 to 1607 transmit advertisement messages using a general announcement (GA) method or a target announcement (TA) method. Here, the GA may refer to an operation method for broadcasting an advertisement message including simple information indicating that a device is ready to receive or provide a specific service. Also, the TA may refer to an operation method for transmitting an advertisement message including information on the role (RR, RL, W, FR, FL, or C) of a device and decoder performance by setting an address for a specific central device to receive the advertisement message. The TV 1601 receives the advertisement message transmitted to the GA or TA respectively from the first to sixth speakers 1602 to 1607. At this time, since the TV has no built-in speaker, the TV may not perform the role of a speaker. The TV 1601 may determine the positions of the first to sixth speakers 1602 to 1607 based on the advertisement message transmitted through the TA method.

S1620: The TV 1601 transmits a connection request message to the first to sixth speakers 1602 to 1607. After that, the TV 1601 may set its role to operate as a central device. When receiving an advertisement message through the TA method in the S1610 step, the TV 1601 may set the first to sixth speakers 1602 to 1607 as a peripheral (RR), peripheral (RL), peripheral (W), peripheral (FR), peripheral (FL), and peripheral (C) based on the advertisement message. Alternatively, the TV 1601 may determine the positions of the first to sixth speakers 1602 to 1607 through a published audio capability (PAC) discovery procedure in the connection step with the first to sixth speakers 1602 to 1607. The TV 1501 may set the roles of the first to sixth speakers 1602 to 1607 as the peripheral (RR), peripheral (RL), peripheral (W), peripheral (FR), peripheral (FL), and peripheral (C) based on the determined positions. The S1620 step may be performed in the GATT layer.

S1630: The TV 1601 transmits a message requesting to form a CIS channel to the first to sixth speakers 1602 to 1607 respectively to form a CIS channel between the first to sixth speakers 1602 to 1607. The CIS channel may be a unicast channel. Here, the TV 1501 may correspond to a master device, and the first to sixth speakers 1602 to 1607 may correspond to a slave device. Afterward, a first CIS channel may be formed between the TV 1601 and the first speaker 1602, a second CIS channel may be formed between the TV 1601 and the second speaker 1603, a third CIS channel may be formed between the TV 1601 and the third speaker 1604, a fourth CIS channel may be formed between the TV 1601 and the fourth speaker 1605, a fifth CIS channel may be formed between the TV 1601 and the fifth speaker 1606, and a sixth CIS channel may be formed between the TV 1601 and the sixth speaker 1607. And the first to sixth CIS channels may be grouped into one CIG. The TV 1601 may transmit the audio stream of the contents being watched by the user to each of the first to sixth speakers 1602 to 1607 through the formed first to sixth CIS channels using the unicast scheme. The S1630 step may be performed in the link layer.

Method for Configuring Speaker Position (Angle) Based on Bluetooth Direction Finding Technology (Method 1)

In what follows, a method for a control device to measure the angles between speakers constituting the 5.1 channel surround sound system and the control device and configuring a sweet spot based on the measured angles will be described.

FIG. 17 illustrates examples of speaker arrangements in a 5.1 channel surround sound system.

FIG. 17(a) shows speaker positions for the case of two speakers, FIG. 17(b) shows speaker positions for the case of four speakers, and FIG. 17(c) shows speaker positions for the case of five speakers.

FIG. 18 illustrates examples of sweet spots according to the number of speakers.

FIG. 18(a) shows a sweet spot when there are two speakers. Here, a virtual straight line placed between the TV and the user may be used as the reference point 1801. The angle measured in the clockwise direction from the reference point is defined as a positive angle, and the angle measured in the counterclockwise direction from the reference point is defined as a negative angle.

When there are two speakers, the angle between the RR speaker and the reference point is 110 degrees (degree), and the angle between the RL speaker and the reference point is −110 degrees. In this case, the angle between the reference point and the RR speaker and the angle between the reference point and the RL speaker may allow an error of +/−10 degrees.

FIG. 18(b) shows a sweet spot when there are four speakers. Here, a virtual straight line placed between the TV and the user may be used as the reference point 1802. The angle measured in the clockwise direction from the reference point is defined as a positive angle, and the angle measured in the counterclockwise direction from the reference point is defined as a negative angle.

When there are four speakers, the angle between the RR speaker and the reference point is 110 degrees (degree), and the angle between the RL speaker and the reference point is −110 degrees. In this case, the angle between the reference point and the RR speaker and the angle between the reference point and the RL speaker may allow an error of +/−10 degrees.

Also, the angle between the FR speaker and the reference point is 30 degrees, and the angle between the FL speaker and the reference point is −30 degrees. At this time, the angle between the reference point and the FR speaker and the angle between the reference point and the FL speaker may allow an error of +/−10 degrees.

FIG. 18(c) shows a sweet spot when there are five speakers. Here, a virtual straight line placed between the TV and the user may be used as the reference point 1803. The angle measured in the clockwise direction from the reference point is defined as a positive angle, and the angle measured in the counterclockwise direction from the reference point is defined as a negative angle. Since the configuration of FIG. 18(c) is the same as that of FIG. 18(b) except that the W speaker is additionally involved, further descriptions will be omitted.

FIG. 19 illustrates examples of methods for configuring a reference point in a control device to measure speakers' positions (angles).

FIG. 19(a) is an example in which the control device is a remote controller equipped with a plurality of antennas. The control device may adjust the positions of speakers constituting the 5.1 channel surround sound system so that a user may listen to the audio sounds based on the 5.1 channel surround sound system. The control device may measure the positions of the speakers to adjust the positions of the speakers. A reference point may be set in the control device so that the control device may measure the positions of the speakers. A virtual straight line placed between the TV and the control device may be set in the control device as a reference point.

FIG. 19(b) is an example in which the control device is a smartphone equipped with a plurality of antennas. Since the case of FIG. 19(b) is the same as the case of FIG. 19(a) except that the control device is a smartphone, further descriptions will be omitted.

FIG. 19 assumes that the control device is a remote controller or a smartphone. However, it should be understood that various other devices for which a specific reference point is set to measure the speakers' positions may also be used as the control device for adjusting the speakers' positions.

FIG. 20 is a flow diagram illustrating examples of operations for measuring an angle between a control device and a speaker performed by the control device to adjust the speaker's position.

FIG. 20(a) illustrates an example in which a control device measures the angle of a speaker (declination angle) based on angle of arrival (AoA) measurement.

The control device receives an advertisement message for angle measurement between the control device and the speaker S2011. The advertisement message may include the Constant Tone Extension (CTE) field used for angle measurement of the control device. The CTE field may be a bit sequence of repeating 0 s and 1 s.

The control device measures the angle between the reference point set in the control device and the speaker's position based on the advertisement message S2021.

Based on the measured angle, the position of the speaker is adjusted so that the angle between the control device and the speaker satisfies a condition for forming a sweet spot. More specifically, the measured angle is provided to the user, and the user may adjust the speakers' positions to satisfy the condition for forming a sweet spot using the received angle.

When a plurality of speakers constitutes the 5.1 channel surround sound system in which the control system operates, the control device may perform the operations of the S2011 to S2021 steps respectively in conjunction with each of the plurality of speakers.

FIG. 20(b) illustrates an example in which a control device measures the angle of a speaker (declination angle) based on angle of departure (AoD) measurement.

The control device broadcasts an advertisement message for measuring an angle between the control device and a speaker S2012. The advertisement message may include the Constant Tone Extension (CTE) field used for angle measurement of the control device. The CTE field may be a bit sequence of repeating 0 s and 1 s.

The speaker measures the angle between the reference point set in the control device and the speaker's position based on the advertisement message S2022.

The speaker transmits a connection request message to the control device to transmit information on the measured angle, and the control device receives the connection request message S2032. Afterward, the control device transmits a connection response message to the speaker in response to the connection request message, and a connection is established between the control device and the speaker.

Afterward, the control device receives angle information from the speaker S2042.

Based on the received angle information, the position of the speaker is adjusted so that the angle between the control device and the speaker satisfies a condition for forming a sweet spot. More specifically, the angle information is provided to the user, and the user may adjust the speakers' positions to satisfy the condition for forming a sweet spot using the received angle information.

When a plurality of speakers constitutes the 5.1 channel surround sound system in which the control system operates, the control device may perform the operations of the S2012 to S2042 steps respectively in conjunction with each of the plurality of speakers. In other words, the control device may receive angle information from each of the plurality of speakers.

Additionally, to adjust the positions of the speakers, both methods described in FIGS. 20(a) and (b) may be used. In this case, since both the angle measured by the control device and the angle measured by the speaker may be used, the speakers' positions may be adjusted more accurately than when only one of the methods of FIG. 20(a) or (b) is used.

Also, the control device may measure the distances between the control device and the speakers to ensure that the speakers are positioned at appropriate distances to provide a 5.1 channel surround sound system. To measure the distances between the speakers' positions, the control device may use information such as the received signal strength of an advertisement message transmitted by the speakers.

FIG. 21 is a flow diagram illustrating an example in which a method for configuring 5.1 surround channels according to the present disclosure is performed.

First, a control device receives advertisement messages from the first and second speakers to measure angles between the control device and the speakers S2110.

Next, the control device measures the angles between a reference point set in the control point and the speakers' positions based on the advertisement messages.

Based on the measured angles, the speakers' positions may be adjusted respectively so that the angles between the control device and the speakers satisfy a condition for forming a sweet spot.

Thereafter, a multi-ch source device performs a procedure for configuring 5.1 surround channels with the first and second speakers to receive audio sounds through the 5.1 channel surround sound system S2120. The multi-ch source device may be a TV.

More specifically, in the S2120 step, the multi-ch source device transmits a connection request for establishing a connection to the first and second speakers. Next, a service and characteristic discovery procedure may be performed among the multi-ch source device and the first and second speakers. After that, the multi-ch source device and the first and second speakers may exchange audio roles, capability information, ASE_ID, and the like. Next, the multi-ch source device and the first and second speakers may exchange information on the codec, quality of service (QoS), and position settings. After that, the multi-ch source device may enable the ASE of the first and second speakers and transmit a periodic advertisement message. Then, the multi-ch source device and the first and second speakers may form 5.1 surround channels, and the multi-ch source device may transmit audio data through the channels to the first and second speakers.

Additionally, the control device may transmit information on the measured positions of the first and second speakers to the multi-ch source device. The operation in which the control device transmits information on the measured positions of the speakers to the multi-ch source device may be performed between the S2110 and S2120 steps. The multi-ch source device may establish 5.1 surround channels with the first and second speakers based on the speakers' positions. In particular, when the multi-ch source device transmits a message for requesting a connection to the first and second speakers, the information on the positions may be used. In this case, the multi-ch source device has the effect of forming a channel for transmitting audio data based on the information on the speakers' positions received from the control device without directly determining the speakers' positions.

FIG. 22 illustrates an example of a packet format of an advertisement message used for a control device to measure a speaker's position.

Unlike the advertisement packet of a general advertisement message, the advertising packet PDU format of an advertisement message used for the control device to measure a speaker's position may include the CTE field inserted at the end of the advertisement packet.

As in a general advertising packet format, Ad-Type metadata is placed in front of the CTE field. Since the 5.1 channel surround profile uses the Advertising packet of the advertisement message used for the control device to measure the speaker's position, the Service Data Ad-Type field may include the 5.1 channel surround profile UUID.

FIG. 23 is a flow diagram illustrating an example in which a control device performs a method for configuring speakers' positions according to the present disclosure.

FIG. 23 illustrates an operation for a control device to measure the angles between the control device and speakers based on the angle of arrival (AoA) measurements of advertisement messages transmitted by the speakers.

First, the control device scans advertisement messages transmitted by the speakers S2310.

Next, the control device determines whether all of the advertisement messages from the speakers constituting the 5.1 channel surround sound system have been scanned S2320.

When the control device determines that not all of the advertisement messages from the speakers have been scanned, the control device perform the S2310 step.

When the control device determines that all of the advertisement messages from the speakers have been scanned, the control device measures the angle between a reference point set in the control device for angle measurement and the speaker's position for each speaker.

Next, the control device determines whether the speakers' positions have been adjusted to satisfy a sweet spot based on the measured angles S2340.

When the control device determines that the speakers' positions have not been adjusted, the control device may perform the operations of the S2310 to S2340 steps again.

When the control device determines that the speakers' positions have been adjusted, the control device stops configuring the speakers' positions.

FIG. 24 is a flow diagram illustrating another example in which a control device performs a method for configuring speakers' positions according to the present disclosure.

FIG. 24 illustrates an operation in which a speaker measures the angle of arrival (AoD) based on the advertisement message transmitted by the control device, the control device receives the angle information on the AoD, and the control device measures the angle between the control device and the speaker based on the angle information.

First, the control device broadcasts an advertisement message S2410.

Next, the control device receives a connection request message from each of the speakers that have received the advertisement message S2420. Since the control device has to receive the angle information on the AoD from the speaker to configure the speaker's position based on the AoD measured by the speaker, the control device has to establish a connection to the speakers.

Next, the control device determines whether a connection has been established to all of the speakers S2430.

When the control device determines that not all of the speakers have been connected to the control device, the control device may again perform the operation in the S2430 step.

On the other hand, when the control device determines that all of the speakers are connected, the control device receives angle information respectively from the speakers S2440.

Next, the control device determines whether the speakers' positions have been adjusted based on the angle information S2450. To determine whether the speakers' positions have been adjusted, the control device may compare AoD included in the angle information with information related to the condition of a sweet spot preconfigured in the control device.

When the control device determines that the speakers' positions have not been adjusted, the control device may perform the operations of the S2410 to S2440 steps again.

When the control device determines that the speakers' positions have been adjusted, the control device releases the connection to the speakers S2460 and stops configuring the speakers' positions.

Method for Adjusting the Audio Sound Output Angle of a Speaker (Method 2)

In what follows, described will be a method for a control device to measure the audio sound output angles of speakers constituting a 5.1 channel surround sound system and adjust the audio sound output angles to make audio sounds output from the speakers incident at right angles to the control device.

FIG. 25 illustrates an example of configuring speakers' audio sound output angles.

FIG. 25 illustrates an example in which the angle of audio sound output from a speaker (hereinafter, a voice signal) is configured to make the voice signal incident at a right angle to a control device (user). More specifically, FIG. 25 shows that the voice signals output from the FR speaker 2502 and the RR speaker 2503 are incident at right angles to the control device (user).

Different from the example of FIG. 25, when the audio signal output angle of the speaker is not configured appropriately, the 5.1 channel surround sound system may not operate properly even if the speaker's position is configured to satisfy a sweet spot.

FIG. 26 is a flow diagram illustrating an example in which a method for adjusting speakers' audio sound output angles according to the present disclosure is performed between a control device and the speakers.

First, the control device receives an advertisement message respectively from a first speaker and a second speaker S2610.

Since the advertisement message is not meant for the control device to measure the positions (angles) of the first and second speakers, the advertisement message may not include the CTE field.

Next, the control device transmits a connection request message for forming a connection to the first and second speakers in response to the advertisement message S2620.

After the connection between the control device and the first speaker and the second speaker is formed, the control device receives a voice signal (audio sound) from the first and second speakers, respectively, and measures the volume of the received voice signal S2630.

The voice signal output angles of the first and second speakers may be adjusted based on the volume of the audio signals measured by the control device. More specifically, the control device may calculate values for adjusting the audio output angles of the first and second speakers based on the measured volume. The voice signal output angles of the first and second speakers may be adjusted based on the calculated values. The control device may transmit information on a value for adjusting the audio signal output angle to the first and second speakers. At this time, if it is the case that the first and second speakers are equipped with a built-in motor for adjusting the voice signal output angle, the first and second speakers may adjust their voice signal output angle directly based on the information on the value for adjusting the voice signal output angle.

Afterward, the control device may receive a voice signal from the first and second speakers with adjusted positions and voice signal output angles.

FIG. 27 is a flow diagram illustrating an example in which a control device performs a method for adjusting speakers' audio sound output angles according to the present disclosure.

The example of FIG. 27 assumes that the control device has already established a connection with speakers constituting a 5.1 channel surround sound system.

First, the control device sets the volume to the same level for the speakers S2710.

Next, the control device receives voice signals from the speakers, respectively, and determines whether the volume levels of the speakers are the same by measuring the volume of each received voice signal S2720. Here, it is assumed that the volume level of each speaker is the same, and the voice signals output from the respective speakers are incident at right angles to the control device. To measure the volume of the voice signal, the control device may divide the frequency band in units of 100 Hz, 200 Hz, and 1000 Hz, monotonically; measure the sound pressure level (SPL) for each frequency band; and calculate a weighted average of the SPLs using the psycho-acoustic model. Alternatively, the control device may obtain the SPL at once with a synthesized multi-tone for the convenience of UX. In this case, since a portable BT speaker does not need to have high sensitivity, the synthesized multi-tone may reduce the test time.

In the S2720 step, when the control device determines that the volume of each speaker is at the same level, the control device terminates the operation for adjusting the audio sound output angle of the speaker.

On the other hand, when the control device determines that the volume of each speaker is not at the same level, the control device selects one from among the speakers and adjusts the voice signal output angle of the selected speaker S2730.

Next, the control device determines whether the volume of the angle-adjusted speaker is at the maximum volume S2740. In other words, since the control device may know the volume size configured for each speaker, the control device may determine whether the volume of an angle-adjusted speaker is measured at its maximum volume by comparing the information on the volume size configured for each speaker and the volume of a received voice signal.

When the control device determines that the volume of the angle-adjusted speaker is not at the maximum volume, the control device may perform the S2730 step again.

On the other hand, when the control device determines that the volume of the angle-adjusted speaker is at the maximum volume, the control device selects the next speaker and adjusts the voice signal output angle S2750.

Next, the control device determines whether the voice signal output angle has been adjusted for all of the speakers S2760.

When the control device determines that the voice signal output angle has not been adjusted for all of the speakers, the control device may repeat the S2730 to S2760 steps.

On the other hand, when the control device determines that the voice signal output angle has been adjusted for all of the speakers, the control device terminates the operation for adjusting the audio sound output angles of the speakers.

Although the speaker in FIGS. 25 to 27 has been described by taking an example of a directional speaker, a method for a control device to adjust an audio sound output angle of a speaker may be applied even when the speaker is an omnidirectional speaker. The omnidirectional speaker refers to a speaker having a characteristic in which a voice signal output from the speaker is output in all directions (in 360 degrees).

FIG. 28 illustrates another example in which a method for adjusting an audio sound output angle of a speaker according to the present disclosure is performed between a control device and speakers.

More specifically, FIG. 28 relates to a case where a method of adjusting an audio sound output angle of an omnidirectional speaker is performed. When the speakers are an omnidirectional speakers, the performance of a 5.1-channel surround sound system which utilizes the directionality of a voice signal may deteriorate.

Referring to FIG. 28, the control device 2810 determines positions of speakers 2820 and 2830 based on a position of a control device 2810 based on AoA/AoD.

Then, based on the determined positions of the speakers 2820 and 2830, the control device 2810 may enable only a speaker facing the position of the control device 2810 among built-in speakers in all directions (in 360 degrees) with respect to the respective speakers 2820 and 2830, and may disable some of the other speakers.

Through the above method, even in a case where the speakers included in the 5.1-channel surround sound system are omnidirectional speakers, voice signals output from the speakers may maintain a specific directionality.

AoA and AoD Measurement

FIG. 29 illustrates an example in which a control device measures AoA.

Referring to FIG. 29(a), in the case of AoA, since a control device equipped with a plurality of antennas receives a signal from an external positioning device (Tx), a connection between the control device and the external positioning device is not required.

Referring to FIG. 29(b), the antennas installed on the control device are separated by a predetermined distance d. The control device may use the following equation for AoA measurement.

$$\Psi = (2\pi d \cos(\theta))/\lambda$$

$$\theta = \cos^{-1}((\Psi\lambda)/(2\pi d)) \quad [\text{Eq. 1}]$$

In Eq. 1, $\Psi$ represents a phase difference between signals received from the antennas installed on the control device. Also, $\lambda$ represents the wavelength of a signal transmitted by the external positioning device. The control device may calculate the AoA value through the $\theta$ value.

In other words, AoA may be calculated based on the distance between antennas installed on the control device, the wavelength of a signal transmitted by the external positioning device, and the phase difference between signals received at a plurality of Rx antennas of the control device.

FIG. 30 illustrates an example in which a control device measures AoD.

Referring to FIG. 30(a), in the case of AoD, since a control device equipped with one antenna receives a signal from an external positioning device (Tx) equipped with a plurality of antennas, and the control device transmits AoD measurements to the external positioning device, a connection between the control device and the external positioning device is required.

Referring to FIG. 30(b), antennas installed on the external positioning device is separated by a predetermined distance d. The control device may use the following equation for AoD measurement.

$$\Psi = (2\pi d \sin(\theta))/\lambda,$$

$$\theta = \sin^{-1}((\Psi\lambda)/(2\pi d))$$

$$\sin\theta = (\Psi/2\pi)\lambda/d \quad [\text{Eq. 2}]$$

In Eq. 2, $\Psi$ represents a phase difference measured at the Rx block of the control device between signals transmitted from the antennas installed on the external positioning device. Also, $\lambda$ represents the wavelength of a signal transmitted by the external positioning device. The control device may calculate the AoD value through the $\theta$ value.

In other words, AoD may be calculated based on the distance between antennas installed on the external positioning device, the wavelength of a signal transmitted by the external positioning device, and the phase difference measured at the Rx antenna block of the control device between signals transmitted through different antennas of the external positioning device.

FIG. 31 illustrates an example in which a control device performs a method for measuring speakers' positions and adjusting the speakers' voice signal output angles according to the present disclosure.

FIG. 31 assumes a situation in which two speakers are involved.

The control device measures the angle between a reference point set in the control device and each speaker's position for angle measurement based on at least one of AoA or AoD scheme.

Next, based on the measured angle, the positions of the two speakers may be adjusted. In the case of two speakers, the angle between the control device and one of the speakers may be adjusted to be either 110 degrees or −110 degrees.

Afterward, the control device establishes a connection with the two speakers and receives a voice signal from the two speakers, respectively. The control device measures the volume of each received voice signal and determines whether the voice signal output angles of the two speakers are set to be incident to the control device at right angles.

Next, when the control device determines that the voice signal output angles of the two speakers are not set to be incident to the control device at right angles, the control device may adjust the voice signal output angles of the two speakers.

FIG. 32 illustrates another example in which a control device performs a method for measuring speakers' positions and adjusting the speakers' voice signal output angles according to the present disclosure.

FIG. 32 assumes a situation in which four speakers are involved.

Since the case of FIG. 32 is the same as the case of FIG. 31 except that two more speakers are added, further descriptions will be omitted.

Method for Volume Balancing Between Speakers—(Method 3)

Hereinafter, a method for volume balancing between speakers to adjust volume settings of speakers in consideration of performance of the respective speakers so that voice signals received by a control device can have the same magnitude will be described.

It is assumed that this method is performed in a state in which positions of speakers included in the 5.1-channel surround sound system and angles of incidence of voice signals output from the speakers to a control device are adjusted according to (Method 1) to (Method 2) described above.

FIGS. 33 and 34 are diagrams illustrating an example in which a control device performs a method for volume balancing between speakers.

More specifically, FIGS. 33 and 34 relates to a control device performing the volume balancing method on an RL speaker and an RR speaker.

FIG. 33 shows an example of a case in which a multi-channel surround audio system is configured using only a TV built-in speaker, an RL speaker, and an RR speaker.

Referring to FIG. 34, the control device may be a Volume Control (VC) Client, and a speaker may be a Volume Control (VC) server.

In FIG. 34, the control device first sets a default volume to the RL speaker and requests output of a voice signal based on the set volume (S3410). More specifically, the control device may set a default volume to the RL speaker and transmit a message indicating output of a voice signal based on the set default volume. Here, the default volume may be a volume setting of a preset specific magnitude for each speaker. The setting of the default volume setting may vary depending on types of speakers.

Next, the control device receives the voice signal output from the RL speaker and measures a magnitude of the received voice signal (S3420). More specifically, the control device may compare the magnitude of the received voice signal with a preset reference value to measure the strength of the voice signal. The preset reference value for measuring the magnitude of the voice signal may be a tone sound of a single frequency or may be based on a mixture of tones of multiple frequencies.

Next, the control device sets a default volume to the RR speaker and requests output of a voice signal based on the set volume (S3430). More specifically, the control device may set a default volume to the RR speaker and transmit a message indicating output of a voice signal based on the set default volume.

Next, the control device receives the voice signal output from the RR speaker and measures the magnitude of the received voice signal (S3440).

Then, the control device adjusts current volume settings of the RL speaker and the RR speaker, respectively, based on the measured magnitude of the voice signal output from the RL speaker and the measured strength of the voice signal output from the RR speaker and requests output of voice signals based on the adjusted volume settings from the RL speaker and the RP speaker (S3450). More specifically, the control device determines an appropriate magnitude of the RL speaker based on the magnitude of the voice signal output from the RL speaker, the magnitude which is measured based on the reference value. Next, the control device may adjust the volume of the RL speaker to the determined magnitude and transmit a message indicating output of a voice signal based on the volume of the adjusted magnitude to the RL speaker. The above operation may be performed in the same way for the RR speaker.

Lastly, the control device receives a voice signal from each of the RL speaker and the RR speaker and measures the magnitude of the received voice signal (S3660). As a result of the measurement, when it is determined that the voice signals received from the control device have the same magnitude, the control device may stop performing the method for volume balancing between speakers. In the opposite case, the control device may perform the operations S3610 to S3660 again.

By performing the above method, the control device may adjust the volume settings of the speakers so that voice signals output from the speakers with different performance are received with the same reception intensity at the control device.

FIGS. 35 and 36 are diagrams illustrating another example in which the control device performs a method for volume balancing between speakers.

More specifically, FIGS. 35 and 36 relate to the control device performing the volume balancing method for an FL speaker and an FR speaker.

FIG. 35 shows an example of a case where a multi-channel surround audio system is configured using only a TV built-in speaker, an FL speaker, and an FR speaker.

Also in the case of FIG. 35, since volume balancing between speakers may be performed in the same manner as the method described in FIG. 34, a detailed description thereof will be omitted.

Method for Synchronizing Audio Data Output Timings of Speakers—(Method 4)

Hereinafter, a method for synchronizing audio data output timings of speakers will be described.

For convenience of explanation, the following is assumed.

1) A specific device may transmit audio data to the speakers.

2) Each of the speakers may receive the audio data, and may output the received audio data after decoding.

3) Also, the specific device may output video data related to the audio data to a display mounted on the specific device.

The specific device may refer to any device that can be understood as having a display or the like capable of outputting video data and transmitting audio data related to the video data to a speaker. For example, the specific device may be a TV.

Hereinafter, when the audio data output timings of the speakers are synchronized, it may mean that the timings at which the audio data received by the speakers are output from the respective speakers coincide with each other.

Hereinafter, for convenience of description, a method for synchronizing audio data output timings of speakers will be described mainly about an operation performed by the specific device. However, this is only for convenience of description, and the method proposed in the present disclosure is not limited to the operation performed by the specific device, and the method for synchronizing audio data output timings of speakers may also be performed by speakers. In addition, for convenience of description, it is assumed that a specific device performs a method for synchronizing audio data output timings of speakers with two speakers. This is only for convenience of description, and the specific device may perform a method for synchronizing audio data output timings of speaker with two or more speakers.

Also, for convenience of description, the specific device may be hereinafter referred to as a "third device", and speakers may be hereinafter referred to as a "first device" and a "second device".

In order to synchronize audio data output timings of the first device and the second device, the third device first determines timings at which the first device and the second device receive audio data. Next, the third device performs an operation to match the timings at which the audio data is output from the first device and the second device which have received the audio data.

The operation performed by the third device to determine the timings at which the first device and the second device receive the audio data may be referred to as "synchronization on the network layer".

Also, the operation performed by the third device to match the audio data output timings of the first device and the second device may be referred to as "synchronization in the application layer".

Hereinafter, synchronization on the network layer and synchronization on the application layer will be described in more detail.

Synchronization on Network Layer

Hereinafter, a method for synchronization on the network layer will be described with reference to FIG. 37.

FIG. 37 shows an example in which a method for synchronization on the network layer is performed.

The third device may transmit audio data to the first device and the second device based on a time division method (3710 and 3720). The audio data may be a CIS stream.

Since audio data transmission is performed based on the time division method, audio data to be transmitted to the first device and the second device may be sequentially transmitted (3710 and 3720). That is, audio data for the first device may be transmitted first (3710) and then audio data for the second device may be transmitted (3720). Alternatively, the transmission of audio data may be performed in reverse order. In this case, since the transmission timings of the audio data are different, the timings at which the first device and the second device receive the audio data do not coincide with each other (3730 and 3740). That is, the first device first receives the audio data, and then the second device receives the audio data.

Even if the audio data reception timings of the first device and the second device are different from each other, timings at which the first device and the second device start an audio data output processing should coincide with each other.

Therefore, despite the different audio data reception timings of the first device and the second device, in order to match the processing start timing for outputting audio data from the first device and the second device, the third device may determine timings when the first device and the second device complete reception of the audio data (3750). A time value related to the determined timing at which both the first device and the second device has received the audio data may be referred to as a "first synchronization value", "CIS_Synchronization_Delay", or the like and may be referred to in various ways within a range where the time value is interpreted to have the same meaning as described above or a meaning similar thereto.

More specifically, the third device may determine the first synchronization value based on the number of CIS and the number of CIS subevents.

At a time when setting an initial channel for audio data transmission after the determination of the first synchronization value, the third device may set the first synchronization value to each of the first device and the second device. The set first synchronization value may be applied to every CIS stream transmitted after the initial channel is set.

Synchronization on Application Layer

Hereinafter, a method for synchronization on the application layer will be described.

Having received the audio data from the third device, the first device and the second device may perform decoding on the received audio data and output the decoded audio data (presentation). The decoding and presentation of the audio data may be performed on the application layer of each of the first device and the second device. However, since the performance of the first device and the second device may be different from each other, periods of time required for the first device and the second device to decode and output the received audio data may be different from each other. Hereinafter, a time required from a timing at which the first device or the second device starts decoding the audio data received from the third device to a timing at which the first device or the second device outputs the decoded audio data will be referred to as a presentation delay.

The third device may perform an operation for synchronizing an output delay time of the first device and an output delay time of the second device so that the output delay time of the first device and the output delay time of the second device coincide with each other.

A method for synchronization on the application layer will be described in detail with reference to FIG. 38.

FIG. 38 shows an example in which a method for synchronization on the application layer is performed.

First, the third device receives a first advertising message related to connection establishment for configuring a multi-channel surround audio system from the first device. In addition, the third device receives a second advertising message related to connection establishment for configuring a multi-channel surround audio system from the second device. Then, the third device sets its role in the multi-channel surround audio system (S3800).

Then, the third device transmits a connection request message for establishing a connection with each of the first device and the second device based on the first advertising message and the second advertising message (S3810). Based on the connection request message, the third device may establish a connection with the first device and the second device, respectively.

Then, the third device receives first output delay time information related to a range of the output delay time required from an audio data decoding start timing to an audio data output timing of the first device from the first device, and receives second output delay time information related to a range of the output delay time required from an audio data decoding start timing to an audio data output timing of the second device from the second device (S3820). Here, the first output delay time information may include information on a maximum value and a minimum value of the output delay time of the first device. Also, the second output delay time information may include information on a maximum value and a minimum value of the output delay time of the second device.

Then, based on the first output delay time information and the second output delay time information, the third device may determine and set an output delay time value commonly supported by the first device and the second device (S3830). More specifically, in the third device, based on a range of the output delay time range that the first device can support and a range of the output delay time that the second device can support, the third device determine the output delay time value commonly supported by the first device and the second device. Here, the output delay time value commonly supported by the first device and the second device may be referred to as a second synchronization value.

Also, when the range of the output delay time of the first device and the range of the output delay time of the second device overlap by a specific range, the second synchronization value may be determined based on values included in the specific range. That is, the second synchronization value may be determined as one of the values included in the specific range. In addition, in order to set the second synchronization value to the first device and the second device, the third device may transmit a configuration message for configuring the second synchronization value to the first device and the second device, respectively.

Then, the third device sets its role in the system of devices included in the multi-channel surround audio system in order to provide an audio data streaming service (S3840). More specifically, the third device may be a central device, and the first device and the second device may be peripheral devices.

The operations S3810 to S3840 may be performed on the GATT layer.

Next, the third device establishes a channel for audio data transmission with each of the first device and the second device (S3850).

Then, the third device transmits audio data on a channel for transmission of the audio data to the first device and the second device based on a first synchronization reference timing that is determined based on the first synchronization value and the second synchronization value (S3860). Here, the first synchronization reference timing may be a point in time later by the sum of the first synchronization value and the second synchronization value from a specific reference timing configured in the third device for determining a synchronization reference timing. More specifically, expecting that the first device and the second device output audio data at the first synchronization reference timing, the third device may transmit the audio data to the first device and the second device. In addition, at a point in time when the first device and the second device are expected to output the audio data, the third device may output video data related to the audio data. Here, a timing for the first device and the second device to start decoding the received audio data may be determined based on the first synchronization value described with reference to FIG. 37, and a time required for each of the first device and the second device to decode and output the audio data may be determined based on the second synchronization value.

The operations S3850 to S3860 may be performed on the link layer.

To be brief, audio data output timings of the first device and the second device may be eventually determined based on the first synchronization value and the second synchronization value determined by the third device. Here, the third device may determine the audio data transmission timings based on the determined audio data output timings of the first device and the second device. The audio data output timings of the first device and the second device, which are determined based on the first synchronization value and the second synchronization value, may be referred to as a first synchronization reference timing.

In this case, a specific reference timing for determining the first synchronization reference timing may be preset in the third device. Therefore, the first synchronization reference timing may be a point in time later by the sum of the first synchronization value and the second synchronization value from the specific reference timing. The specific reference timing may be a point in time when decoding of the video data related to the audio data is completed by the third device and preparation for outputting the video data is completed.

Synchronization in Consideration of Specific Operation by Third Device for Audio Data Transmission The third device may perform a specific operation for audio data transmission or before audio data transmission. The specific operation may include an image quality improving operation for outputting video data related to the audio data with good image quality.

When the third device does not perform the specific operation, the third device may perform audio data transmission only based on the first synchronization reference timing that is determined based only on the first synchronization value and the second synchronization value.

On the other hand, when the third device performs the specific operation, a time required for the third device to perform the specific operation should be considered in order to determine an audio data transmission timing of the third device. In other words, when the third device performs the specific operation, the third device must perform audio data transmission in consideration of not just the first synchronization reference timing, but also the time required to perform the specific operation. Here, a synchronization reference timing determined in consideration of both the first synchronization reference timing and the time required to perform the specific operation may be referred to as a second synchronization reference timing.

A synchronization method in consideration of the time required for the third device to perform a specific operation for audio data transmission will be described with reference to FIG. 39.

FIG. 39 is a diagram illustrating another example in which a method for synchronizing audio data output timings of speakers is performed.

First, the third device receives a first advertising message related to connection establishment for configuring a multi-channel surround audio system from the first device. In addition, the third device receives a second advertising message related to connection establishment for configuring a multi-channel surround audio system from the second device. Then, the third device sets its own role in the multi-channel surround audio system (S3900).

Then, the third device transmits a connection request message for establishing a connection with each of the first device and the second device based on the first advertising message and the second advertising message (S3910). Based on the connection request message, the third device may establish a connection with each of the first device and the second device.

Then, the third device receives, from the first device, first output delay time information related to a range of an output delay time required from an audio data decoding start timing to an audio data output timing of the first device, and the third device receives, from the second device, the second output delay time information related to a range of the output delay time required from the audio data decoding start timing to the audio data output timing of the second device (S3920). Here, the first output delay time information may include information on a maximum value and a minimum value of the output delay time of the first device. Also, the second output delay time information may include information on a maximum value and a minimum value of the output delay time of the second device.

Then, based on the first output delay time information and the second output delay time information, the third device may determine and set an output delay time value commonly supported by the first device and the second device (S3930). More specifically, in the third device, based on a range of the output delay time range that the first device can support and a range of the output delay time that the second device can support, the third device determine the output delay time value commonly supported by the first device and the second device. Here, the output delay time value commonly supported by the first device and the second device may be referred to as a second synchronization value.

Also, when the range of the output delay time of the first device and the range of the output delay time of the second device overlap by a specific range, the second synchronization value may be determined based on values included in the specific range. That is, the second synchronization value may be determined as one of the values included in the specific range. In addition, in order to set the second synchronization value to the first device and the second device, the third device may transmit a configuration message for configuring the second synchronization value to the first device and the second device, respectively.

Next, the third device performs a specific operation for audio data transmission and determines a second synchronization reference timing in consideration of a time required to perform the specific operation (S3940).

More specifically, when the sum of the first synchronization value and the second synchronization value is less than a specific time value required to perform the specific operation, the second synchronization reference timing may be determined as a point in time later by a specific time value required to perform the specific operation from a specific reference timing that is preset to determine a synchronization reference timing by the third device. Here, the specific reference timing may be a point in time when decoding of video data related to the audio data is completed by the third device and preparation for outputting the video data is completed.

Alternatively, when the sum of the first synchronization value and the second synchronization value is greater than or equal to the specific time value required to perform the specific operation, the second synchronization reference timing may be determined as the same timing as the first synchronization reference timing.

Then, the third device sets its role in the system of devices constituting the multi-channel surround audio system in order to provide an audio data streaming service (S3950). More specifically, the third device may be a central device, and the first device and the second device may be peripheral devices.

The operations S3910 to S3950 may be performed on the GATT layer.

Next, the third device configures a channel for audio data transmission with each of the first device and the second device (S3960).

Thereafter, the third device transmits the audio data on the channel for audio data transmission to the first device and the second device based on the second synchronization reference timing (S3970). More specifically, expecting that the first device and the second device output audio data at the second synchronization reference timing, the third device may transmit the audio data to the first device and the second device. In addition, the third device may output the video data related to the audio data at a timing when the first device and the second device are expected to output the audio data.

That is, when the sum of the first synchronization value and the second synchronization value is less than a specific time value required to perform the specific operation, the second synchronization reference timing may be determined as a point in time later by a specific time value required to perform the specific operation from a specific reference timing that is preset to determine a synchronization reference timing by the third device. Therefore, in this case, expecting that the first device and the second device outputs the audio data at a point in time later by the specific time value required to perform the specific operation from the specific reference timing, the third device may transmit the audio data to the first device and the second device. In other words, the third device may transmit the audio data at a point in time delayed as much as a predetermined value from an audio data transmission timing that is based on the first synchronization reference timing. The predetermined value is a value corresponding to a difference between the time value required for the third device to perform the specific operation and the sum of the first synchronization value and the second synchronization value.

Alternatively, when the sum of the first synchronization value and the second synchronization value is greater than or equal to the specific time value required to perform the specific operation, the second synchronization reference timing may be determined as the same timing as the first synchronization reference timing. In this case, expecting that the audio data is output from the first device and the second device at the first synchronization reference timing, the third device may transmit the audio data at the same timing as a transmission timing that is based on the first synchronization reference timing.

The operations S3960 to S3970 may be performed on the link layer.

To be brief, the audio data output timings of the first device and the second device may be eventually determined based on the second reference timing, which is determined based on (i) the first synchronization reference timing determined based on the first synchronization value and the second synchronization value and (ii) the second synchronization reference timing determined based on a time required for the third device to perform a specific operation. Here, the third device may determine an audio data transmission timing and a video data output timing based on the second synchronization reference timing.

FIG. 40 is a diagram illustrating an example of performing a method for synchronization in consideration of a time required for a third device to perform a specific operation.

More specifically, FIG. 40 relates to a case where a specific operation of the third device is an image quality improving operation for outputting video data with good image quality.

The third device 4010 determines a first synchronization reference timing based on a specific reference timing, which is a point in time when preparation for decoding and outputting the video data is completed. In FIG. 40, based on a synchronization value of the network layer and a synchronization value of the application layer, a first synchronization reference timing 4030 is determined as a point in time later by the sum between the synchronization value of the network layer and the synchronization value of the application layer from the specific reference timing.

In addition, the third device determines a second synchronization reference timing 4040 based on the first synchronization reference timing 4030 and a time of one second (1 sec) required for an image quality improving operation for audio data transmission. Since the time required to perform the image quality improving operation from the specific reference timing is one second while a time required from the specific reference timing to the first synchronization reference timing is 0.2 milliseconds (0.2 msec), the second synchronization reference timing is determined as a point in time after one second from the specific reference timing (4040).

Then, the third device may transmit the audio data to the first device and the second device based on the determined second synchronization reference timing. Since the second synchronization reference timing is 0.8 seconds (0.8 sec) later from the first synchronization reference timing, the third device may transmit the audio data at a transmission timing, which is 0.8 seconds delayed from the transmission timing that is based on the first synchronization reference timing.

Method for Setting Reference Timing for Calculating Output Delay Time of Speaker Each of the first device and the second device may calculate an output delay time (presentation delay) required from an audio data decoding start timing to an audio data output timing. The calculation of the audio output delay time may be performed based on a reference timing (decoder clock reference) that is set in the first device and the second device to calculate the output delay time.

However, the reference timing set in the first device and the second device to calculate the output delay time may drift over time. That is, the reference time for calculating the output delay time should be fixed regardless of the passage of time, however, the reference time is not fixed but drifts in reality.

For example, in the case of watching a movie for a long time using a 5.1ch surround audio system based on a wireless connection between a TV and a speaker, when a difference between the reference timing for calculating the output delay time set for each speaker is greater than or equal to a specific value, a user may feel uncomfortable in hearing audio. Therefore, the reference timing set in the first device and the second device needs to be periodically reset.

FIG. 41 is a diagram illustrating an example in which a method for setting a reference timing for calculating an output delay time is performed.

As shown in FIG. 41, a reference timing 4110 of the second device gradually drafts over time.

When the first device and the second device use a reference wall clock, each of the first device and the second device may count a wall clock tick and a decoder clock tick for a predetermined time (e.g., one second) and may reset the reference timing when the accumulated count value exceeds a threshold value. In this manner, the first device and the second device may be able to solve the drifting of the reference timing. In this case, the first device and the second device may be speakers.

In addition, when the first device and the second device do not use the reference wall clock, it is possible to solve the drifting of the reference timing in the following method.

First, the third device receives a first message including a first decoder clock reference value from the first device. Here, the first decoder clock reference value is a value related to a reference timing for the first device to calculate an output delay time required from an audio decoding start timing to an audio data output timing of the first device.

Then, the third device receives a second message including a second decoder clock reference value from the second device. Here, the second decoder clock reference value is a value related to a reference timing for the second device to calculate an output delay time required from an audio decoding start timing to an audio data output timing of the second device.

Next, the third device compares a difference between the first decoder clock reference value included in the first message and the second decoder clock reference value included in the second message with a specific threshold value.

Then, the third device transmits a third message for resetting the first decoder clock reference value and the second decoder clock reference value to each of the first device and the second device based on a result of the comparison. Based on the third message, the reference timing for calculating the output delay time of the first device and the second device may be reset.

More specifically, when the difference between the first decoder clock reference value included in the first message and the second decoder clock reference value included in the second message is greater than the specific threshold, the first decoder clock reference value and the second decoder clock reference value may be reset.

In order to prevent inconvenience to a user who hears the output audio data, the first message and the second message may be periodically and repeatedly transmitted to the first device and the second device.

Also, in order to receive the first message and the second message, the third device may need to establish a connection with each of the first device and the second device. The connection established between the third device and each of the first device and the second device may be maintained, without being released, for the transmission and reception of the first message and the second message which are for resetting the reference timing for calculating the output delay time.

Method for Determining Output Timing of Video Data Related to Audio Data—(Method 5)

When a multi-channel surround sound system is configured based on a broadcast method, the third device transmits audio data (hereinafter, referred to as broadcast audio data) based on the broadcast method. Therefore, it is difficult for the third device to accurately determine whether a reception timing for the first device and the second device (speakers) to receive the broadcast audio data are synchronized with the third device.

In a case where timings for the first device and the second device to receive the broadcast audio data transmitted by the third device are not synchronized, audio may not be output from the first device and the second device although an image related to the broadcast audio data is being output from the third device.

In order to solve this problem, the third device may receive, from the first device and the second device, an indication message indicating that the reception timing of the first device and the second device are synchronized.

Specific details related to the method will be described with reference to FIG. 42.

FIG. 42 is a diagram illustrating an example in which a method for determining an output timing of video data related to broadcast audio data is performed.

First, the third device periodically transmits a specific advertising message for synchronizing the timings for the first device and the second device to receive broadcast audio data to each of the first device and the second device (S4210). The specific advertising message may be transmitted using an advertising message packet of AUX_SYNC_IND type.

Next, the third device receives, from the first device, a first indication message indicating that the timings for the first device to receive the audio data is synchronized in response to the specific advertising message transmitted to the first device. Then, the third device receives, from the second device, a second indication message indicating that a timing of the second device to receive the audio data is synchronized in response to the specific advertising message transmitted to the second device (S4220).

Next, the third device sets a second synchronization value to the first device and the second device so as to match the timings at which the first device and the second device output the received audio data as described above (S4230).

Thereafter, the third device outputs video data related to the broadcast audio data (S4240). Here, the video data may be output after both the first indication message and the second indication message are received.

In addition, the first indication message and the second indication message may be transmitted on an advertising channel. When the first indication message and the second indication message are transmitted on the advertisement channel, the messages can be transmitted quickly but the time for synchronization of the reception timings may be less precise compared to when the messages are transmitted based on GATT connection.

Alternatively, before performing the operations S4210 to S4240, the third device may first perform the following operation.

The third device receives a first advertising message related to connection establishment for configuring a multi-channel surround audio system from the first device, and receives a second advertising message related to connection establishment for configuring a multi-channel surround audio system from the second device.

Then, the connection is established with each of the first device and the second device based on the first advertising message and the second advertising message.

In this case, the first indication message and the second indication message may be received on a data channel based on the connection established with each of the first device and the second device.

In addition, the connection established with each of the first device and the second device to transmit and receive the first indication message and the second indication message may be maintained without being released.

When the first indication message and the second message are transmitted based on the established connection (GATT), the time for synchronization of reception timing may be more precise compared to when the messages are transmitted through an advertising message.

FIG. 43 is a flowchart illustrating an example of an operation by a third device to perform an audio data transmitting method according to the present disclosure.

More specifically, in the method for transmitting audio data by the third device in a short-range wireless communication system, the third device determines a first synchronization value related to a timing when reception of the audio data is completed at each of the first device and the second device (S4310).

Next, the third device determines a second synchronization value for synchronizing the timings when the audio data is output from each of the first device and the second device (S4320).

In this case, a first synchronization reference timing is determined based on the first synchronization value and the second synchronization value.

Then, the third device performs a specific operation related to the transmission of the audio data (S4330).

Lastly, the third device transmits the audio data to each of the first device and the second device on a specific channel related to the transmission of the audio data (S4340).

Here, the audio data is transmitted based on (i) the first synchronization reference timing and (ii) a second synchronization reference timing that is determined based on a specific time value required to perform the specific operation.

It is apparent to those skilled in the art that the present invention can be embodied in other specific forms without departing from the essential characteristics of the present invention. Accordingly, the foregoing detailed description should not be construed as restrictive in all respects but as exemplary. The scope of the present invention should be determined by a reasonable interpretation of the appended claims, and all modifications within the equivalent scope of the present invention are included in the scope of the present invention.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present disclosure may be implemented by various means, for example, hardware, firmware, software or a combination of them. In the case of implementations by hardware, an embodiment of the present disclosure may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present disclosure may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure. Further, although the disclosure has described both product inventions and process inventions, description of both inventions may be complementarily applied as needed.

Industrial Applicability

The preferred embodiments of the present disclosure described above are disclosed for an exemplary purpose, and modifications, changes, substitutions, or additions of various other embodiments may be hereinafter made by those skilled in the art within the technical spirit and the technical scope of the present disclosure disclosed in the appended claims.

What is claimed is:

1. A method for a third device to transmit audio data in a short-range wireless communication system, the method comprising:
determining a first synchronization value related to a timing when audio data reception is completed at each of a first device and a second device;
determining a second synchronization value for synchronizing a timing when the audio data is output from each of the first device and the second device, wherein a first synchronization reference timing is determined based on the first synchronization value and the second synchronization value;
performing a specific operation related to transmission of the audio data; and
transmitting the audio data to each of the first device and the second device on a specific channel related to the transmission of the audio data, wherein the audio data is transmitted based on (i) the first synchronization reference timing and (ii) a second synchronization reference timing determined based on a specific time value required to perform the specific operation, wherein a transmission timing of the audio data of a case that a sum of the first synchronization value and the second synchronization value is smaller than the specific time value required to perform the specific operation is a point in time delayed as much as a difference value between (i) the specific time value required to perform the specific operation and (ii) the sum of the first synchronization value and the second synchronization value, than a transmission timing of the audio data of a case that the sum of the first synchronization value and the second synchronization value is greater than or equal to the specific time value required to perform the specific operation.

2. The method of claim 1, wherein the first synchronization reference timing is a point in time later by the sum of the first synchronization value and the second synchronization value from a specific reference timing configured in the third device for determining a synchronization reference timing.

3. The method of claim 2, wherein the specific reference timing is a point in time at which decoding of video data related to the audio data is completed at the third device and preparation for outputting the video data is completed.

4. The method of claim 3, wherein based on that the sum of the first synchronization value and the second synchronization value is smaller than the specific time value required to perform the specific operation, the second synchronization reference timing is determined as a point in time later by the specific time value required to perform the specific operation from the specific reference timing.

5. The method of claim 4, wherein based on that the sum of the first synchronization value and the second synchronization value is greater than or equal to the specific time value required to perform the specific operation, the second synchronization reference timing is determined as a point in time equal to the first synchronization reference timing.

6. The method of claim 1, wherein based on that the sum of the first synchronization value and the second synchronization value is smaller than the specific time value required to perform the specific operation, the audio data transmitted by the third device is output by each of the first device and the second device at the second synchronization reference timing, which is determined as a point in time later by the specific time value required to perform the specific operation from specific reference timing, and wherein based on that the sum of the first synchronization value and the second synchronization value is greater than or equal to the specific time value required to perform the specific operation, wherein the audio data transmitted by the third device is output from each of the first device and the second device at the second synchronization reference timing determined as a point in time equal to the first synchronization reference timing.

7. The method of claim 1, wherein determining the second synchronization value comprises:

receiving, from the first device, first output delay time information related to a range of an output delay time required from an audio data decoding start timing of the first device to an audio data output timing;

receiving, from the second device, second output delay time information related to a range of an output delay time required from an audio data decoding start timing of the second device to an audio data output timing; and determining the second synchronization value based on the first output delay time information and the second output delay time information.

8. The method of claim 7, wherein based on that the range of the output delay time of the first device and that range of the output delay time of the second device overlap by a specific range, and wherein the second synchronization value is determined based on values included in the specific range.

9. The method of claim 8, further comprising:

transmitting a configuration message for configuring the second synchronization value to each of the first device and the second device, and wherein the audio data is decoded and output by each of the first device and the second device based on the second synchronization value.

10. The method of claim 1, further comprising:

periodically transmitting, to the first device and the second device, a specific advertising message for synchronizing timings for the first device and the second device to receive broadcast audio data;

receiving, from the first device, a first indication message indicating that a timing for the first device to receive the audio data is synchronized in response to the specific advertising message transmitted to the first device; and receiving, from the second device, a second indication message indicating that a timing for the second device to receive the audio data is synchronized in response to the specific advertising message transmitted to the second device.

11. The method of claim 10, further comprising:

outputting video data related to the broadcast audio date, wherein the vide data is output after both the first indication message and the second indication message are received.

12. The method of claim 11, wherein the first indication message and the second indication message are transmitted on an advertising channel.

13. The method of claim 11, further comprising:

receiving, from the first device, a first advertising message related to a connection establishment for configuring a multi-channel surround audio system;

receiving, from the second device, a second advertising message related to the connection establishment for configuring the multi-channel surround audio system; and establishing a connection with each of the first device and the second device based on the first advertising message and the second first advertising message.

14. The method of claim 13, wherein the first indication message and the second indication message are received on a channel based on the connection established with each of the first device and the second device.

15. The method of claim 14,
wherein the connection established with each of the first device and the second device is maintained, without being released, for transceiving the first indication message and the second indication message.

16. The method of claim 13, further comprising:
receiving, from the first device, a first message including a first decoder clock reference value, wherein the first decoder clock reference value is used for the first device as a reference for calculating an output delay time required from an audio data decoding start timing to an audio data output timing of the first device;
receiving, from the second device, a second message including a second decoder clock reference value, wherein the second decoder clock reference value is used for the second device as a reference for calculating an output delay time required from an audio data decoding start timing to an audio data output timing of the second device;
comparing a difference value between the first decoder clock reference value included in the first message and the second decoder clock reference value included in the second message with a specific threshold value; and
transmitting, to the first device and the second device, a third message for resetting each of the first decoder clock reference value and the second decoder clock reference value based on a result of the comparison.

17. The method of claim 16,
wherein based on that the difference value between the first decoder clock reference value included in the first message and the second decoder clock reference value included in the second message is greater than the specific threshold value, the first decoder clock reference value and the second decoder clock reference value are reset, and
wherein the first message and the second message are repeatedly transmitted at a predetermined interval on a data channel based on the connection established with each of the first device and the second device.

18. The method of claim 17,
wherein the connection established with each of the first device and the second device is maintained, without being released, for transceiving the first message and the second message.

19. A third device transmitting audio date in a short-range wireless communication system, the third device comprising:
a transmitter for transmitting a radio signal;
a receiver for receiving the radio signal; and
a processor operatively connected to the transmitter and the receiver,
wherein the processor is configured to:
determine a first synchronization value related to a timing when audio data reception is completed at each of a first device and a second device;
determine a second synchronization value for synchronizing a timing when the audio data is output from each of the first device and the second device, and
perform a specific operation related to transmission of the audio data; and
transmit the audio data to each of the first device and the second device on a specific channel related to the transmission of the audio data,
wherein a first synchronization reference timing is determined based on the first synchronization value and the second synchronization value, and
wherein the audio data is transmitted based on (i) the first synchronization reference timing and (ii) a second synchronization reference timing determined based on a specific time value required to perform the specific operation, and
wherein a transmission timing of the audio data of a case that a sum of the first synchronization value and the second synchronization value is smaller than the specific time value required to perform the specific operation is a point in time delayed as much as a difference value between (i) the specific time value required to perform the specific operation and (ii) the sum of the first synchronization value and the second synchronization value, than a transmission timing of the audio data of a case that the sum of the first synchronization value and the second synchronization value is greater than or equal to the specific time value required to perform the specific operation.

* * * * *